US009315910B2

(12) United States Patent
Eastman et al.

(10) Patent No.: US 9,315,910 B2
(45) Date of Patent: Apr. 19, 2016

(54) METHODS AND DEVICES FOR THE PRODUCTION OF HYDROCARBONS FROM CARBON AND HYDROGEN SOURCES

(75) Inventors: Craig D. Eastman, Edmonton (CA); Douglas R. Hole, Edmonton (CA)

(73) Assignee: Principle Energy Solutions Inc., Edmonton (CA)

( * ) Notice: Subject to any disclaimer, the term of this patent is extended or adjusted under 35 U.S.C. 154(b) by 0 days.

(21) Appl. No.: 13/597,196

(22) Filed: Aug. 28, 2012

(65) Prior Publication Data

US 2012/0329657 A1    Dec. 27, 2012

Related U.S. Application Data

(63) Continuation of application No. 12/151,206, filed on May 5, 2008, now Pat. No. 8,277,631.

(60) Provisional application No. 61/007,491, filed on Dec. 13, 2007, provisional application No. 61/001,944, filed on Nov. 6, 2007, provisional application No. 60/927,641, filed on May 4, 2007.

(51) Int. Cl.
*C25B 9/00*     (2006.01)
*C25B 3/04*     (2006.01)
(Continued)

(52) U.S. Cl.
CPC ... *C25B 3/04* (2013.01); *C10G 2/30* (2013.01); *C10G 2/50* (2013.01); *C25B 1/04* (2013.01);
(Continued)

(58) Field of Classification Search
CPC ...... C25B 3/04; C25B 1/04; B01D 2257/504; B01D 2259/818; C10G 2/30; C10G 2/50; C10G 2300/207; C10G 2300/805; F02M 25/12; F02M 27/04; Y10C 10/04; Y02T 10/121; Y02E 70/10; Y02E 60/366
USPC .......................................................... 422/186
See application file for complete search history.

(56) References Cited

U.S. PATENT DOCUMENTS 4,959,131 A * 9/1990 Cook et al. ..................... 205/462
5,064,733 A * 11/1991 Krist et al. ..................... 429/489
(Continued)

FOREIGN PATENT DOCUMENTS

JP            4-311586         * 11/1992

OTHER PUBLICATIONS

Li et al., "The electro-reduction of carbon dioxide in a continuous reactor", Journal of Applied Electrochemistry (2005) 35:955-965.*

*Primary Examiner* — Kishor Mayekar
(74) *Attorney, Agent, or Firm* — Christensen O'Connor Johnson Kindness PLLC

(57) ABSTRACT

Devices and methods are described for converting a carbon source and a hydrogen source into hydrocarbons, such as alcohols, for alternative energy sources. The influents may comprise carbon dioxide gas and hydrogen gas or water, obtainable from the atmosphere for through methods described herein, such as plasma generation or electrolysis. One method to produce hydrocarbons comprises the use of an electrolytic device, comprising an anode, a cathode and an electrolyte. Another method comprises the use of ultrasonic energy to drive the reaction. The devices and methods and related devices and methods are useful, for example, to provide a fossil fuel alternative energy source, store renewable energy, sequester carbon dioxide from the atmosphere, counteract global warming, and store carbon dioxide in a liquid fuel.

24 Claims, 11 Drawing Sheets

(51) Int. Cl.
*C10G 2/00* (2006.01)
*F02M 25/12* (2006.01)
*F02M 27/04* (2006.01)
*C25B 1/04* (2006.01)

(52) U.S. Cl.
CPC ............... *F02M 25/12* (2013.01); *F02M 27/04* (2013.01); *B01D 2257/504* (2013.01); *B01D 2259/818* (2013.01); *C10G 2300/207* (2013.01); *C10G 2300/805* (2013.01); *Y02C 10/04* (2013.01); *Y02E 60/366* (2013.01); *Y02E 70/10* (2013.01); *Y02P 20/133* (2015.11); *Y02P 30/10* (2015.11); *Y02T 10/121* (2013.01)

(56) References Cited

U.S. PATENT DOCUMENTS

| | | | |
|---|---|---|---|
| 7,008,971 B2 * | 3/2006 | Taft et al. | 521/27 |
| 7,887,927 B2 * | 2/2011 | Jang et al. | 428/542.8 |
| 2010/0112406 A1 * | 5/2010 | Liu et al. | 429/30 |

* cited by examiner

METHODS AND DEVICES FOR THE PRODUCTION OF HYDROCARBONS FROM CARBON AND HYDROGEN SOURCES

CLAIM OF PRIORITY

The present application is a continuation of U.S. application Ser. No. 12/151,206, filed May 5, 2008 entitled "Methods And Devices For The Production Of Hydrocarbons From Carbon And Hydrogen Sources," which is incorporated herein by reference. The present application also claims benefit to three United States provisional applications, each incorporated herein by reference: U.S. Application No. 60/927,641, filed May 4, 2007 entitled "Methods And Devices For The Electrolytic Production Of Alcohols From Carbon Monoxide And/Or Carbon Dioxide;" U.S. Application No. 61/001,944, filed on Nov. 6, 2007 entitled "Methods And Devices For The Electrolytic And/Or Plasma-Enhanced Production Of Hydrocarbons From Carbon Monoxide And Carbon Dioxide Gas;" and U.S. Application No. 61/007,491, filed on Dec. 13, 2007 entitled "Methods And Devices For Sono Activation Enhanced Electrochemical And/Or Catalytic Production Of Hydrocarbons From Carbon Dioxide And/Or Carbon Monoxide."

FIELD OF THE INVENTION

The invention generally relates to devices and methods for the production of hydrocarbons from carbon and hydrogen sources, such as, the production of alcohols from gaseous, carbonaceous influents in the presence of water. Additionally, the invention relates to the production of hydrocarbons using hydrogen gas influents. The invention relates to production of hydrocarbons using electrolytic, plasma or ultrasonic energy. The invention also generally relates to devices and methods for carbon dioxide sequestration; the generation of carbon influents; the generation of hydrogen influents; stopping, slowing or reversing global warming; storing carbon dioxide as a liquid hydrocarbon based fuel; storing renewable energy; providing long-term, stable energy prices; and renewably producing hydrogen gas and hydrogen ions.

BACKGROUND OF THE INVENTION

Mankind is dependent upon energy. Over the past 100 years mankind has adopted fossil fuels as its primary source of energy, but has neglected the long term environmental health of the Earth by failing to recognize and address the environmental impact resulting from the extended use of fossil fuels.

There is almost unanimous scientific agreement that the Earth's climate is directly affected by human activity, especially the combustion of fossil fuels to obtain energy. The combustion of fossil fuels comprises the oxidation of carbon-based molecules by oxygen, thus producing carbon dioxide. Carbon dioxide is recognized as a global warming gas. Levels of carbon dioxide gas in Earth's atmosphere today are nearly 30 percent higher than they were prior to the start of the Industrial Revolution and mankind's dependence on fossil fuels, based on records extending back 650,000 years.

The increase in atmospheric carbon dioxide levels is overwhelmingly recognized in the scientific community as driving global climate change. Recent climate changes include, for example, rapidly increasing average worldwide temperatures and accelerating polar ice cap destruction. Records indicate that 11 of the last 12 years were among the 12 warmest on record worldwide. According to NASA, the polar ice cap is now melting at the rate of 9 percent per decade and arctic ice thickness has decreased 40 percent since the 1960's.

The detrimental effects on mankind of global warming and increasing energy prices have spurred mankind's interest in alternative, and particularly renewable, sources of energy. Renewable energy flows involve natural, perpetual phenomena such as sunlight, wind, tides, and geothermal heat. For example, the use of wind, water, and solar energy are widespread in some countries and the mass production of electricity using renewable energy sources has become more commonplace in recent times.

The present invention will make use of carbon dioxide as an influent, and in some methods sequester carbon dioxide from the atmosphere. The present invention also provides devices and methods for the clean production of hydrocarbons with a goal toward using those hydrocarbons as alternatives to fossil fuel consumption. The description herein of problems and disadvantages of known apparatus, methods, and devices is not intended to limit the invention to the exclusion of these known entities. Indeed, embodiments of the invention may include one or more of the known apparatus, methods, and devices without suffering from the disadvantages and problems noted herein.

SUMMARY OF THE INVENTION

One embodiment of the invention is a device and method for the production of hydrocarbons using a carbon source and water as the hydrogen source in an electrolytic reaction. Another embodiment of the invention is a device and method for the production of hydrocarbons using a carbon source and water as the hydrogen source in an plasma assisted electrolytic reaction. Another embodiment of the invention is a device and method for the production of hydrocarbons using a carbon source and water as the hydrogen source in an sonochemical assisted electrolytic reaction. A further embodiment of the invention is a device and method for the production of hydrocarbons using gaseous hydrogen as a feed.

There is a need for new energy sources that will not further exacerbate mankind's already detrimental effect upon the environment, particularly in the context of global warming. There is a further need for devices and methods for providing energy in a form that is capable of immediately replacing existing fossil fuels used in internal combustion power sources such as automobile engines. Additionally needed are devices and processes to store renewable energy in energy-dense, readily accessible formats. There also is a need for devices and processes to remove $CO_2$ from the atmosphere and to store it in a liquid or solid (i.e. plastic) form in order to reduce the effect on the environment of human-induced global warming.

Moreover, there is a need for new devices and processes that afford greater control, selectivity, efficiency, and yield coupled with reduced complexity and capital costs than current devices and processes for the industrial-scale production of lower hydrocarbons from gaseous, carbonaceous influents. There is a need for new devices and processes that provide economically viable renewable energy alternatives.

Accordingly, there is provided herein an electro-hydrocarbon device for the electrolytic production of hydrocarbons from gaseous, carbonaceous influents. The electro-hydrocarbon device comprises a first input for accepting a gaseous influent comprising at least one of carbon monoxide gas and carbon dioxide gas; a second input for accepting an influent selected from the group consisting of water-containing influents and hydrogen-containing influents; an electrical power source; a cathode connected to the electrical power source and exposed to the first input; an anode connected to the electrical power source and exposed to the second input; and an electrolyte connecting the anode and cathode. Electrical power from the electrical power source causes reduction of the gases at the cathode to form hydrocarbons.

There also is provided a process for the electrolytic production of hydrocarbons from gaseous, carbonaceous influents. The process comprises contacting a gaseous influent comprising at least one of carbon monoxide gas and carbon dioxide gas with a cathode; contacting an influent selected from the group consisting of water-containing influents and hydrogen-containing influents with an anode connected to the cathode by an electrolyte; and applying an electrical potential between the cathode and the anode. The electrical potential applied between the cathode and the anode causes reduction of the gases at the cathode to form hydrocarbons.

There further is provided another device for the electrolytic production of hydrocarbons from gaseous, carbonaceous influents. The device comprises a first input for accepting a gaseous influent, the gaseous influent comprising carbon dioxide gas; a second input for accepting an influent selected from the group consisting of water-containing influents and hydrogen-containing influents; a deoxygenation device connected to the first input and that is capable of reducing at least some of the carbon dioxide gas in the gaseous influent to produce carbon monoxide gas; and an electro-hydrocarbon device connected to the deoxygenation device and the second input and that is capable of reducing at least some of the carbon monoxide gas and any remaining carbon dioxide gas to produce hydrocarbons.

Moreover, there is provided another process for the electrolytic production of hydrocarbons from gaseous, carbonaceous influents. The process comprises treating a gaseous influent comprising carbon dioxide gas with a deoxygenation device that is capable of reducing at least some of the carbon dioxide gas in the gaseous influent to produce carbon monoxide gas; and treating the carbon monoxide gas and any remaining carbon dioxide gas with an electro-hydrocarbon device that is capable of reducing at least some of the carbon monoxide gas and any remaining carbon dioxide gas to produce hydrocarbons.

Additionally provided is a process for sequestering carbon dioxide from the atmosphere, storing carbon dioxide in a liquid fuel, and slowing, stopping or reversing global warming. The process comprises collecting carbon dioxide gas from the atmosphere; treating the carbon dioxide gas with a deoxygenation device that is capable of reducing at least some of the carbon dioxide gas in the gaseous influent to produce carbon monoxide gas; and treating the carbon monoxide gas and any remaining carbon dioxide gas with an electro-hydrocarbon device that is capable of reducing at least some of the carbon monoxide gas and any remaining carbon dioxide gas to produce hydrocarbons.

A process for storing renewable energy also is provided. The process comprises producing electrical energy from a renewable energy source and treating a gaseous influent comprising at least one of carbon monoxide gas and carbon dioxide gas with an electro-hydrocarbon device that is capable of reducing at least some of the gaseous influent to produce hydrocarbons. The electro-hydrocarbon device utilizes the electric energy produced from the renewable energy source.

These and other devices, processes, variations, features, and advantages will be apparent from the description provided herein.

BRIEF DESCRIPTION OF THE DRAWINGS

The nature and scope of the invention will be elaborated in the detailed description which follows, in connection with the figures.

DETAILED DESCRIPTION OF THE INVENTION

Figure 1:
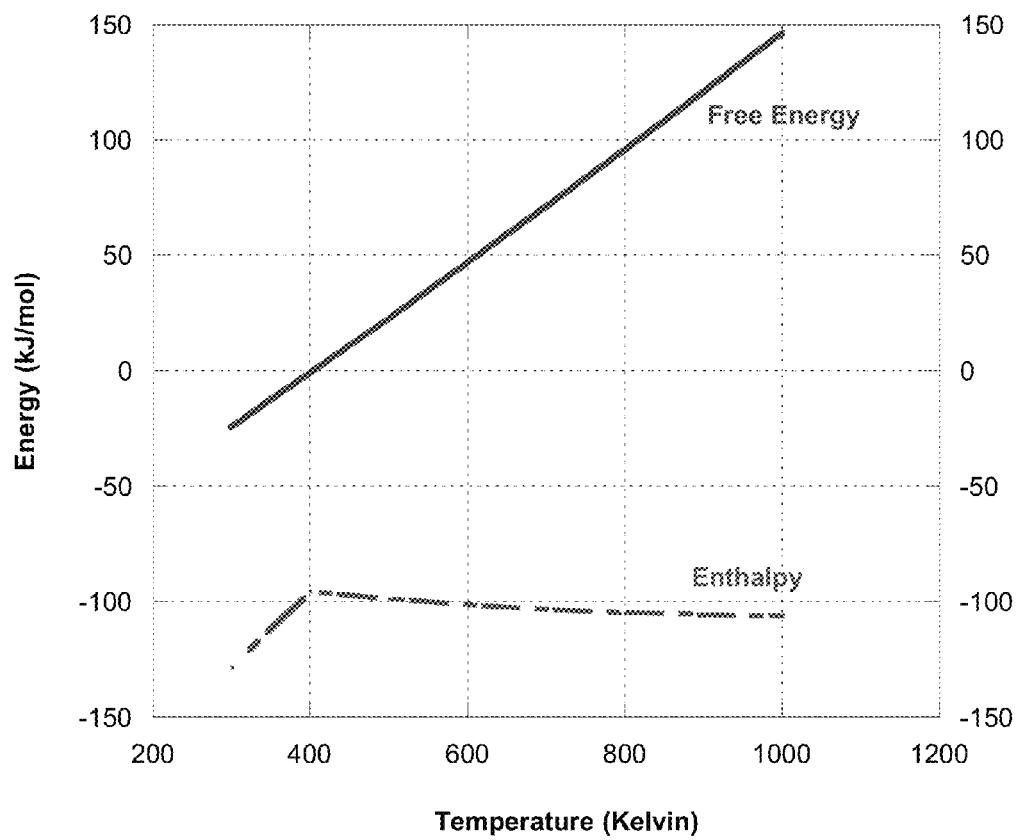
FIG. 1 is a graph illustrating the free energy versus enthalpy for the chemical reduction of carbon monoxide to methanol.

As used throughout this disclosure, the singular forms "a," "an," and "the" include plural reference unless the context clearly dictates otherwise.

All technical and scientific terms used herein have the same meanings as commonly understood by one of ordinary skill in the art to which this invention belongs, excepting terms, phrases, and other language defined herein. All publications mentioned herein are cited for the purpose of describing and disclosing the embodiments. Nothing herein is to be construed as an admission that the embodiments described are not entitled to antedate such disclosures by virtue of prior invention.

Before the present devices and processes are described, it is to be understood that this invention is not limited to the particular devices, processes, methodologies or protocols described, as these may vary. It is also to be understood that the terminology used in the description is for the purpose of describing the particular versions or embodiments only, and is not intended to limit the scope of the present invention which will be limited only by the appended claims. For simplicity, each reference referred to herein shall be deemed expressly incorporated by reference in its entirety as if fully set forth herein.

One embodiment of the invention is a device and method for the production of hydrocarbons using a carbon source and a hydrogen source in an electrolytic reaction. A second embodiment of the invention is a device and method for the production of hydrocarbons using a carbon source and a hydrogen in an plasma reaction. A third embodiment of the invention is a device and method for the production of hydrocarbons using a carbon source, and hydrogen source in an ultrasonic reaction. All reactions may be powered from energy harnessed from a renewable resource, such as solar and/or wind.

The Fischer-Tropsch process is a way to produce hydrocarbons (liquid) from gas in the presence of a catalyst at high temperature and pressure. See e.g., H. H. Storch, N. Golumbic and R. B. Anderson, *The Fischer-Tropsch and related syntheses*, John Wiley & Sons, New York (1951). The present devices and methods seek to run reactions at much lower temperature and pressure than the The Fischer-Tropsch, such as less than about 5 atmosphere and less than about 200° C. The present devices and methods seek to kinetically drive the reactions with energy derived from renewable sources, such as wind and solar. The renewable energy is supplied to the reactions described herein as electrical energy, ultrasonic energy, plasma energy, and combinations thereof.

I. Device and Method for the Production of Hydrocarbons Using an Electrolytic Reaction.

The first method and device involves producing hydrocarbons, and preferably hydrocarbons, from a carbon source and a hydrogen source in an electrolytic reaction.

Electro-Hydrocarbon Devices

The electro-hydrocarbon devices may comprise, for example, a first input for accepting a gaseous influent comprising a carbon source, such as at least one of carbon monoxide gas and carbon dioxide gas; a second input for accepting a hydrogen source, such as an influent selected from the group consisting of water-containing influents and hydrogen-containing influents; an electrical power source; a cathode connected to the electrical power source and exposed to the first input; an anode connected to the electrical power source and exposed to the second input; and an electrolyte connecting the anode and cathode. In the electro-hydrocarbon device, electrical power from the electrical power source causes reduction of the gases at the cathode to form hydrocarbons.

The device may be used to accomplish a process comprising contacting a gaseous influent comprising at least one of carbon monoxide gas and carbon dioxide gas with a cathode; contacting an influent selected from the group consisting of water-containing influents and hydrogen-containing influents with an anode connected to the cathode by an electrolyte; and applying an electrical potential between the cathode and the anode. The electrical potential applied between the cathode and the anode causes reduction of the gases at the cathode to form hydrocarbons.

Accordingly, the electro-hydrocarbon device may function by driving hydrogen ions from the anode through the electrolyte to the cathode, where the hydrogen ions participate in the reduction of carbon monoxide and/or carbon dioxide to form hydrocarbons.

The gaseous influent that is contacted with the cathode of the electro-hydrocarbon devices may be from any applicable supply of carbon monoxide gas and/or carbon dioxide gas including, for example, the atmosphere, industrial combustion processes, syngas, and so forth. Preferably, the influent may be pre-treated in order to remove undesirable contaminants and/or inerts that might detrimentally affect the functioning of the electro-hydrocarbon devices. For example, contaminants and inerts that might poison the cathode or adsorb onto the cathode, thus affecting the cathode's ability to catalyze the reduction of carbon monoxide gas and/or carbon dioxide gas to hydrocarbons, preferably may be removed before the influent is contacted with the cathode of the electro-hydrocarbon devices. Such contaminants and inerts potentially include, but are not limited to, heavy metals such as lead, iron, copper, zinc, and mercury; sulfur-containing species such as hydrogen sulfide and mercaptans; arsenic; amines; carbon monoxide (CO) in some instances; nitrogen ($N_2$); nitrogen oxides ($NO_x$); ammonia ($NH_3$); sulfur dioxide ($SO_2$); hydrogen sulfide ($H_2S$); organic heterocyclic compounds containing nitrogen or sulfur; and so forth.

In a preferred embodiment, the gaseous influent to the cathode of the electro-hydrocarbon device consists essentially of carbon monoxide gas. In another preferred embodiment, the gaseous influent to the cathode of the electro-hydrocarbon device consists essentially of carbon dioxide gas. In a further preferred embodiment, the gaseous influent to the cathode of the electro-hydrocarbon device consists essentially of carbon monoxide and carbon dioxide gas.

The influent that is contacted with the anode of the electro-hydrocarbon devices may be a hydrogen-containing influent because hydrogen, or hydrogen ions, is a direct reactant in the reduction of carbon monoxide and carbon dioxide to hydrocarbons. Alternatively, the influent that is contacted with the anode of the electro-hydrocarbon devices may be a water-containing influent. In the case of a water-containing influent, the water is hydrolyzed at the anode to release hydrogen ions that travel through the electrolyte to the cathode to participate in the reduction of carbon monoxide and carbon dioxide to hydrocarbons. Oxygen gas is a by-product of this reaction and is vented off of the anode and released to the atmosphere from the electro-hydrocarbon device.

Without desiring to be limited thereto, it is believed that the following exemplary overall reactions for the reduction of carbon monoxide and carbon dioxide to hydrocarbons occur at the cathode and anode of the electro-hydrocarbon device.

For the conversion of carbon monoxide into alcohols:

$$nCO+(2n)H_2 \leftrightarrow C_nH_{(2n+1)}OH+(n-1)H_2O \qquad (1.1)$$

For the conversion of carbon dioxide into alcohols:

$$(1.2) nCO_2+(3n)H_2 \leftrightarrow C_nH_{(2n+1)}OH+(2n-1)H_2O$$

Accordingly, exemplary half-reactions for the production of methanol and ethanol from carbon monoxide and carbon dioxide can be written as follows.

For the conversion of carbon monoxide to methanol, the following half-reactions are believed to take place:
Cathode:

$$CO+4H^++4e^- \leftrightarrow CH_3OH \qquad (2.1)$$

Anode:

$$2H_2 \leftrightarrow 4H^++4e^- \qquad (2.2)$$

Overall:

$$CO+2H_2 \leftrightarrow CH_3OH \qquad (2.3)$$

For the conversion of carbon monoxide to ethanol, the following half-reactions are believed to take place:
Cathode:

$$2CO+8H^++8e^- \leftrightarrow CH_3CH_2OH+H_2O \qquad (3.1)$$

Anode:

$$4H_2 \leftrightarrow 8H^++8e^- \qquad (3.2)$$

Overall:

$$2CO+4H_2 \leftrightarrow CH_3CH_2OH+H_2O \qquad (3.3)$$

For the conversion of carbon dioxide to methanol, the following half-reactions are believed to take place:
Cathode:

$$CO_2+6H^++6e^- \leftrightarrow CH_3OH+H_2O \qquad (4.1)$$

Anode:

$$3H_2 \leftrightarrow 6H^+ + 6e^- \quad (4.2)$$

Overall:

$$CO_2 + 3H_2 \leftrightarrow CH_3OH + H_2O \quad (4.3)$$

For the conversion of carbon dioxide to ethanol, the following half-reactions are believed to take place:
Cathode:

$$2CO_2 + 12H^+ + 12e^- \leftrightarrow CH_3CH_2OH + 3H_2O \quad (5.1)$$

Anode:

$$6H_2 \leftrightarrow 12H^+ + 12e^- \quad (5.2)$$

Overall:

$$2CO_2 + 6H_2 \leftrightarrow CH_3CH_2OH + 3H_2O \quad (5.3)$$

The hydrogen that is consumed in the exemplary half-reactions listed above, as explained, may be produced by electrolysis of water, preferably using renewable energy, where the influent to the second input is a water-containing influent. Accordingly, taking into account this associated reaction, the overall reactions for the electro-hydrocarbon device as a whole could be written as follows in the case of a water-containing influent.

For the conversion of carbon monoxide into alcohols:

$$nCO + (n+1)H_2O \leftrightarrow C_nH_{(2n+1)}OH + nO_2 \quad (6.1)$$

For the conversation of carbon dioxide into alcohols:

$$nCO_2 + (n+1)H_2O \leftrightarrow C_nH_{(2n+1)}OH + (3n/2)O_2 \quad (6.2)$$

Accordingly, taking into account this associated reaction, exemplary half-reactions for the production of methanol and ethanol from carbon monoxide and carbon dioxide could be written as follows.

For the conversion of carbon monoxide to methanol, the following half-reactions are believed to take place:
Cathode:

$$CO + 4H^+ + 4e^- \leftrightarrow CH_3OH \quad (7.1)$$

Anode:

$$2H_2O \leftrightarrow H^+ + 4e^- + O_2 \quad (7.2)$$

Overall:

$$CO + 2H_2O \leftrightarrow CH_3OH + O_2 \quad (7.3)$$

For the conversion of carbon monoxide to ethanol, the following half-reactions are believed to take place:
Cathode:

$$2CO + 8H^+ + 8e^- \leftrightarrow CH_3CH_2OH + H_2O \quad (8.1)$$

Anode:

$$4H_2O \leftrightarrow 8H^+ + 8e^- + 2O_2$$

Overall:

$$2CO + 3H_2O \leftrightarrow CH_3CH_2OH + 2O_2 \quad (8.3)$$

For the conversion of carbon dioxide to methanol, the following half-reactions are believed to take place:
Cathode:

$$CO_2 + 6H^+ + 6e^- \leftrightarrow CH_3OH + H_2O \quad (9.1)$$

Anode:

$$3H_2O \leftrightarrow 6H^+ + 6e^- + 3/2O_2 \quad (9.2)$$

Overall:

$$CO_2 + 2H_2O \leftrightarrow CH_3OH + 3/2O_2 \quad (9.3)$$

For the conversion of carbon dioxide to ethanol, the following half-reactions are believed to take place:

Cathode:

$$2CO_2 + 12H^+ + 12e^- \leftrightarrow CH_3CH_2OH + 3H_2O \quad (10.1)$$

Anode:

$$6H_2O \leftrightarrow 12H^+ + 12e^- + 3O_2 \quad (10.2)$$

Overall:

$$2CO_2 + 3H_2O \leftrightarrow CH_3CH_2OH + 3O_2 \quad (10.3)$$

The electro-hydrocarbon devices described herein facilitate the reactions described above and therefore are useful for the production of hydrocarbons, and in particular $C_1$ alcohols, and preferably methanol, ethanol, propanol, butanol, pentanol, heptanol, and other lower alcohols, from gaseous influents comprising at least one of carbon monoxide and carbon dioxide. These alcohols provide, among other benefits, an energy-dense and relatively clean burning combustible source of thermal energy. Additionally, the electro-hydrocarbon devices provide methods of applying electrical energy to force the reactions shown above.

The methods and devices described herein are not limited to the production of alcohols, and include the production of any suitable hydrocarbon, such as alcohols, alkanes, alkenes, alkynes, aromatic hydrocarbons, ethers, aldehydes, ketones, carboxylic acids, esters, amines, and any organic, carbon-containing molecule having a carbon content of about 12 carbon atoms or less containing one or more of the following groups: alcohol, alkane, alkene, alkyne, ether, aldehyde, ketone, carboxylic acid, ester, and amine.

The hydrocarbons produced by the reactions described herein may be used as further reactants. For example, the hydrocarbons may be used as a feedstock for the production of plastics. For example, the hydrocarbons may be used as a reactant in the further production of higher carbon-content hydrocarbons. The further production using the produced hydrocarbon may be by a process described herein or by a traditional hydrocarbon synthesis process. It is possible to further react the produced hydrocarbon to form synthetic petrochemicals. These include petroleum ether, certain solvents, gasoline, kerosene, fuel for heating and diesel fuel, lubricating oils, petroleum jelly, paraffin wax, and pitch, or tar.

The hydrocarbons produced by the reactions described herein may be used as fuels or stored in a fuel container. It is possible to use the hydrocarbons produced by the reactions described in an internal or external combustion engine. The hydrocarbons produced by the reactions described herein may be oxidized, burned, or combusted in an engine or fuel cell installed in any suitable vehicle, such as an automobile, aircraft, or military vehicle. It is possible to oxidize the produced hydrocarbon in a traditional combustion engine. Additionally, the devices/reactors described herein may also be installed into any such combustion engine, such that the hydrocarbons produced by the reactor may be oxidized to power the engine.

For example, a vehicle, such as a car may have solar panels installed on its roof. These solar panels collect sunlight and convert the solar energy into electricity. The electricity generated may then be used to power the electrolytic reaction described in this Section I or any of the other reactions described in Sections II and III.

The alcohols methanol and ethanol are preferred products of the electro-hydrocarbon device and its associated operating process. For example, it may be preferable that the gaseous influent to the cathode of the electro-hydrocarbon device consist essentially of carbon monoxide gas and the alcoholic effluent from the cathode to comprise methanol. It also may be preferred that the gaseous influent to the cathode of the electro-hydrocarbon device consist essentially of carbon monoxide gas and the alcoholic effluent from the cathode to comprise ethanol. Alternatively, it may be preferable that the gaseous influent to the cathode of the electro-hydrocarbon device consist essentially of carbon dioxide gas and the alcoholic effluent from the cathode to comprise methanol. In another alternative, it also may be preferred that the gaseous influent to the cathode of the electro-hydrocarbon device consist essentially of carbon dioxide gas and the alcoholic effluent from the cathode to comprise ethanol.

The electro-hydrocarbon device preferably operates at a temperature in the range from less than about 50° C. to less than about 900° C. Preferably, the electro-hydrocarbon device operates at a temperature less than about 400° C. More preferably, the electro-hydrocarbon device operates at a temperature less than about 200° C. A lower operating temperature of the electro-hydrocarbon device is desirable because of reduced energy costs to operate the device and because, as explained in more detail later, lower temperatures thermodynamically favor the reduction of carbon monoxide and carbon dioxide to alcohols.

The electro-hydrocarbon device preferably operates at a pressure in the range from less than about 1 atm to about 50 atm. Preferably, the electro-hydrocarbon device operates at a pressure less than about 10 atm. More preferably, the electro-hydrocarbon device operates at a pressure less than about 5 atm. Even more preferably, the electro-hydrocarbon device operates at a pressure less than about 1 atm. A lower operating pressure of the electro-hydrocarbon device may be desirable because of reduced energy costs to operate the device. However, a higher operating pressure may be desirable because, as indicated in Equations 1.1 and 1.2 above and in accordance with Le Chatelier's principle, the equilibrium systems will respond to an increase in pressure by shifting towards the products of the reaction. Accordingly, the benefit of lower energy costs may be weighed against the disadvantages of operating the electro-hydrocarbon devices at lower pressures, such as lower equilibrium conversion of the reactants to alcohols and potentially reduced reaction rates.

Modern industrial processes for the synthesis of alcohols, primarily methanol, from CO and/or $CO_2$ and $H_2$ (i.e., "syngas") generally fall into two categories: high-pressure syntheses, where reactors are operated at about 100 atm to about 600 atm in pressure and at about 250° C. to about 400° C. and $ZnO/Cr_2O_3$ catalysts typically are employed; and low-pressure syntheses, where reactors are operated at about 20 atm to about 100 atm in pressure and at about 230° C. to about 300° C. and CuO/ZnO catalysts which generally contain chromium promoters (e.g., $Cr_2O_3$) or aluminum promoters (e.g., $Al_2O_3$) typically are employed. Traditional syngas syntheses do not use electrical current or potential to drive the reduction of carbon monoxide and carbon dioxide to alcohols.

The electro-hydrocarbon devices described herein advantageously may be capable of functioning at lower temperatures and pressures than traditional $CO/CO_2$ alcohol syntheses. For example, the electro-hydrocarbon devices may function at temperatures of less than about 900° C., more preferably at less than about 400° C., even more preferably at less than about 200° C., and most preferably at less than about 50° C. while maintaining reaction rates approximating, equivalent to, or even superior to the reaction rates of traditional syngas-alcohol syntheses. The electro-hydrocarbon device may function at pressures of less than about 50 atm, more preferably less than about 10 atm, even more preferably less than about 5 atm, and most preferably less than about 1 atm, again while maintaining reaction rates approximating, equivalent to, or even superior to the reaction rates of traditional syngas-alcohol syntheses. Accordingly, the electro-hydrocarbon devices described herein potentially represent a significant energy savings vis-à-vis the traditional syngas-alcohol syntheses.

Because lower reaction temperatures thermodynamically favor the production of alcohols from carbon monoxide and carbon dioxide reactants, the electro-hydrocarbon devices may produce a higher equilibrium conversion of reactants to alcohols than is accomplished using traditional, higher temperature syngas-alcohol syntheses.

Figure 2:
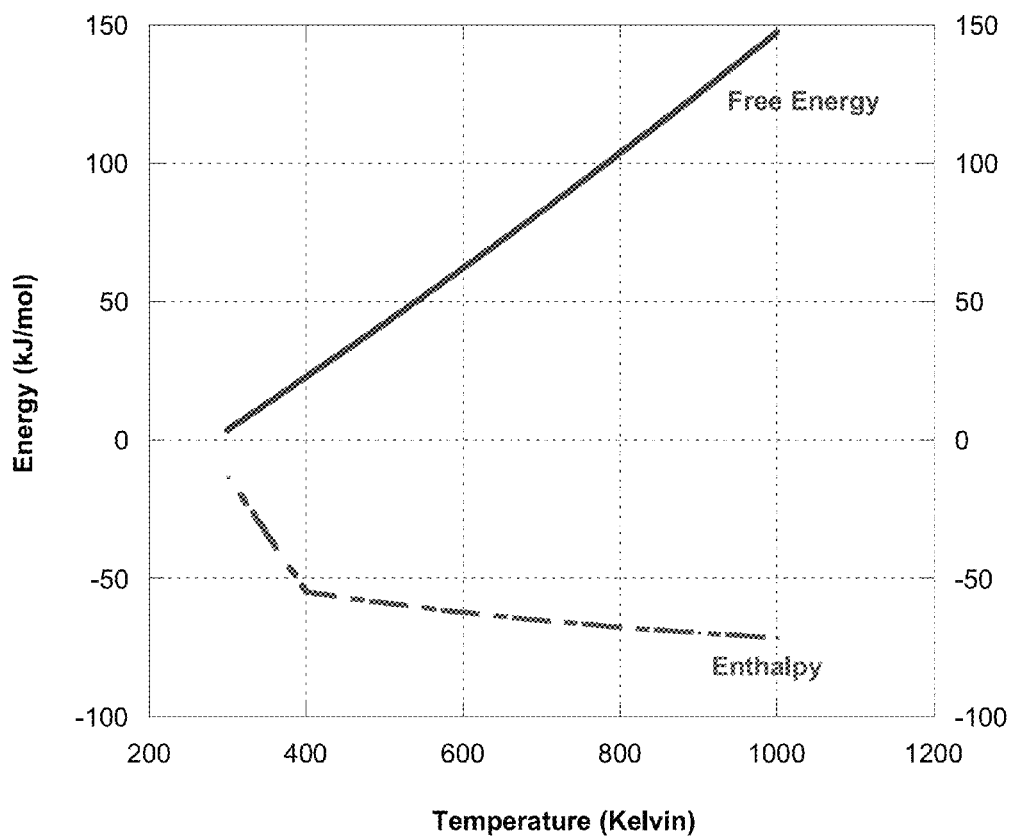
FIG. 2 is a graph illustrating the free energy versus enthalpy for the chemical reduction of carbon dioxide to methanol.

FIGS. 1 and 2 illustrate the free energy vs. enthalpy of, respectively, the production of methanol from carbon monoxide (Equation 2.3: $CO+2H_2 \leftrightarrow CH_3OH$) and the production of methanol from carbon dioxide (Equation 4.3: $CO_2 + 3H_2 \leftrightarrow CH_3OH+H_2O$). In FIG. 1 for the production of methanol from carbon monoxide, it is apparent that the free energy ($\Delta G$) of the reaction increases with increasing reaction temperature. Likewise in FIG. 2 for the production of methanol from carbon dioxide, it is apparent that the free energy of the reaction increases with increasing reaction temperature. It is believed that similar relationships between reaction temperature and free energy are to be found for the production of other alcohols (e.g., proponal, butanol, pentanol, and heptanol) from carbon monoxide and carbon dioxide.

A lower free energy thermodynamically favors the production of the products of an equilibrium reaction. Accordingly, it is advantageous from a thermodynamic perspective for the production of alcohols by the reduction of carbon monoxide or carbon dioxide to proceed at a lower temperature, thus favoring a higher equilibrium production of alcohols. The single-pass yield of the electro-hydrocarbon devices (e.g., the percent conversion of the cathodic influent without a recycle stream) is limited to the theoretical maximum equilibrium conversion at the reaction temperature, as dictated by the free energy.

Of course, lower reaction temperatures also typically have a negative impact on reaction rate. Accordingly, the desirability of an increased conversion of reactants to products (i.e. increased production of alcohols at equilibrium) must be weighed against the speed with which this conversion is desired to take place. Nevertheless, because the reduction of carbon monoxide and carbon dioxide to form alcohols is driven by electric current or potential in the electro-hydrocarbon devices, it is believed that an acceptable rate of reaction may be achieved even at low temperatures that thermodynamically favor high conversion of the carbon monoxide and carbon dioxide reactants to alcohol products.

The electro-hydrocarbon devices therefore facilitate the production of alcohols from carbon monoxide and carbon dioxide because the electro-hydrocarbon devices are capable of functioning at lower temperatures than traditional syngas-alcohol syntheses, and thus achieving higher equilibrium conversion of the reactants to alcohols, while still maintaining a relatively high reaction rate.

An additional advantage of the electro-hydrocarbon devices is that the devices may be simpler, smaller, readily scaleable, and can even be made to be portable. Because traditional syngas-alcohol syntheses take place at relatively high temperatures and pressures, the chemical process equipment used to perform industrial scale syngas-alcohol syntheses is complex, large, not easily scaleable, and not portable. Current industrial scale syngas-alcohol equipment is expensive to produce and complex to design and implement. The electro-hydrocarbon devices described herein, in comparison, may be less expensive to produce and more simple to design, implement, and maintain because, for example, they involve less components and operate at less strenuous conditions. Additionally, the electro-hydrocarbon devices are less dangerous to operate than industrial syngas-alcohol equipment because of the lower pressures and temperatures at which the electro-hydrocarbon devices are capable of operating.

The cathode of the electro-hydrocarbon devices may comprise various electrocatalysts (or "alcohol catalysts"). Electrocatalysts include, in general, applicable metal catalysts, metal-supported catalysts, metal-oxide supported catalysts, and superconducting materials.

In regards to electrocatalysts for the production of methanol, the following exemplary list of catalysts may be used as electro-catalytic cathodes in the electro-hydrocarbon devices described herein:

various metal-supported catalysts, for example using the metals copper (Cu), silver (Ag), nickel (Ni), ruthenium (Ru), rhenium (Rh), and palladium (Pd), and supports such as zinc oxide (ZnO), zirconia ($ZrO_2$), aluminum oxide ($Al_2O_3$), titanium dioxide ($TiO_2$), silica ($SiO_2$), and ceria ($CeO_2$);

$ZnO/Cr_2O_3$ catalysts;

Cu-based catalysts (CuB), optionally doped with chromium (Cr), zirconium (Zr), or thorium (Th);

Cu/ZnO and CuO/ZnO catalysts, preferably aluminum ($Al_2O_3$), chromium ($Cr_2O_3$), cesium ($CeO_2$), or zirconium ($ZrO_2$) promoted, such as $Cu/ZnO/Al_2O_3$ and $Cu/ZnO/ZrO_2$, and optionally doped with metals such as Al, Sc, Cr, Mg, Mn, Rh, Rn, Ti, and Zr, and ions thereof;

$Cu—Mo_{0.3}Zr_{0.7}O_2$ (M=Ce, Mn, and Pr) catalysts;

Cu catalysts supported on ultrapure silica or γ-alumina supports and with Ca, Zn, and La oxide promoters (e.g., $Ca/Cu/SiO_2$, $Zn/Cu/SiO_2$, and $La/Cu/SiO_2$);

$Cu/ZnO/ZrO_2/Al_2O_3/Ga_2O_3$;

alloys of copper with hafnium, zirconium and in particular thorium;

various intermetallic alloys such as catalysts derived nickel from rare earth metals like lanthanum;

binary thorium-copper alloys;

intermetallic lanthanide-copper alloys ($CeCu_x$, where x=1.3 to 3.2) such as $CeCu_2$, preferably with Ti, Zr, or Al for improved resistance to carbon dioxide poisoning;

zirconia-supported catalysts such as $Cu/ZrO_2$, $Au/ZrO_2$, and $Pd/ZrO_2$, preferably made from chloride or sulfate starting salts such as copper chloride and zirconium sulfate and optionally silver promoted;

Cu(100) and Ni/Cu(100);

the superconductor $YBa_2Cu_3O_7$; and ceria-supported palladium ($Pd—CeO_2$).

In regards to electrocatalysts for the production of ethanol, the following exemplary list of catalysts may be used as electro-catalytic cathodes in the electro-hydrocarbon devices described herein:

alkali-doped $ZnO—Cr_2O_3$, Zr—Zn—Mn—Pd, Cu—ZnO, and $Cu—ZnO—Al_2O_3$;

modified Fischer-Tropsch catalysts such as alkali-doped $CuO—CoO—Al_2O_3$, $CuO—CoO—ZnO—Al_2O_3$, and alkali-promoted $NiO—TiO_2$ catalysts;

alkali-doped sulfides such as $MoS_2$;

promoted $Rh—SiO_2$ catalysts such as those promoted with Li salts ($Rh—Li—SiO_2$);

composite catalysts of copper-rare earth oxide catalysts (e.g., $Cu—La_2Zr_2O_7$) mixed with an HY zeolite;

$K—MoO_3—γAl_2O_3$ catalysts with varied loading of Mo to select for ethanol or other desired oxygenate products;

rhodium catalysts promoted by reducible metal-oxides such as $Fe_2O_3$, MnO or $TiO_2$;

$Rh_{10}Se—TiO_2$ catalysts;

Rm—Sm—$V/SiO_2$ catalysts;

tetragonal $ZrO_2$ and Pd modified $ZrO_2$ catalysts;

$Rh/Al_2O_3$ catalysts promoted with manganese (Mn); and silica supported cobalt (10 w/o) or iron (5 w/o) catalysts.

In regards to catalysts for the production of $C_{3+}$ alcohols and other oxygenates, the following exemplary list of catalysts may be used as electro-catalytic cathodes in the electro-hydrocarbon devices described herein:

cesium (Cs) promoted Cu—ZnO methanol catalysts and potassium (K) promoted $Cu_{0.5}Mg_5CeO_x$ catalysts, preferably for the production of isobutanol, and optionally combined in a dual catalyst configuration with a methanol catalyst (e.g., $Cs—Cu—ZnO—Cr_2O_3$ and $Cs—ZnO—Cr_2O_3$) in order to produce methyl isobutyl ether (MIBE), methyl tertiary butly ether (MTBE), and dimethyl ether (DME) in various ratios via direct coupling of methanol and isobutanol;

monoclinic $ZrO_2$ and Pd modified $ZrO_2$ catalysts, preferably for the production of isobutanol;

$CuO—ZnO—ZrO_2—Fe_2O_3—MoO_3—ThO_2—Cs_2O$ catalysts, preferably for the production of $C_{3+}$ alcoholshydrocarbons; and cobalt catalysts supported on silica aerogel, preferably for the production of $C_9$-$C_{15}$ hydrocarbons.

The following publications describing catalysts that may be useful as electro-catalytic cathodes in the electro-hydrocarbon devices are incorporated herein by reference in their entirety:

X-M. Liu, G. Q. Lu, Z-F. Yan and J. Beltramini, *Recent advances in catalysts for methanol synthesis via hydrogenation of CO and $CO_2$*, Industrial Engineering Chemical Research, vol. 42, p. 6518-6530 (2003);

J. Skrzpek, M. Lachowska, M. Grzesik, J. Sloczynski and P. Nowak, *Thermodynamics and kinetics of low pressure methanol synthesis*, The Chemical Engineering Journal, vol. 58, p. 101-108 (1995);

E. Blasiak, Polish Patent PRL 34000 (1947);

H-B. Chen, D-W. Liao, L-J. Yu, Y-J. Lin, J. Yi, H-B. Zhang and K-R. Tsai, *Influence of trivalent metal ions on the surface structure of a copper-based catalyst for methanol synthesis*, Applied Surface Science, vol. 147, p. 85-93 (1999);

G. C. Chinchen, P. J. Denny, D. G. Parker, M. S. Spencer and D. A. Whan, *Mechanism of methanol synthesis from $CO_2$/$CO/H_2$ mixtures over copper/zinc oxide/alumina catalysts: use of 14C-labelled reactants*, Applied Catalyst, vol. 30, p. 333-338 (1987);

E. G. Baglin, G. B. Atkinson and L. J. Nicks, *Methanol synthesis catalysts from thorium-copper intermetallics. Preparation and evaluation*, Industrial Engineering Chemical Production Research Development, vol. 20, p. 87-90 (1981);

J. R. Jennings, R. M. Lambert, R. M. Nix, G. Owen and D. G. Parker, *Novel methanol synthesis catalysts derived from intermetallic precursors: $CO_2$ poisoning and molecular mechanism of the synthesis reaction*, Applied Catalysis, vol. 50, p. 157-170 (1989);

J. Weigel, R. A. Koeppel, A. Baiker and A. Wokaun, *Surface species in CO and $CO_2$ hydrogenation over copper/zirconia: On the methanol synthesis mechanism*, Langmuir, vol. 12, p. 5319-5329 (1996);

A. Baiker and D. Gasser, Journal of Faraday Transactions, vol. 85(4), p. 999 (1989);

J. S. Lee, K. I. Moon, S. H. Lee, S. Y. Lee and Y. G. Kim, *Modified $Cu/ZnO/Al_2O_3$ catalysts for methanol synthesis from $CO_2/H_2$ and $CO/H_2$*, Catalysis Letters, vol. 34, p. 93-99 (1995);

Y. Nitta, T. Fujimatsu, Y. Okamoto and T. Imanaka, *Effect of starting salt on catalytic behaviour of Cu—$ZrO_2$ catalysts in methanol synthesis from carbon dioxide*, Catalysis Letters, vol. 17, p. 157-165 (1993);

J. F. Deng, Q. Sun, Y. L. Zhang, S. Y. Chen and D. A. Wu, *A novel process for preparation of a Cu/ZnO/Al2O3 ultrafine catalyst for methanol synthesis from $CO_2+H_2$: comparison of various preparation methods*, Applied Catalysis: A, vol. 139, p. 75-85 (1996);

J. Weigel, C. Frohlich, A. Baiker and A. Wokaun, *Vibrational spectroscopic study of IB metal/zirconia catalysts for the synthesis of methanol*, Applied Catalysis A: General, vol. 140, p. 29-45 (1996);

A. Gotti and R. Prins, *Basic metal oxides as cocatalysts for $Cu/SiO_2$ catalysts in the conversion of synthesis gas to methanol*, Journal of Catalysis, vol. 178, p. 511-519 (1998);

J. Nerlov and I. Chokendorff, *Methanol synthesis from $CO_2$, CO and $H_2$ over Cu(100) and Ni/Cu(100)*, Journal of Catalysis, vol. 181, p. 271-279 (1999);

J. B. Hansen, in *Handbook of Heterogenous Catalysis*, ed. G. Ertl, H. Knozinger and J. Weitkamp, V C H, Weinheim, p. 1856 (1997);

J. Wambach, A. Baiker and A. Wokaun, *$CO_2$ hydrogenation over metal/zirconia catalysts*, Physical Chemistry-Chemical Physics, vol. 1, p. 5071-5080 (1999);

L. Z. Gao and C. T. Au, *$CO_2$ hydrogenation to methanol on a $YBa_2Cu_3O_7$ catalyst*, Journal of Catalysis, vol. 189, p. 1-15 (2000);

Y. Matsumura, W-J. Shen, Y. Ichihashi and M. Okumura, *Low-temperature methanol synthesis catalyzed over ultrafine palladium particles supported on cerium oxide*, Journal of Catalysis, vol. 197, p. 267-272 (2001);

B. J. Liaw and Y. Z. Chen, *Liquid-phase synthesis of methanol from $CO_2/H_2$ over ultrafine CuB catalyst*, Applied Catalysis: A, vol. 206, p. 245 (2001);

H-B. Chen, D-W. Liao, L-J. Yu, Y-J. Lin, J. Yi, H-B. Zhang and K-R. Tsai, *Influence of trivalent metal ions on the surface structure of a copper-based catalyst for methanol synthesis*, Applied Surface Science, vol. 147, p. 85-93 (1999);

J. Slozynski, R. Grabowski, A. Kozlowska, P. Olszewski, M. Lachowska, J. Skrzypek and J. Stoch, *Effect of Mg and Mn oxide additions on structural and adsorptive properties of $Cu/ZnO/ZrO_2$ catalysts for the methanol synthesis from $CO_2$*, Applied Catalysis A: General, vol. 249, p. 129-138 (2003);

K. A. Pokrovski and A. T. Bell, *Effect of the dopants on the activity of $Cu—Mo_{0.3}Zr_{0.7}O_2$ (M=Ce, Mn and Pr) for CO hydrogenation to methanol*, Journal of Catalysis, vol. 244, p. 43-51 (2006);

H. H. Storch, N. Golumbic and R. B. Anderson, *The Fischer-Tropsch and related syntheses*, John Wiley & Sons, New York (1951);

G. Natta, U. Colombo and I. Pasquon, in *Catalysis*, ed. P. H. Emmett, vol. V, Chapter 3, Reinhold Publishing Co., New York (1957);

P. Di Raffaele, A. Paggini and V. Lagana, French Patent 2,482,583;

W. Keim and W. Falter, Catalysis Letters, vol. 3, p. 59 (1989);

K. Smith and R. B. Anderson, Journal of Canadian Chemical Engineering, vol. 61, p. 40 (1983);

K. J. Smith and R. B. J. Anderson, Journal of Catalysis, vol. 85, p. 428 (1984);

J. G. Nunan, C. E. Bogdan, R. G. Herman and K. Klier, Catalysis Letters, vol. 2, p. 49 (1989);

P. Courty, D. Durand, E. Freund and A. Sugier, Journal of Molecular Catalysis, vol. 17, p. 241 (1982);

S. Uchiyama, Y. Ohbayashi, T. Hayasaka and N. Kawata, Applied Catalysis, vol. 42, p. 143 (1988);

W. P. Dianis, Applied Catalysis, vol. 30, p. 99 (1987);

H. Kusama, K. Okabe, K. Sayama and H. Arakawa, *$CO_2$ hydrogenation to ethanol over promoted Rh—$SiO_2$ catalysts*, Catalysis Today, vol. 28, p. 261-266 (1996);

R. Kieffer, M. Fujiwara, L. Udron and Y. Souma, *Hydrogenation of CO and $CO_2$ toward methanol, alcohols and hydrocarbons on promoted copper-rare earth oxides catalysts*, Catalysis Today, vol. 36, p. 15-24 (1997);

K. Klier, A. Beretta, Q. Sun, O. C. Feeley and R. G. Herman, *Catalytic synthesis of methanol, higher alcohols and ethers*, Catalysis Today, vol. 36, p. 3-14 (1997);

G-Z. Bian, L. Fan, Y-L. Fu and K. Fujimoto, *High temperature calcined K—$MoO_3$-$\gamma Al_2O_3$ catalysts for mixed alcohols synthesis from syngas: Effects of Mo loadings*, Applied Catalysis A: General, vol. 170, p. 255-268 (1998);

H. Kurkata, Y. Izumi and K. Aika, Chemistry Communications, p. 389-390 (1996);

A-M. Hilmen, M. Xu, M. J. L. Gines and E. Iglesia, *Synthesis of higher alcohols on copper catalysts supported on alkali-promoted basic oxides*, Applied Catalysis A: General, p. 355-372 (1998);

M. Lachowska, *Synthesis of higher alcohols. Enhancement by the addition of methanol or ethanol to the syngas*, Reaction Kinetic Catalysis Letters, vol. 67(1), p. 149-154 (1999);

H. Y. Luo, W. Zhang, H. W. Zhou, S. Y. Huang, P. Z. Lin, Y. J. Ding and L. W. Lin, *A study of Rh—Sm—$V/SiO_2$ catalysts for the preparation of $C_2$-oxygenates from syngas*, Applied Catalysis A: General, vol. 214, p. 161-166 (2001);

D. He, Y. Ding, H. Luo and C. Li, *Effects of zirconia phase on the synthesis of higher alcohols over zirconia and modified zirconia*, Journal of Molecular Catalysis A: Chemical, vol. 208, p. 267-271 (2004);

M. Ojeda, M. L. Granados, S. Rojas, P. Terreros, F. J. Garcia and J. L. G. Fierro, *Manganese-promoted $Rh/Al_2O_3$ for $C_2$-oxygenates synthesis from syngas. Effect of manganese loading*, Applied Catalysis A: General, vol. 261, p. 47-55 (2004);

B. C. Dunn, P. Cole, D. Covington, M. G. Webster, R. J. Pugmire and G. P. Huffman, *Silica aerogel supported catalysts for Fischer-tropsch synthesis*, Applied Catalysis A: General, vol. 278, p. 233-238 (2005);

Y. A. Ryndin, R. F. D. Hicks, A. T. Bell and Y. I. Yermakov, *Effects of metal-support interactions on the synthesis of methanol over palladium*, J. Catal., vol. 70, p. 287 (1981);

W. E. Wallace, Proceedings of Int. Symp. Hydrides for Energy Storage, Pergamon Press, ed. A. F. Andresen and A. J. Maeland (1977);

G. B. Atkinson and L. J. Nicks, *Mischmetal-nickel alloys as methanation catalysts*, J. Catal., vol. 46, p. 417 (1977);

E. G. Baglin, G. B. Atkinson and L. J. Nicks, U.S. Pat. No. 4,181,630 (1980);

E. G. Baglin, G. B. Atkinson and L. J. Nicks, *Methanol synthesis catalysts from thorium-copper intermetallics. Preparation and Evaluation*, Ind. Eng. Chem. Prod. Res. Dev., vol. 20, p. 87-90 (1981);

S. J. Bryan, J. R. Jennings, S. J. Kipling, G. Owen, R. M. Lambert and R. M. Nix, Appl. Catal., vol. 40, p. 173 (1988);

K. Klier, V. Chatikanvangi, R. G. Herman and G. W. Simonds, *Catalytic synthesis of methanol from $CO/H_2$: IV. The effects of carbon dioxide*, J. Catal., vol. 74, p. 343 (1982);

C. Liu, D. Willcox, M. Garland and H. H. Kung, J., *The rate of methanol production on a copper-zinc oxide catalyst: The dependence on the feed composition*, Catal., vol. 90, p. 139 (1984);

G. G. Chinchen, P. J. Denny, D. G. Parker, M. S. Spencer and D. A. Whan, Appl. Catal., vol. 30, p. 333, (1987);

M. Muhler, E. Tornqvist, L. P. Nielsen and B. S. Clausen, *On the role of adsorbed atomic oxygen and $CO_2$ in copper based methanol synthesis catalysts,* Catal. Lett., vol. 25, p. 1 (1994);

J. Weigel, R. A. Koeppel, A. Baiker and A. Wokaun, *Surface species in CO and $CO_2$ hydrogenation over copper/zirconia: on the methanol synthesis mechanism*, Langmuir, vol. 12, p. 5319-5329 (1996);

D. Mignard, M. Sahibzada, J. Duthie and H. W. Whittington, *Methanol synthesis from flue-gas $CO_2$ and renewable electricity: a feasibility study.* Int. J. Hydrogen Energy, vol. 28, p. 455-464 (2003);

V. A. Pena-O'Shea, N. N. Menendez, J. D. Tornero and J. L. G. Fiero. *Unusually high selectivity to $C_{2+}$ alcohols on bimetallic CoFe catalysts during CO hydrogenation,* Catal. Lett., vol. 88, p. 123-128 (2003);

X. M. Ma, G. D. Lin and H. B. Zhang, *Co-decorated carbon nanotube-supported Co—Mo—K sulphide catalyst for higher alcohol synthesis*, Catal. Lett., vol. 111, p. 141-151 (2006);

M. M. Bhasin, W. T. Bartley, P. C. Ellgen and T. P. Wilson, J. Catal., vol. 54, p. 120 (1985);

M. Ichikawa, T. Fukushima and K. Shikakura, Proc. 8$^{th}$ ICC (Berlin), 11-69 (1984);

M. Xu and E. Iglesia, *Initial carbon-carbon bond formation during synthesis gas conversion to higher alcohols on K—Cu—$Mg_5CeO_x$ catalysts,* Catal. Lett., vol. 51, p. 47-52 (1998);

M. Saito, M. Takeuchi, T. Fujitani, J. Toyir, S. Luo, J. Wu, K. Ushikoshi, K. Mori and T. Watanabe, *Advances in the research between NIRE and RITE for developing a novel technology for methanol synthesis from $CO_2$ and $H_2$,* ICCDU V Karlruhe (1999);

M. Sahibzada, I. S. Metcalfe and D. Chadwick, *Methanol synthesis from $CO/CO_2$—$H_2$ over $Cu/ZnO/Al_2O_3$ at differential and finite conversions,* Journal of Catalysis, vol. 174(2), p. 111-118 (1998); and Y. Matsumura, W-J. Shen, Y. Ichihashi and M. Okumura, *Low-temperature methanol synthesis catalyzed over ultrafine palladium particles supported on cerium oxide*, Journal of Catalysis, vol. 197, p. 267-272 (2001).

Other catalysts also may be selected for use as electrocatalysts in the electro-hydrocarbon devices in accordance with the description herein.

The electrolyte of the electro-hydrocarbon devices may comprise various ionic conductors. Preferably, the electrolyte is selected from the group of protonic conductors. For example, protonic conductors comprising polymeric materials and solid acids may be preferred for low temperature (e.g., about 80° C. to about 300° C.) operation of the electro-hydrocarbon device. Protonic conductors comprising ceramic mixed oxides such as cerates and zirconates may be preferred for high temperature (e.g., about 500° C. to about 900° C.) operation of the electro-hydrocarbon device. Preferably, the protonic conductor will have an ionic conductivity (a) between about 0.01 S/cm to about 0.1 S/cm.

In regards to polymeric materials and solid acids, the following exemplary list of protonic conductors may be used as electrolytes in the electro-hydrocarbon devices described herein:

polyetheretherketone (PEEK) membranes;

solid acids consisting of $CsHSO_4$, preferably for operation of the device at temperatures from about 150° C. to about 160° C.;

silicon oxide nafion composite membranes, preferably for operation of the device at about 80° C. to about 140° C.;

polybenzimidazole (PBI) electrolyte membranes, preferably for operation of the device at temperatures from about 120° C. to about 200° C.;

poly(aryl ether sulfone) copolymers containing 2,5-biphenylpyridine and tetramethyl biphenyl, preferably for operation of the device at temperatures from about 130° C. to about 400° C.;

nafion/titanium dioxide composite membranes, preferably for operation of the device at temperatures from about 80° C. to about 120° C. and at relative humidity from about 26% to about 100%;

poly-2,5-benzimidazole (ASPBI), preferably for operation of the device at temperatures up to about 200° C.;

amorphous cesium thio-hydroxogermanate, preferably for operation of the device at temperatures from about 100° C. to about 275° C. and at low relative humidity;

$NH_4PO_3$—$(NH_4)_2SiP_4O_{13}$ composites, preferably for operation of the device at temperatures up to about 250° C.;

nanohybrid membranes of zirconia/polytetramethylene oxide, preferably for operation of the device at temperatures from about 150° C. to about 300° C.;

nanoporous proton-conducting membranes based on polytetrafluoroethylene (PTFE), preferably for operation of the device at temperatures of about 130° C.; and nanoporous proton-conducting membranes consisting of ceramic powder, polymer binder (polytetrafluoroethylene, PTFE) and aqueous acid, preferably for operation of the device at temperatures up to about 300° C.

In regards to ceramic mixed oxides, the following exemplary list of protonic conductors may be used as electrolytes in the electro-hydrocarbon devices described herein:

perovskites of the form $ABO_3$ such as $BaZrO_3$, $SrZrO_3$, $BaCeO_3$, and $SrCeO_3$ doped with rare earth oxides, preferably for operation of the device at temperatures above about 600° C.;

mixed perovskites of the type $A_2B'B''O_6(AB'_{1/2}B''_{1/2}O_3)$ where A is $Ba^{+2}$ and B' and B'', respectively, are trivalent ions (Er, Gd, La, Yb, and Ca) and pentavalent ions (Nb, Ta, and Te);

zirconate perovskites consisting of $SrZr_{0.90}Y_{0.10}O_{3-\alpha}$ at temperatures from about 550° C. to about 750° C.;

$BaCe_{0.9}Y_{0.1}O_{3-\alpha}$ preferably for operation of the device in atmospheres containing at least about 9% $CO_2$;

Ce-doped $Ba_2In_2O_5$ prepared from nanopowders, preferably for operation of the device at temperatures from about 100° C. to about 300° C.;

other proton conducting acceptor-doped perovskite alkaline earth cerates, zirconates, niobates, and titanates such as $Sr(Ce_{0.9}Y_{0.1})O_{3-\alpha}$, $Ba_2YSnO_{5.5}$, $Ba(Zr_{0.9}Y_{0.1})O_{3-\alpha}$, $Ba_3Ca_{1.17}Nb_{1.83}O_{9-\alpha}$, $Sr(Zr_{0.9}Y_{0.1})O_{3-\alpha}$, $Ba(Ti_{0.95}Sc_{0.05})O_{3-\alpha}$, and $Sr(Ti_{0.95}Sc_{0.05})O_{3-\alpha}$; and other Ba—Zr, Sr—CE, and Ba—Ce mixed oxides.

The following publications describing protonic conductors that may be useful as electrolytes in the electro-hydrocarbon devices are incorporated herein by reference in their entirety:

S. M. Halle, D. A. Boysen, C. R. I. Chisholm and R. B. Merle, *Solid acids as fuel cell electrolytes*, Nature, vol. 410, p. 910-913 (2001);

K. T. Adjemian, S. J. Lee, S. Srinivasan, J. Benziger and A. B. Bocarsly, *Silicon oxide Nafion composite membranes for*

*proton-exchange membrane fuel cell operation at 80-140° C.*, Journal of the Electrochemical Society, vol. 149(3), p. A256-A261 (2002);

Y. L. Ma, J. S. Wainright, M. H. Litt and R. F. Savinell, *Conductivity of PBI membranes for high-temperature polymer electrolyte fuel cells*, Journal of the Electrochemical Society, vol. 151(1), p. A8-A16 (2004);

E. K. Pefkianakis, V. Deimede, M. K. Daletou, N. Gourdoupi and J. K. Kallitis, *Novel polymer electrolyte membrane, based on pyridine containing poly (ether sulfone), for application in high-temperature fuel cells*, Macomolecular Rapid Commiunications, vol. 26, p. 1724-1728 (2005);

E. Chalkova, M. B. Pague, M. V. Fedkin, D. J. Wesolowski and S. N. Lvov, *Nafion/$TiO_2$ proton conductive composite membranes for PEMFCs operating at elevated temperature and reduced relative humidity*, Journal of the Electrochemical Society, vol. 152(6), p. A1035-A1040 (2005);

J. A. Asensio and P. Gomez-Romero, *Recent developments on proton conducting poly2,5-benzimidazole (APBI) membranes for high temperature polymer electrolyte membrane fuel cells*, Fuel Cells, vol. 5(3), p. 336-343 (2005);

S. A. Poling, C. R. Nelson and S. W. Martin, *New intermediate temperature proton conductors: hydrated heavy alkali thio-hydroxogermanates*, Materials Letters, vol. 60, p. 23-27 (2006);

X. Chen, Z. Huang and C. Xia, *Fabrication and characterization of solid state proton conductor $(NH_4)_2SiP_4O_{13}$—$NH_4PO_3$ for fuel cells operated at 150-250° C.*, Solid State Ionics, vol. 177, p. 2413-2416 (2006);

J-D. Kim and I. Honma, *High-temperature-tolerant, proton-conducting polytetramethylene oxide/zirconia hybrid membranes*, Journal of the Electrochemical Society, vol. 151(9), p. A1396-A1401 (2004);

S. Reichman, T. Duvdevani, A. Aharon, M. Philosoph, D. Golodnitsky and E. Peled, *A novel PTFE-based proton-conductive membrane*, Journal of Power Sources, vol. 153, p. 228-233 (2006);

S. Reichman, A. Ulus and E. Peled, *PTFE-based solid polymer electrolyte membrane for high-temperature fuel cell applications*, Journal of the Electrochemical Society, vol. 154(3), p. B327-333 (2007);

M. J. Scholten, J. Schoonman, J. C. van Miltenburg and H. A. J. Oonk, *Synthesis of strontium and barium cerate and their reaction with carbon dioxide*, Solid State Ionics, vol. 61, p. 83-91 (1993);

S. V. Bhide and A. V. Virkar, *Stability of $AB_{1/2}'B_{1/2}''O_3$-type mixed perovskite proton conductors*, Journal of the Electrochemical Society, vol. 146(12), p. 4386-4392 (1999);

G. Karagiannakis, S. Zisekas and M. Stoukides, *Hydrogenation of carbon dioxide on copper in a H+ conducting membrane-reactor*, Solid State Ionics, vol. 162-163, p. 313-318 (2003);

N. Zakowsky, S. Williamson and J. T. S. Irvine, *Elaboration of $CO_2$ tolerance limits of $BaCe_{0.9}Y_{0.1}O_{3-\alpha}$ electrolytes for fuel cells and other applications*, Solid State Ionics, vol. 176, p. 3019-3026 (2005);

R. Hui, R. Maric, C. Deces-Petit, E. Styles, W. Qu, X. Zhang, J. Roller, S. Yick, D. Ghosh, K. Sakata, and M. Kenji, *Proton conduction in ceria*-doped $Ba_2In_2O_5$ *nanocrystaffine ceramic at low temperature*, Journal of Power Sources, vol. 161, p. 40-46 (2006); and K. D. Kreuer, *Aspects of the formation and mobility of protonic charge carriers and the stability of perovskite-type oxides*, Solid State Ionics, vol. 125, p. 285-302 (1999).

Other protonic conductors also may be selected for use as electrolytes in the electro-hydrocarbon devices in accordance with the description herein.

The anode of the electro-hydrocarbon devices may comprise various materials. Platinum-based materials may be preferred for use as the anode in the electro-hydrocarbon devices.

The following exemplary list of materials may be used as anodes in the electro-hydrocarbon devices described herein: platinum-ruthenium; platinum-iridium; $IrO_2$; and ultrafine $IrO_2$ powder combined with platinum.

The following publications describing materials that may be useful as anodes in the electro-hydrocarbon devices are incorporated herein by reference in their entirety:

P. Millet, *Water electrolysis using eme technology: electric potential distribution inside a nafion membrane during electrolysis*, Electrochim. Acta, vol. 39(17), p. 2501-2506 (1994);

K. Ledjeff, F. Mahlendorf, V. Peinecke and A. Heinzel, *Development of electrode/membrane units for the reversible solid polymer fuel cell*, vol. 40(3), p. 315-319 (1995);

K. Onada, T. Murakami, T. Hikosaka, M. Kobayashi, R. Notu and K. Ito, Journal of Electrochemical Society, vol. 149, A1069 (2002);

E. Slavcheva, I. Radev, S. Bliznakov, G. Topalov, P. Andreev and E. Budevski, *Sputtered iridium oxide films as electrolysis for water splitting via PEM electrolysis*, Electrochemica Acta, vol. 52, 2007, p. 3889-3894 (2007); and T. Ioroi, N. Kitazawa, K. Yasuda, Y. Yamamoto and H. Takenaka, *Iridium oxide/platinum electrocatalysts for unitized regenerative polymer electrolyte fuel cells*, Journal of the Electrochemical Society, vol. 147(6), p. 2018-2022 (2000).

Other materials also may be selected for use as anodes in the electro-hydrocarbon devices in accordance with the description herein.

Selection of the particular type of material for use as the cathode, electrolyte, or anode in the electro-hydrocarbon devices described herein may depend upon numerous factors. The following are exemplary factors one or more of which may be considered by one of skill in the art when selecting materials for use in the electro-hydrocarbon devices described herein depending on whether the material is to be used as the cathode, electrolyte, or anode:

the desired temperature, pressure, and electrical potential at which the electro-hydrocarbon device is to operate;

the desired rate of reaction and reaction equilibrium point (i.e. maximum single-pass yield);

the material's resistance to poisoning, for example, by the adsorption of reactants (e.g., carbon monoxide, carbon dioxide, water, and hydrogen), products (e.g. alcohols, oxygen, and hydrogen), reaction contaminants or impurities (e.g., sulfur and ammonia), and inerts;

the material's cost;

the material's mechanical durability;

the material's coefficient of thermal expansion (e.g., how closely the coefficients of the cathodic material and the anodic material are to the coefficient of the electrolyte material);

whether or not the cathodic material and anodic material will undergo a solid state reaction with the electrolyte material;

the material's thermal stability (e.g., no dramatic phase changes over the temperature range at which it operates and no interdiffusion of constituent elements between the cathode and electrolyte and between the anode and electrolyte);

the material's electronic or protonic conductivity;

the material's selectivity;

the material's resistance to the formation of reaction product layers;

the material's oxidative stability over a large range of oxygen partial pressures; and the material's electro-catalytic activity (including, for example, the material's surface area, particle size, and dispersion of active sites).

One of skill in the art also may recognize and consult other factors in order to select cathodic, anodic, and electrolyte materials for use in the electro-hydrocarbon device. Exemplary desirable properties of the electrolyte materials include the following: a specific ionic conductivity of greater than about $10^{-2}$ S/cm to minimize resistive losses (electrical conductivity not required); ionic conductivity over a wide range of gaseous and liquid chemical compositions; chemical stability; and thermodynamic stability when in contact with the cathodic and anodic materials. Exemplary desirable properties of the cathodic and anodic materials include the following: thermodynamic stability when in contact with the electrolyte; electrical conductivity; ionic conductivity; electro-catalytic activity; the ability to produce three-phase boundary structures; and tolerance to gaseous and liquid poisons. Additionally, it is preferred that the cathodic, anodic, and electrolyte materials have similar coefficients of expansion and high dimensional stability during fabrication of the electro-hydrocarbon device.

The electro-hydrocarbon devices can be physically configured in various fashions. Described herein are two exemplary configurations for the devices.

Figure 3:
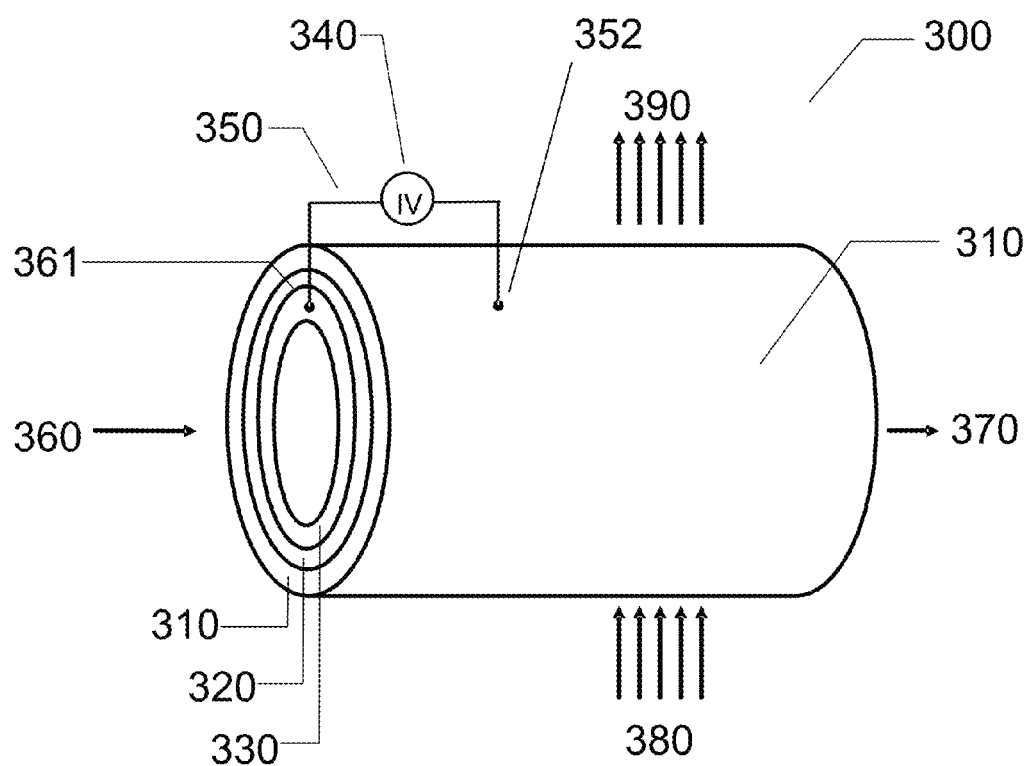
FIG. 3 illustrates an exemplary electro-hydrocarbon device and process described herein.

FIG. 3 illustrates an exemplary physical configuration of an electro-hydrocarbon device. In FIG. 3, the electro-hydrocarbon device 300 is configured as a cylindrical unit. The cylinder wall has three layers—the exterior anode 310, the electrolyte 320, and the interior cathode 330. An electrical power source 340 is connected to the anode 310 and cathode 330 by external circuit wiring 350, cathodic electro-contact 361, and anodic electro-contact 352. A gaseous influent 360 comprising at least one of carbon monoxide and carbon dioxide flows through the interior of the cylinder, thus contacting the cathode 330. Water 380 in the form of a vapor, steam, or liquid travels across the exterior of the cylinder, thus contacting the anode 310. The electrical power source 340 creates an electrical potential between the cathode 330 and the anode 310 that drives the electrolysis of water to create hydrogen ions and liberate oxygen in effluent 390. The hydrogen ions travel from the anode 310 through the electrolyte 320 to reach the cathode 330, where they react with carbon monoxide and/or carbon dioxide to create hydrocarbons in effluent 370.

Alternatively, the cathode and anode in FIG. 3 could be switched, as well as the respective influent and effluent streams so that that cathode is on the exterior of the cylindrical unit, the gaseous influent containing carbon monoxide and/or carbon dioxide contacts the exterior cathode, the anode is on the interior of the unit, and the water-containing influent contacts the anode on the interior of the unit.

Figure 4:
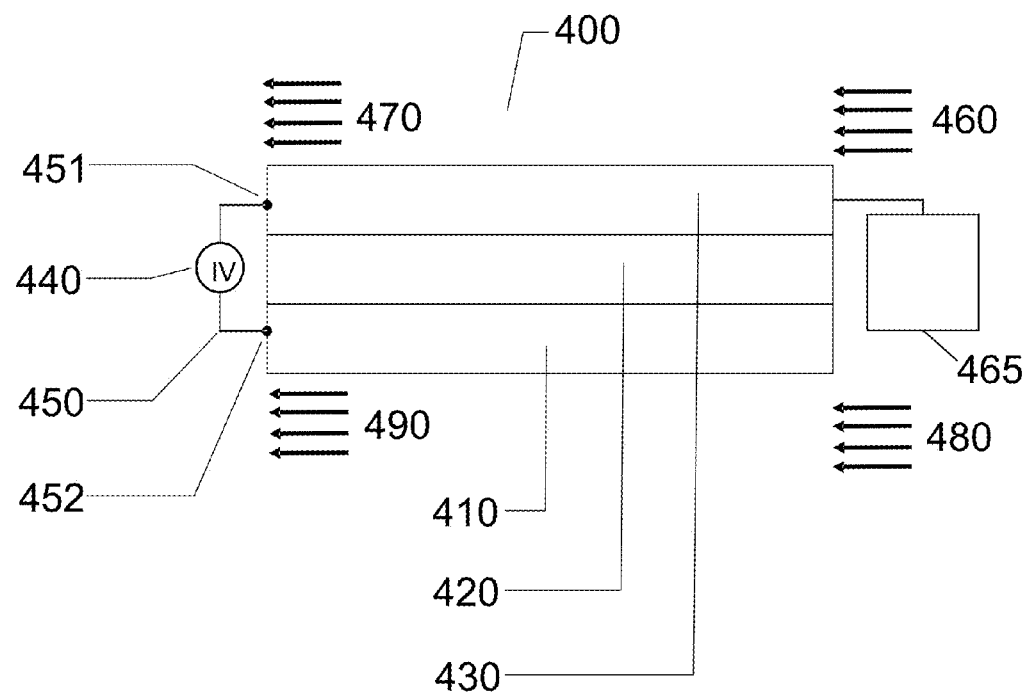
FIG. 4 illustrates an exemplary electro-hydrocarbon device and process described herein.

FIG. 4 illustrates a second exemplary physical configuration of an electro-hydrocarbon device. In FIG. 4, the electro-hydrocarbon device 400 is configured as a plate-like unit. The plate has three layers—the anode 410, the electrolyte 420, and the cathode 430. An electrical power source 440 is connected to the anode 410 and cathode 430 by external circuit wiring 450, cathodic electro-contact 451, and anodic electro-contact 452. A gaseous influent 460 comprising at least one of carbon monoxide and carbon dioxide flows across the plate, thus contacting the cathode 430. Water 480 in the form of a vapor, steam, or liquid flows across the opposite side of the plate, thus contacting the anode 410. The electrical power source 440 creates an electrical potential between the cathode 430 and the anode 410 that drives the electrolysis of water to create hydrogen ions and liberate oxygen in effluent 490. The hydrogen ions travel from the anode 410 through the electrolyte 420 to reach the cathode 430, where they react with carbon monoxide and/or carbon dioxide to create hydrocarbons in effluent 470.

Although the electro-hydrocarbon devices illustrated in FIGS. 3 and 4 are described in reference to a water-containing influent being contacted with the anode, it will be appreciated that the water-containing influent instead could be substituted with a hydrogen influent. Use of a hydrogen influent may be desirable because electrolysis of water would not have to be accomplished. However, use of a hydrogen influent may be undesirable because of the cost associated with obtaining such an influent; use of a water influent allows direct production of hydrogen, preferably using electricity from a renewable energy source.

In order to maximize contact between the carbon monoxide and/or carbon dioxide containing influent and the cathode, and contact between the water-containing influent or hydrogen-containing influent and the anode, the influents preferable are made to be turbulent, for example, by the inclusion of random packing such as Raschig rings and other saddles, rings, balls, and so forth that induce turbulent flow of a fluid. Additionally, the flow rate with which the cathodic influents and anodic influents are delivered to, respectively, the cathode and anode may be adjusted in order to vary the contact that the influent has with its respective electrode.

The hydrocarbons that are produced at the electro-hydrocarbon device's cathode and the oxygen that is produced at the electro-hydrocarbon device's anode are separated from each other by, in FIG. 3, the cylindrical cathode/electrolyte/anode body or, in FIG. 4, the planar cathode/electrolyte/anode body. For example, in FIG. 3 the alcohol exits the cathode at 370 whereas the oxygen exits the anode at 390. In FIG. 4 the alcohol exits the cathode at 470 whereas the oxygen exits the anode at 490. An arrangement where the effluent from the cathode and the effluent from the anode are separated is highly desirable because mixing of the cathodic and anodic effluents may result in combustion of the hydrocarbons and oxygen given the low heat of combustion of lower hydrocarbons and the temperatures at which the electro-hydrocarbon devices may operate.

The hydrocarbons produced at the cathode of the electro-hydrocarbon device may be emitted from the device either as liquids or, because it may be necessary to operate the device at temperatures high enough to vaporize the alcohol, as gases. If the hydrocarbons produced at the cathode of the electro-hydrocarbon device are emitted as gases, then the hydrocarbons subsequently can be condensed to a liquid as is commonly known in the art.

The devices of FIGS. 3 and 4 may be packaged as unit cells and connected in a parallel fashion (e.g., a stacked array of unit cells) in order to form larger electro-hydrocarbon devices with increased processing capacity.

A water electrolysis device may be designed similar to the electro-hydrocarbon devices described herein and may be used to produce hydrogen gas and/or hydrogen ions from a water-containing input. In an electrolysis device, the cathodic, anodic, and electrolyte materials and the device's operating conditions may be selected in a manner intended to maximize the device's efficiency or ability to electrolyze water in order to produce hydrogen gas and/or hydrogen ions. Preferably, the electric power used to operate the electrolysis device is obtained from a renewable energy source. Accordingly, an electrolysis device configured similar to the electro-hydrocarbon devices described herein and operating using electrical power from a renewable energy source provides a process to store renewable energy in the form of hydrogen gas and provides a process to provide a renewable source of hydrogen from the electrolysis of water. For example, a process for renewably producing hydrogen gas or hydrogen ions from a water-containing influent may comprise: contacting a first influent with a cathode; contacting a water-containing influent with an anode connected to the cathode by an electrolyte; and applying an electrical potential between the cathode and the anode; wherein the electrical potential causes reduction of at least a component of the first influent at the cathode and oxidation of the water-containing influent at the anode to produce hydrogen gas or hydrogen ions.

Combined Deoxygenation/Electro-Hydrocarbon Device

A combined deoxygenation/electro-hydrocarbon device also may be used for the electrolytic production of hydrocarbons from gaseous, carbonaceous influents. The combined deoxygenation/electro-hydrocarbon device may comprise a first input for accepting a gaseous influent, the gaseous influent comprising carbon dioxide gas; a second input for accepting an influent selected from the group consisting of water-containing influents and hydrogen-containing influents; a deoxygenation device connected to the first input and that is capable of reducing at least some of the carbon dioxide gas in the gaseous influent to produce carbon monoxide gas; and an electro-hydrocarbon device connected to the deoxygenation device and the second input and that is capable of reducing at least some of the carbon monoxide gas and any remaining carbon dioxide gas to produce hydrocarbons.

The combined deoxygenation/electro-hydrocarbon device may be used to accomplish a process comprising treating a gaseous influent comprising carbon dioxide gas with a deoxygenation device that is capable of reducing at least some of the carbon dioxide gas in the gaseous influent to produce carbon monoxide gas; and treating the carbon monoxide gas and any remaining carbon dioxide gas with an electro-hydrocarbon device that is capable of reducing at least some of the carbon monoxide gas and any remaining carbon dioxide gas to produce hydrocarbons.

The deoxygenation device used in the combined device may be capable of deoxygenating a carbon dioxide-containing influent in order to produce carbon monoxide. The effluent of the carbon dioxide deoxygenation device therefore may comprise carbon monoxide, optionally with un-reacted carbon dioxide. Alternatively, the deoxygenation device may be deactivated in order to deliver a stream of gaseous carbon dioxide without producing carbon monoxide. Accordingly, the carbon dioxide deoxygenation device may be used to provide a gaseous, carbonaceous influent of varying concentrations of carbon monoxide and/or carbon dioxide that subsequently is used in the electro-hydrocarbon devices described herein.

The concentrations of carbon monoxide and/or carbon dioxide gases output by the deoxygenation device may be varied, for example, by adjusting the electric power delivered to the deoxygenation device (e.g., adjusting voltage and/or amperage) and the residence time in the deoxygenation device of the reactants. For example, the deoxygenation device could be adjusted to reduce substantially all of the carbon dioxide in the influent to carbon monoxide, to reduce some of the carbon dioxide in the influent to carbon monoxide, or reduce substantially none of the carbon dioxide in the influent to carbon monoxide. In this fashion the deoxygenation device has the added benefit of enabling the delivery of a variable mixture of carbon dioxide and carbon monoxide to the electro-hydrocarbon device. An optimal ratio of carbon monoxide and carbon dioxide may be desirable, for example, because of evidence that such optimization may reduce the activation energy of the reduction reaction that occurs in the electro-hydrocarbon device and increase the yield of hydrocarbon products from the electro-hydrocarbon device.

A deoxygenation device may comprise a deoxygenation cathode exposed to a first input; a deoxygenation anode; a deoxygenation electrolyte connecting the deoxygenation cathode and the deoxygenation anode; and a deoxygenation electrical power source connected to the deoxygenation cathode and to the deoxygenation anode.

The deoxygenation device may be useful for accomplishing a process for treating a gaseous influent that comprises carbon dioxide gas. The process comprises contacting the gaseous influent containing carbon dioxide gas with a deoxygenation cathode connected to a deoxygenation anode by a deoxygenation electrolyte; and applying an electrical potential between the deoxygenation cathode and the deoxygenation anode to reduce at least some of the carbon dioxide gas to carbon monoxide gas.

Figure 5:
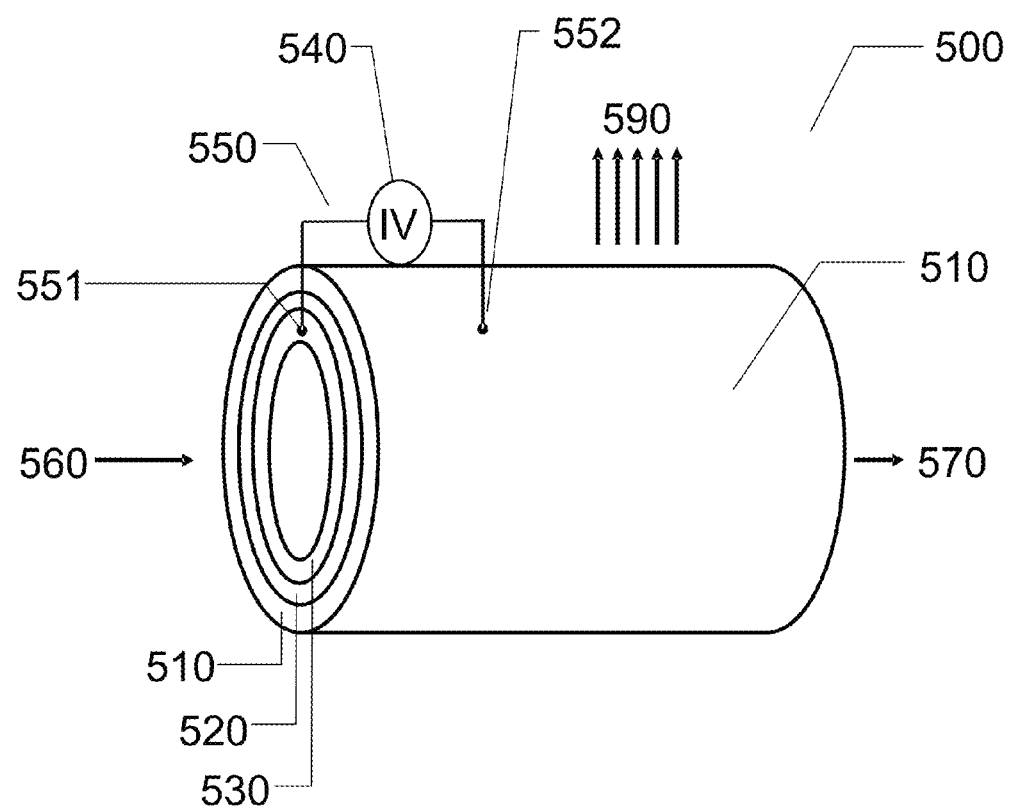
FIG. 5 illustrates an exemplary deoxygenation device and process described herein.

FIG. 5 illustrates a deoxygenation device configured in a manner similar to the cylindrical electro-hydrocarbon device illustrated previously. In FIG. 5, the deoxygenation device 500 is configured as a cylindrical unit. The cylinder wall has three layers—the exterior anode 510, the electrolyte 520, and the interior cathode 530. An electrical power source 540 is connected to the anode 510 and cathode 530 by external circuit wiring 550, cathodic electro-contact 551, and anodic electro-contact 552. A gaseous influent 560 comprising carbon dioxide flows through the interior of the cylinder, thus contacting the cathode 530. The electrical power source 540 creates an electrical potential between the cathode 530 and the anode 510 that drives the reduction of carbon dioxide to carbon monoxide at the cathode. The reduction of carbon dioxide at the cathode liberates oxygen ions that travel from the cathode 530 through the electrolyte 320 to reach the anode 510. At the anode 510, the oxygen ions bind to form oxygen gas that is expelled in effluent 590. The effluent 570 of the electro-hydrocarbon device includes, among other constituents, carbon monoxide (e.g., in the case where substantially all of the carbon dioxide in the influent is reduced to carbon monoxide), carbon dioxide (e.g., in the case where substantially none of the carbon dioxide in the influent is reduced to carbon monoxide), or a mixture of carbon monoxide and carbon dioxide (e.g, in the case where some of the carbon dioxide in the influent is reduced to carbon monoxide).

Alternatively, the cathode and anode in FIG. 5 could be switched, as well as the respective influent and effluent streams so that that cathode is on the exterior of the cylindrical unit, the gaseous influent containing carbon dioxide contacts the exterior cathode, the anode is on the interior of the unit, and oxygen is expelled from the anode on the interior of the unit.

Figure 6:
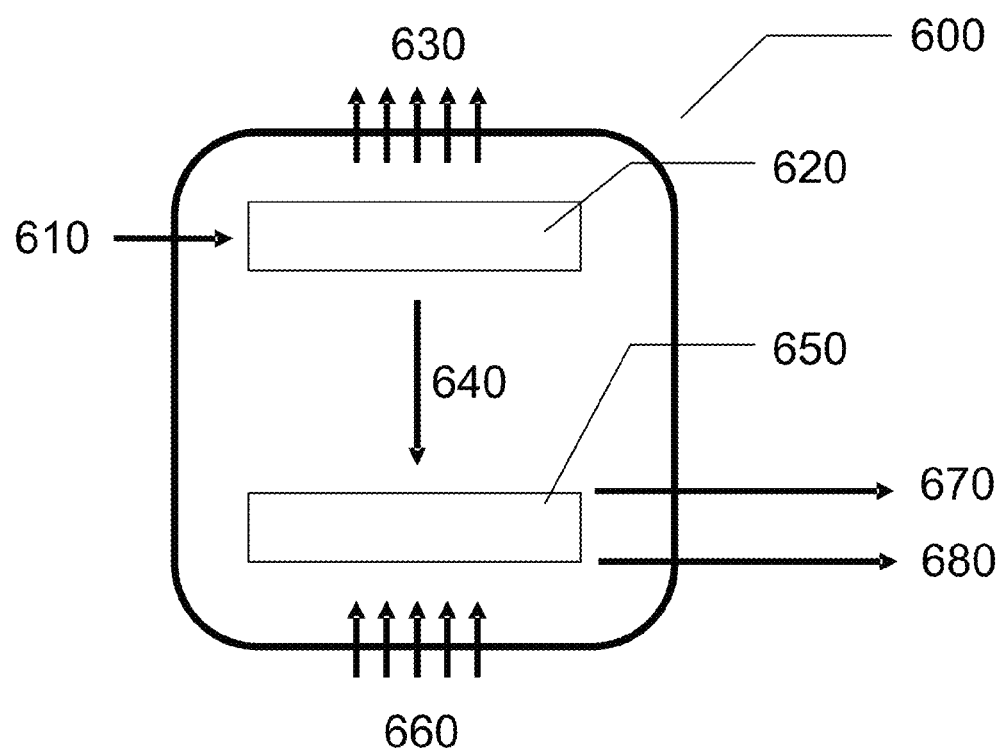
FIG. 6 illustrates an exemplary combined deoxygenation/electro-hydrocarbon device and process described herein.

A combined deoxygenation/electro-hydrocarbon device is depicted in FIG. 6. The combined deoxygenation/electro-hydrocarbon device 600 comprises a deoxygenation device 620 and an electro-hydrocarbon device 650. A gaseous influent comprising carbon dioxide 610 enters the deoxygenation device 620 where some, all, or none of the carbon dioxide is reduced to carbon monoxide. In a preferred embodiment, substantially all of the carbon dioxide is reduced to carbon monoxide. Oxygen 630 is output from the deoxygenation device 620 as well as the stream 640 of carbon monoxide and/or carbon dioxide. The stream 640 of carbon monoxide and/or carbon dioxide subsequently is processed by the electro-hydrocarbon device 650 as well as an influent 660 of water. The electro-hydrocarbon device 650 outputs an alcohol-containing effluent 670 from its cathode as well as an oxygen-containing effluent 680 from its anode. Again, although illustrated as having an influent of water 660, the electro-hydrocarbon device 650 alternatively may have an influent of hydrogen, in which case the electro-hydrocarbon device 650 would not have an oxygen-containing effluent 680.

Figure 7:
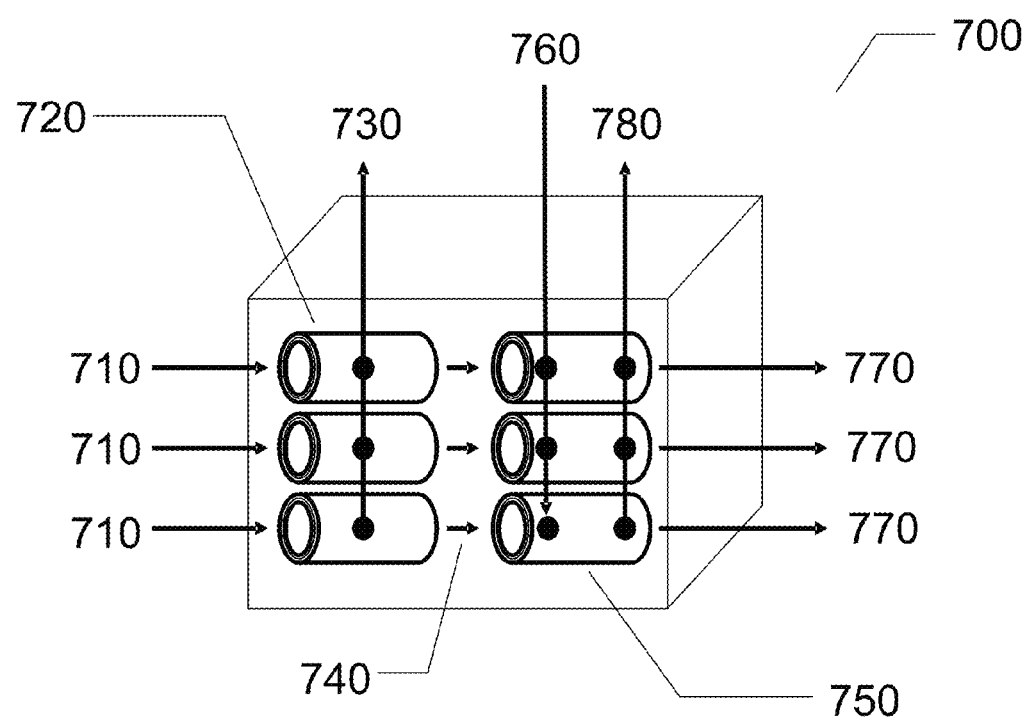
FIG. 7 illustrates an exemplary combined deoxygenation/electro-hydrocarbon device and process described herein.

FIG. 7 illustrates an alternative configuration of a combined deoxygenation/electro-hydrocarbon device 700. In FIG. 7, a parallel array of deoxygenation devices 720 and a parallel array of electro-hydrocarbon devices 750 function in unison. Again, a gaseous influent comprising carbon dioxide 710 enters the array of deoxygenation devices 720 where some, all, or none of the carbon dioxide is reduced to carbon monoxide. In a preferred embodiment, substantially all of the carbon dioxide is reduced to carbon monoxide. Oxygen 730 is output from the array of deoxygenation devices 720 as well as streams 740 of carbon monoxide and/or carbon dioxide. The streams 740 of carbon monoxide and/or carbon dioxide subsequently are processed by the array of electro-hydrocarbon devices 750 as well as an influent 760 of water. The array of electro-hydrocarbon devices 750 outputs hydrocarbon-containing effluent 770 from its cathodes as well as oxygen-containing effluent 780 from its anodes. Again, although illustrated as having an influent of water 760, the array of electro-hydrocarbon devices 750 alternatively may have an influent of hydrogen, in which case the array of electro-hydrocarbon devices 750 would not have an oxygen-containing effluent 780.

The carbon dioxide gas that is processed by the deoxygenation devices described herein may be obtained from a variety of sources including, but not limited to, the atmosphere, industrial combustion processes, and syngas. Like the gaseous influent described previously in regards to the electro-hydrocarbon devices, the influent to the deoxygenation devices may be pre-treated in order to remove undesirable contaminants and/or inerts that might detrimentally affect the functioning of the devices. Poisoning may be caused, for example, by the irreversible adsorption of species on the surface of the cathode/catalyst/electrocatalyst. Thus, contaminants and inerts that might poison the cathode or adsorb onto the cathode, thereby affecting the cathode's ability to catalyze the reduction of carbon dioxide to carbon monoxide, preferably may be removed before the influent is passed into the deoxygenation devices. Such contaminants and inerts potentially include, but are not limited to, heavy metals such as lead, iron, copper, zinc, and mercury; sulfur-containing species such as hydrogen sulfide and mercaptans; arsenic; amines; carbon monoxide (CO) in some instances; nitrogen ($N_2$); nitrogen oxides ($NO_x$); ammonia ($NH_3$); sulfur dioxide ($SO_2$); hydrogen sulfide ($H_2S$); and so forth. The poisons hydrogen sulfide ($H_2S$), ammonia ($NH_3$), carbon monoxide (CO), and organic heterocyclic compounds containing nitrogen or sulfur may be especially strong in some instances, and therefore preferably are removed from the influent. The degree to which contaminants may need to be removed from the influent, and the types of contaminants that may need to be removed, may be dependent upon the choice of electrocatalyst for use as the cathode as well as the operating temperature and pressure of the electro-hydrocarbon device.

The functioning of the deoxygenation device is described by the following half-reactions:

Cathode:

$$CO_2 + 2e^- \leftrightarrow CO + O^{2-} \tag{11.1}$$

Anode:

$$O^{2-} \leftrightarrow \tfrac{1}{2}O_2 + 2e^- \tag{11.2}$$

Overall:

$$CO_2 \leftrightarrow CO + \tfrac{1}{2}O_2 \tag{11.3}$$

As seen in equation 11.1, at the cathode carbon dioxide is reduced to carbon monoxide. The portion of the carbon dioxide influent that is reduced will depend upon the operating conditions of the deoxygenation device including, for example, the device's temperature and pressure, the voltage and amperage of the electrical current or potential applied between the cathode and anode, the residence time in the reactor of the carbon dioxide, the materials chosen for the device's cathode, anode, and electrolyte, and so forth. Accordingly, these parameters may be adjusted in order to achieve the desired operating profile of the device.

Figure 8:
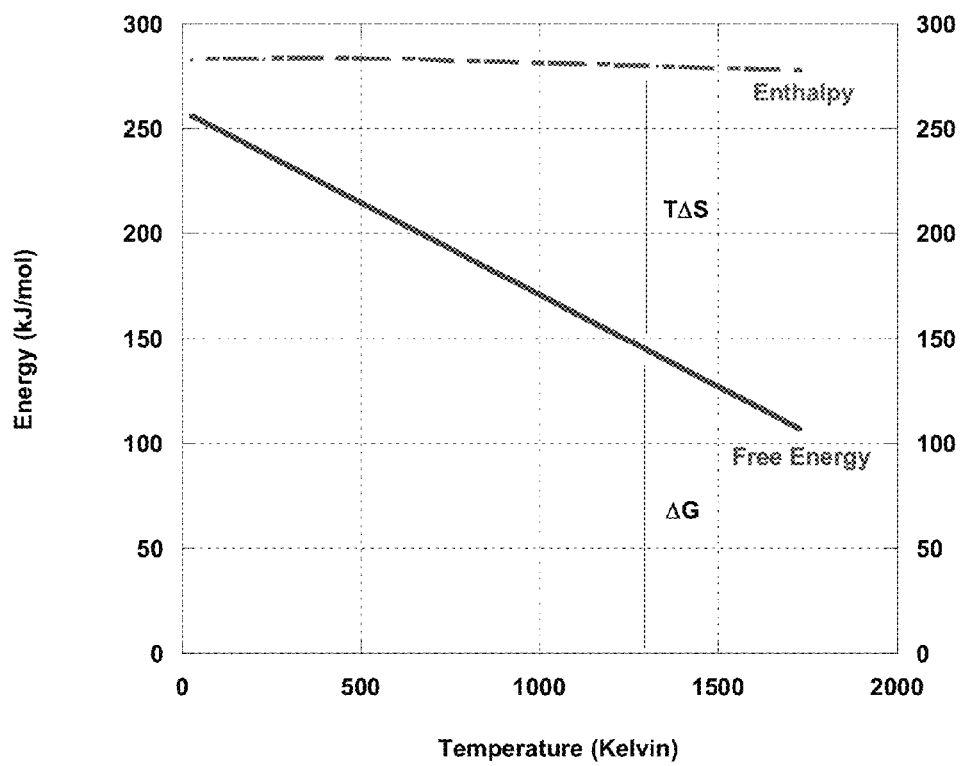
FIG. 8 is a graph illustrating the free energy versus enthalpy for the chemical reduction of carbon dioxide to carbon monoxide.

FIG. 8 illustrates the free energy verses enthalpy for the process taking place in the deoxygenation device. As seen in FIG. 8 the free energy of the reaction is lower at higher temperatures. Accordingly, a higher equilibrium conversion of carbon dioxide to carbon monoxide is attainable at higher temperatures. Therefore, the deoxygenation device may preferably operate at a temperature in the range from about 200° C. to about 1200° C. in order to maximize the single-pass conversion of carbon dioxide into carbon monoxide in the device. Additionally, the deoxygenation device preferably operates at a pressure in the range from less than about 1 atm to about 50 atm.

The cathode of the deoxygenation devices may comprise various materials known to catalyze the deoxygenation of carbon dioxide to carbon monoxide. In particular, lanthanum-based catalysts are preferred for use as the cathode in the deoxygenation device. The following exemplary list of materials may be used as cathodes in the deoxygenation devices described herein: lanthanum strontium manganite (LSM); lanthanum calcia manganite (LCM); lanthanum strontium ferrite (LSF); lanthanum strontium cobalt ferrite (LSCF); lanthanum strontium manganite (LSM)—ytrria stabilized zirconia (YSZ); lanthanum strontium (LSM)—gadolinium doped ceria (GDC); and lanthanum strontium cobalt ferrite (LSCF)—gadolinium doped ceria (GDC).

The electrolyte of the deoxygenation devices may comprise various materials known to conduct oxygen ions. In particular, zirconia-based oxygen ion conductors and doped ceria-based oxygen ion conductors are preferred for use as the electrolyte in the deoxygenation device. In regards to zirconia-based oxygen ion conductors, the following exemplary list of materials may be used as electrolytes in the deoxygenation devices described herein: $ZrO_2$—$Y_2O_3$; $ZrO_2$—$Sc_2O_3$; and $ZrO_2$—$Yb_2O_3$. In regards to ceria-based oxygen ion conductors, the following exemplary list of materials may be used as electrolytes in the deoxygenation devices described herein: $CeO_2$—$Gd_2O_3$; $CeO_2$—$Re_2O_3$; $CeO_2$—$Y_2O_3$; and $CeO_2$—$Sm_2O_3$.

The anode of the deoxygenation devices may comprise various materials known to catalyze the deoxygenation of carbon dioxide to carbon monoxide. Nickel-yttria stabilized zirconia (YSZ), nickel-gadolinium doped ceria (GDC), and ruthenium-yttria stabilized zirconia (YSZ) are preferred materials for use as the anode in the deoxygenation devices.

Selection of the particular type of material for use as the cathode, electrolyte, or anode in the deoxygenation devices described herein may depend upon numerous factors. The following are exemplary factors one or more of which may be considered by one of skill in the art when selecting materials for use in the deoxygenation devices described herein depending on whether the material is to be used as the cathode, electrolyte, or anode:

the desired temperature, pressure, and electrical potential at which the deoxygenation device is to operate;

the desired rate of reaction and reaction equilibrium point (i.e. maximum single-pass yield);

the material's resistance to poisoning, for example, by the adsorption of reactants (e.g., carbon dioxide), products (e.g. carbon monoxide and oxygen), reaction contaminants or impurities (e.g., sulfur and ammonia), and inerts;

the material's cost;

the material's mechanical durability;

the material's coefficient of thermal expansion (e.g., how closely the cathodic material's and anodic material's coefficients are to the coefficient of the electrolyte);

whether or not the cathodic material and anodic material will undergo a solid state reaction with the electrolyte;

the material's thermal stability (e.g., no dramatic phase changes over the temperature range at which it operates and no interdiffusion of constituent elements between the cathode and electrolyte and between the anode and electrolyte);

the material's electronic or oxygen-ion conductivity;

the material's selectivity;

the material's resistance to formation of reaction product layers;

the material's oxidative stability over a large range of oxygen partial pressures; and the material's electro-catalytic activity (including, for example, the material's surface area, particle size, and dispersion of active sites).

One of skill in the art also may recognize and consult other factors in order to select cathodic, anodic, and electrolyte materials for use in the deoxygenation device. Exemplary desirable properties of the electrolyte materials include the following: a specific ionic conductivity of greater than about $10^{-2}$ S/cm to minimize resistive losses (electrical conductivity not required); ionic conductivity over a wide range of gaseous and liquid chemical compositions; chemical stability; and thermodynamic stability when in contact with the cathodic and anodic materials. Exemplary desirable properties of the cathodic and anodic materials include the following: thermodynamic stability when in contact with the electrolyte; electrical conductivity; ionic conductivity; electro-catalytic activity; the ability to produce three-phase boundary structures; and tolerance to gaseous and liquid poisons. Additionally, it is preferred that the cathodic, anodic, and electrolyte materials have similar coefficients of expansion and high dimensional stability during fabrication of the electro-hydrocarbon device.

Exemplary Uses of the Devices

The electro-hydrocarbon, deoxygenation, and combined deoxygenation/electro-hydrocarbon devices are capable of providing many divergent benefits. For example, the electro-hydrocarbon and combined deoxygenation/electro-hydrocarbon devices may be used for the synthesis of hydrocarbons that have a wide variety of beneficial uses.

The devices described herein also may provide environmental benefits such as a reduction in atmospheric carbon dioxide levels by sequestering carbon dioxide from the atmosphere; slowing, stopping, or reversing global warming by reducing new emissions of carbon dioxide; and storing carbon dioxide in a liquid fuel or in a plastic form. For example, the produced hydrocarbons from the presently described reactions may be stored in a fuel container. For these purposes, the devices can be used to accomplish a process comprising collecting carbon dioxide gas from the atmosphere; treating the carbon dioxide gas with a deoxygenation device that is capable of reducing at least some of the carbon dioxide gas in the gaseous influent to produce carbon monoxide gas; and treating the carbon monoxide gas and any remaining carbon dioxide gas with an electro-hydrocarbon device that is capable of reducing at least some of the carbon monoxide gas and any remaining carbon dioxide gas to produce hydrocarbons.

The combined deoxygenation/electro-hydrocarbon devices described herein may be used to sequester carbon dioxide from the atmosphere. Removal of carbon dioxide from the atmosphere is desirable in order to combat the effects of global warming. It is estimated that the pre-Industrial Revolution concentration of carbon dioxide in the atmosphere was about 295 ppm by volume, compared to about 383 ppm by volume today. Accordingly, a reduction of about 88 ppm by volume of carbon dioxide is necessary in order to return carbon dioxide levels to what they were before the Industrial Revolution. This corresponds to the removal of approximately 689.8 billion metric tons of carbon dioxide from the atmosphere, or about 23% of the current carbon dioxide in the atmosphere.

The theoretical minimum energy required for the isothermal recovery of pure carbon dioxide from an impure atmosphere is given by the equation: $\Delta G = RT \ln (P_f/P_i)$, where R is the gas constant, T is the temperature at which the recovery takes place, $P_f$ is the final partial pressure, and $P_i$ is the initial partial pressure. Table 1 shows the estimated cost for extraction of carbon dioxide from the atmosphere assuming an efficiency of about 80% and energy cost of $0.05/kWHr.

TABLE 1.0 estimated cost for extraction of $CO_2$ from atmosphere

| Temp (Celsius) | Energy Cost $ per metric ton of $CO_2$ |
|---|---|
| 0 | 7.0 |
| 20 | 7.6 |
| 50 | 8.3 |
| 100 | 9.6 |
| 150 | 10.9 |
| 200 | 12.2 |
| 250 | 13.5 |
| 300 | 14.8 |
| 350 | 16.1 |
| 400 | 17.4 |
| 450 | 18.7 |
| 500 | 20.0 |
| 550 | 21.2 |
| 600 | 22.5 |
| 650 | 23.8 |
| 700 | 25.1 |
| 750 | 26.4 |
| 800 | 27.7 |
| 850 | 29.0 |
| 900 | 30.3 |

As Table 1 demonstrates, the cost of extracting carbon dioxide from the atmosphere increases with increasing operating temperature of the extraction system. Accordingly, extraction at ambient temperatures may be desired in order to minimize the energy cost of the extraction.

The hydrocarbons obtained from sequestering carbon dioxide from the atmosphere may be stored, for example, as replacements for the strategic petroleum reserves maintained by various countries including the United States. For example, the United States Department of Energy announced in 2006 that it is expanding the strategic petroleum reserves by approximately 1 billion barrels of oil, which is equivalent to about $5.56 \times 10^{12}$ mega-joules (MJ) of energy. Assuming a release of about 72 grams of carbon dioxide into the atmosphere for every MJ of energy produced by the combustion of oil, this increase in strategic petroleum reserves alone has the potential to release about 0.4 billion metric tons of carbon dioxide into the atmosphere were it to be combusted. Accordingly, using hydrocarbons produced from carbon dioxide sequestered from the atmosphere (such that there is no net increase in carbon dioxide emissions when the hydrocarbons are combusted) would prevent the emission of an estimated 0.4 billion metric tons of carbon dioxide.

Sequestering carbon dioxide from the atmosphere using the devices and processes described herein has the additional benefit of storing carbon dioxide that otherwise would be emitted to, or remain in, the atmosphere in a liquid form. The liquid (i.e. the hydrocarbons) could be committed to long-term storage, for example, in underground salt caverns as commonly is used to store petroleum reserves. Alternatively, the liquid hydrocarbons could be stored by domestic users, thus increasing domestic fuel storage reserves.

The devices described herein may be located, for example, near a given source of carbon dioxide for conversion of the carbon dioxide to hydrocarbons. For example, a combined deoxygenation/electro-hydrocarbon device may be located near a fossil fuel burning power plant. The combustion effluent from the power plant would be routed to the deoxygenation portion of the device wherein some, all, or none of the carbon dioxide may be reduced to carbon monoxide. The gaseous effluent then would be passed through the electro-hydrocarbon portion of the device wherein at least some of the effluent from the deoxygenation portion of the device containing carbon monoxide and/or carbon dioxide would be further reduced to form hydrocarbons. Preferably, the combustion effluent would pass through a separation train to remove unwanted contaminants and inerts before being fed into the combined deoxygenation/electro-hydrocarbon device. Another source of carbon dioxide is Canada's natural gas reserves and the associated emissions resulting therefrom.

The electro-hydrocarbon device, deoxygenation device, and combined deoxygenation/electro-hydrocarbon devices described herein also may be used to slow, stop, or reverse global warming.

For example, in as much as the only source of carbon used to produce hydrocarbons using the devices described herein is carbon dioxide sequestered from the atmosphere or some other source that is emitting carbon dioxide into the atmosphere, there will be no net increase in carbon dioxide emissions to the atmosphere upon combustion of the hydrocarbons because the carbon dioxide emitted by combustion of the hydrocarbons is equal to the amount extracted from the atmosphere or recovered from carbon dioxide-emitting sources.

TABLE 1.1

World Energy Consumption (quadrillion Btu)

| | 1990 | 2000 | 2001 | 2005 | 2010 | 2015 | 2020 | 2025 |
|---|---|---|---|---|---|---|---|---|
| Oil | 135.1 | 155.9 | 156.5 | 164.2 | 181.7 | 200.1 | 219.2 | 240.7 |
| Natural Gas | 75.0 | 91.4 | 93.1 | 103.0 | 117.5 | 137.3 | 158.5 | 181.8 |
| Coal | 91.6 | 93.6 | 95.9 | 100.7 | 110.9 | 119.6 | 128.1 | 139.0 |
| Subtotal | 301.7 | 340.9 | 345.5 | 367.9 | 410.1 | 457.0 | 505.8 | 561.5 |

As seen in Table 1.1 for the year 2005, for example, approximately 164.2 Quads of energy from the combustion oil were consumed, corresponding to, assuming 80 gm of carbon dioxide emitted per MJ of energy obtained from oil combustion, about 13.86 billion metric tons of carbon dioxide emitted into the atmosphere. Approximately 103.0 Quads of energy from the combustion of natural gas were consumed, corresponding to, assuming 56 gm of carbon dioxide emitted per MJ of energy obtained from natural gas combustion, about 6.085 billion metric tons of carbon dioxide emitted into the atmosphere. Approximately 100.7 Quads of energy from the combustion of coal were consumed, corresponding to, assuming 100 gm of carbon dioxide emitted per MJ of energy obtained from coal combustion, about 10.62 billion metric tons of carbon dioxide emitted into the atmosphere. Thus, if the 367.9 Quads of energy obtained from the combustion of oil, natural gas, and coal in 2005 instead had been obtained through the combustion of hydrocarbons made according to the devices and processes described herein from carbon dioxide sequestered from the atmosphere, approximately 30.6 billion metric tons of carbon dioxide emissions may have been avoided.

The electro-hydrocarbon device, deoxygenation device, and combined deoxygenation/electro-hydrocarbon devices described herein also may be used to store renewable energy. Renewable energy is energy derived from resources that are regenerative or for all practical purposes cannot be depleted. For this reason, renewable energy sources are fundamentally different from the non-renewable fossil fuels that are the most important modern energy source. Additionally, renewable energy sources do not produce as many greenhouse gases and other pollutants as does the combustion of non-renewable fossil fuel. Renewable energy sources include, for example, sunlight, wind, tides, and geothermal heat.

In order to store renewable energy, electrical power used in the electro-hydrocarbon, deoxygenation, and combined deoxygenation/electro-hydrocarbon devices can be provided by or derived from a renewable energy source. Indeed, the electrical power sources of the deoxygenation devices and electro-hydrocarbon devices described herein preferably utilize electricity from a renewable energy source. Use of renewable energy in these devices "stores" the renewable energy in the form of hydrocarbons produced using the devices. Thus, for example, solar power or another renewable energy source can be used to drive the operation of an electro-hydrocarbon device that produces alcohols such as methanol and ethanol that in effect "store" the renewable electrical energy consumed in their production. Alcohols provide stable, dense, and readily accessible (e.g., by combustion) storage of energy from renewable sources.

Accordingly, an exemplary process for storing renewable energy comprises producing electrical energy from a renewable energy source and treating a gaseous influent comprising at least one of carbon monoxide gas and carbon dioxide gas with an electro-hydrocarbon device that is capable of reducing at least some of the gaseous influent to produce hydrocarbons. The electro-hydrocarbon device utilizes the electric energy produced from the renewable energy source. In this exemplary device, the device for carrying out the process is an electro-hydrocarbon device wherein the device is powered by electricity from a renewable energy source.

Additionally, the gaseous influent in the process described above for storing renewable energy may be produced by treating carbon dioxide gas with a deoxygenation device that is capable of reducing at least some of the carbon dioxide gas to produce carbon monoxide gas, and wherein the deoxygenation device also utilizes electric energy produced from the renewable energy source. In this exemplary process, the device for carrying out the process is a combined electro-hydrocarbon/deoxygenation device wherein both the electro-hydrocarbon and deoxygenation portion of the device is powered by electricity from a renewable energy source.

The electro-hydrocarbon and combined deoxygenation/electro-hydrocarbon devices further provide methods whereby stable, predictable global energy prices can be obtained for an extended, and possibly indefinite, time period. The methods achieve these goals by providing stable, renewable sources of combustion energy. According to these methods, the devices may function as described herein using electrical energy from renewable energy sources to operate the devices. Perfectly efficient combustion of hydrocarbons produced by the devices and methods, like the combustion of other carbonaceous fuels, yields only carbon dioxide and water. Because the devices operate by methods that are capable of consuming carbon dioxide and water, the devices and methods of their operation may be capable of recycling the combustion products of the hydrocarbons produced thereby, and thus may provide an indefinite supply of combustion energy and more stable, predictable long-term global energy prices. Even in the event that perfectly efficient combustion of hydrocarbons produced by the devices and methods is not achieved, carbon dioxide and water are the predominant products of the combustion of hydrocarbons, and therefore the devices and methods nevertheless provide a very long-term, potentially indefinite, recyclable source of combustion energy. For example, a method to provide long-term, stable energy prices may comprise the following: producing electrical energy from a renewable energy source; and treating a gaseous influent comprising at least one of carbon monoxide gas and carbon dioxide gas with an electro-hydrocarbon device that is capable of reducing at least some of the gaseous influent to produce hydrocarbons; wherein the electro-hydrocarbon device utilizes the electric energy produced from the renewable energy source, and wherein the carbon monoxide and carbon dioxide is obtained from the atmosphere.

The electro-hydrocarbon and combined deoxygenation/electro-hydrocarbon devices described herein are useful for the production of hydrocarbons that have a wide variety of uses.

For example, the alcohols produced using the devices may be used as fuels to supplement or replace gasoline, diesel, and other fossil fuels. The first four aliphatic alcohols (methanol, ethanol, propanol, and butanol) in particular are of interest as fuels and fuel supplements because they have characteristics which allow them to be used in modern internal combustion engines. The generic formula for alcohols is $C_nH_{2n+1}OH$ and the energy density of the alcohol increases with increasing "n." Heavier alcohols therefore may be preferred for use as fuel because of their higher energy density compared to lighter alcohols. Alcohols with energy densities comparable to the energy densities of currently used fossil fuels, however, may be especially preferred for use as replacement fuels and fuel supplements. Butanol, for example, has an energy density close to that of gasoline; thus it is particularly well positioned for use as a gasoline replacement and supplement. An exemplary use of alcohols to supplement fossil fuels and combustion processes thereof is the injection of lighter alcohols such as methanol into the air intake of combustion engines, and particularly turbocharged and supercharged engines. Lighter alcohols such as methanol evaporate very quickly under the vacuum conditions in the air intake, thus cool the incoming air and providing denser air and increased combustion and energy output per cycle of the engine.

Another advantage of alcohol fuels compared to standard fossil fuel is that alcohol fuels have higher octane ratings (i.e. knock-resistance) than do fossil fuels, thus allowing alcohol fuels to be used in higher-compression, more efficient internal combustion engines. And whereas higher-compression engines burning fossil fuels have increased $NO_x$ emissions due to the fact that higher-compression engines operate at increased temperatures, alcohols such as ethanol require more energy to vaporize and combust, thus drawing energy out of the air and resulting in a lower temperature exhaust gas with concomitant decreased NOx levels. Alcohol fuels, because they contain oxygen, also burn more completely than do traditional fossil fuels; for example, ethanol combustion emits about half the carbon monoxide emitted by the combustion of gasoline.

Alcohols produced using the devices described herein also may be used as chemical reagents or solvents in various chemical processes. For example, as reagents alcohols commonly are used in organic synthesis to create more other, typically more comples, molecules. For example, methanol is a starting material for the synthesis of the following compounds: formaldehyde, urea resins, phenol resins, melamine resin, xylene resin, paraformaldehyde resin, methane-di-isocyanate (MDI), butanediol, polyols, polyacetald, isoprene, hexamine, methyl tert-butyl ether (MTBE), acetic acid, ethanol, acetaldehyde, acetic anhydride, chloromethanes, methyl methacrylate (MMA), polymethyl methacrylate, methacrylates, coating resins, methyl formate, formamide, HCN, formic acid, methyl amines, dimethyl formamide (DMF), methylethanolamine, dimethylacetamide (DMAC), tetramethyl ammonium hydroxide (TMAH), carbonates, higher amines, dimethyl terephthlate (DMT), polyethyleneterephthalate (PET), dimethyl ether (DME), olefines, gasoline, hydrogen, carbon monoxide, single cell proteins, biochemicals, and others. Alternatively, the devices and process described herein may be modified in order to allow compounds including, but not limited to, those listed above to be produced directly by the devices and processes described herein. For example, the operating conditions, choice of material(s) for the catalyst, influents, and so forth may be adjusted in order to allow the direct production by the devices and processes disclosed herein of compounds other than alcohols, including compounds for which alcohols such as methanol and ethanol may act as starting materials such as those listed above but not limited thereto.

As solvents, alcohols also are used in organic syntheses; ethanol in particular is useful because of its low toxicity and ability to dissolve non-polar substances and often is used as a solvent in the synthesis of pharmaceuticals, cosmetics, perfumes, and vegetable essences such as vanilla. The alcohols produced using the devices described herein also may be used as preservatives of biological specimens. Ethanol produced using the devices further may be used as an antiseptic, for example to disinfect skin before injections are given and for the production of ethanol-based soaps. The alcohols produced using the devices described herein also may be used as high-purity, medical-grade alcohols for medicinal uses. Preferably, the effluent of the electro-hydrocarbon device comprises medical-grade alcohols; for example, operating conditions of the device may be selected in order to produce medical-grade alcohols. If not, the electro-hydrocarbon device's effluent may be further refined and purified in order to bring the alcohols to medical-grade purity.

The production of alcohols using the electro-hydrocarbon and combined deoxygenation/electro-hydrocarbon devices and processes additionally is advantageous because these devices and processes potentially may have reduced environmental impact compared to traditional industrial processes for the production of alcohols. For example, the production of bioalcohols (or biofuels) from plant matter (e.g., soy and corn) harms the environment by encouraging the deforestation of land for use in agriculture (e.g., the widespread catastrophic deforestation of the Amazon in order to plant soy and corn crops used to produce biofuels), requiring high energy consumption to produce fertilizers used in agriculture, instigating water and land pollution from pesticides, fungicides, and herbicides used in agriculture, and so forth.

The above are only a small selection of the possible applications and configurations of the devices and processes that are envisioned. Many other applications and configurations of the devices and processes also are possible in accordance with the description herein. The devices and processes therefore may be implemented in many suitable forms and the various steps and components may be functionally or physically varied to meet the needs of different applications.

While the devices and process described herein have been described in the context of the production of alcohols, it is appreciated that other oxygenates and hydrocarbon compounds also may be produced using the devices and processes herein.

It may be desirable to accomplish the synthesis of alcohols, including ethanol and methanol, using the electro-hydrocarbon devices and combined deoxygenation/electro-hydrocarbon devices described herein at conditions of relatively low temperature and pressure in order to reduce energy costs attendant with the operation of non-electrolytic syngas-based syntheses of alcohols at high temperature and pressure. Additionally, lower temperatures and pressures thermodynamically favor the reduction of carbon dioxide to form alcohols; thus, higher equilibrium conversion of carbon dioxide to alcohols is possible.

For example, methanol is synthesized from carbon dioxide at the relatively low temperature of about 170° C. and at the relatively low pressure of about 8 Mpa over a ceria-supported palladium (Pd—$CeO_2$) cathode prepared via the co-precipitation method, achieving a one-pass yield of about 92%. The high yield is capable of being obtained because the device is operated under more favorable thermodynamic conditions, namely, low temperature and pressure. An acceptable rate of reaction is obtained by applying electrical current or potential between the anode and cathode in order to drive the migration of $H^+$ ion across the anode, through the electrolyte, to the cathode. Without the application of electrical current or potential, the reaction rate would be too slow for industrial purposes. Because of the application of electrical current or potential, traditional reaction conditions of approximately 300° C. temperature is avoided even while acceptable reaction rates are obtained.

In addition to removing or sequestering or harnessing carbon dioxide gas from the atmosphere, industrial source, or another source, any other source of carbon may be employed. If the carbon source is not carbon dioxide and/or carbon monoxide, it may be traditional sources of carbon, such as fossil fuels, coal, peat, oil and methane clathrates, and other hydrocarbons.

If the carbon source is carbon dioxide gas, several methods of obtaining the gas and pretreating the gas before reaction may be employed, such as to be described below, including, an extraction unit, a plasma energy treatment step, a deoxygenating step, and combinations thereof.

The hydrogen source is preferably water or hydrogen gas. However, the hydrogen source is not so limited. It may include any combination of hydrogen gas, water, ammonia, and hydrogen sulfide, and other suitable hydrogen containing compounds, such as simply hydrides, natural gas, fossil fuels, coal, peat, oil, alcohol, and emissions from bacteria and algae. The hydrogen source may be pretreated before reaction, such as by the method described, including a electrolysis step, a plasma energy treatment step, and other suitable steps.

The source of hydrogen is preferably water. It may enter the reactor after a pretreatment step of electrolysis to form a combination of hydrogen gas and water. The source of carbon is preferably carbon dioxide gas sequestered from the atmosphere. It may enter the reactor after a suitable pretreatment step through an electrolytic cell containing an anode and cathode. Inside the reactor, the catalyst is selected from known methods and procedures based on the desired hydrocarbon. It is preferably, a ethanol or methanol favorable catalyst. The temperature and pressure within the reactor is preferably about less than 150° C. and less than about 3 atmosphere. The electricity supplied to the reactor is preferably generated from a renewable energy source. The reactor may be a small sized reactor such that it fits within a combustion engine. The reactor may also be scaled to industrial size. The resulting hydrocarbon is preferably methanol or ethanol.

A small sized reactor preferably uses about less than 10 kWatt, such that the power source may be an electrical outlet found in a home. A large sized reactor may need several hundred megawatts of electricity.

$CO_2$ Extraction Unit

Figure 9:
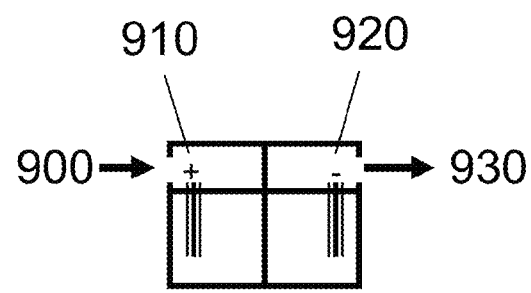
FIG. 9 illustrates an exemplary process and device for carbon dioxide extraction described herein.

The device shown in FIG. 9 illustrates a carbon dioxide extraction unit. The carbon dioxide source 900, such as air enters the device and contacts the anode 910. Potential runs between the anode 910 and cathode 920. Exiting the extraction unit at 930 is the carbon dioxide gas. The anode and cathode may be made of the materials described above.

Carbon dioxide sources can be subdivided into concentrated and diluted streams. Examples of concentrated $CO_2$ sources are natural $CO_2$ reservoirs (which contain up to 97% $CO_2$) and exhaust gases from a wide variety of industrial plants. Examples of the latter are plants for processing of natural gas, production of ethanol by fermentation and production of bulk chemicals such as ammonia and ethylene oxide. Also important is the inorganic industry, notably for the production of cement.

The major sources of dilute $CO_2$ are flue gases from electric power generation, blast furnaces in steel making, exhaust gases from cars, trucks and buses. Electric power is the single largest source for $CO_2$ emissions in industry. It contributes around 25% of the global $CO_2$ emission and is forecasted to contribute to around 30% of global warming by the year 2030.

Any suitable means, such as piping, conducts, suction and other means may be used in fluid communication with the carbon dioxide extraction unit 900 to provide the inlet carbon dioxide source 910.

The carbon dioxide exiting the unit 930 of FIG. 9 may be used in the electrochemical hydrocarbon synthesis described above, such as in FIGS. 3 and 4, i.e., the stream 930 may be routed into FIG. 3 at 360 or FIG. 4 at 460. Although the processes described above may be used to produce alcohols, said process are note limited to alcohols, and may be used to produce any suitable hydrocarbon.

The present sources of $CO_2$ used in industry are displayed in Table 2.0.

TABLE 2.0

Present $CO_2$ Sources from Industry

| Industry | Contribution % |
|---|---|
| Ammonia Production | 35 |
| Oil and Gas Production | 20 |
| Geological Formations | 20 |
| Ethanol Production | 12 |
| Chemicals Manufacturing | 7 |
| Flue Gases or Cogeneration | 3 |

TABLE 2.0-continued

Present CO₂ Sources from Industry

| Industry | Contribution % |
|---|---|
| Alcohol Production | 2 |
| Others | 1 |

Electrolysis Thermodynamics

Figure 10:
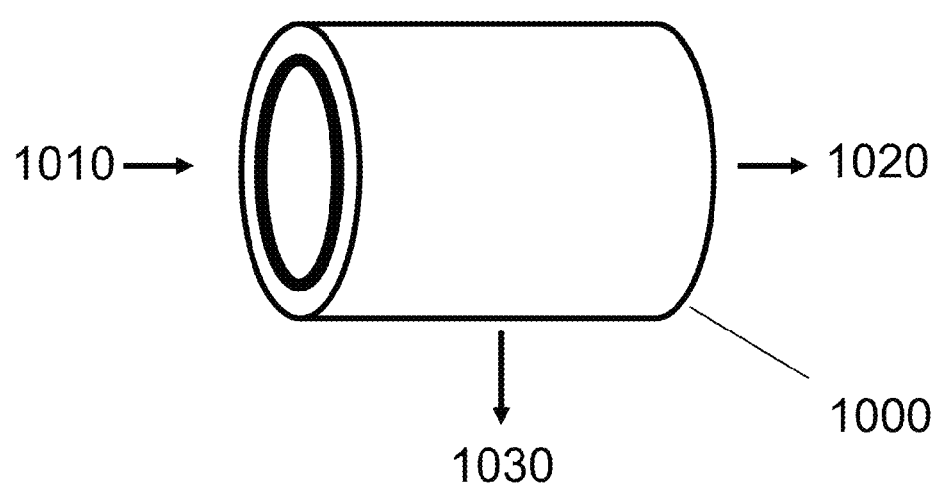
FIG. 10 illustrates an exemplary process and device for the electrolysis of water.

FIG. 10 illustrates a device for the electrolysis of water into gaseous oxygen and hydrogen, for the use of the resulting hydrogen to make hydrocarbons. Inlet source 1010 is water which enters device 1000. Exit streams 1020 and 1030 are oxygen and hydrogen gases, respectively. The production of hydrogen by the electrolysis of water consists of a pair of electrodes immersed in a conducting electrolyte dissolved in water. A direct current is passed through the cell 1000 from one electrode to the other. Hydrogen is released at one electrode 1030 with oxygen evolved at the other electrode 1020, and therefore water is removed from the solution. In a continuously operating electrolysis cell, replacement of pure water is required with a continuous stream of oxygen and hydrogen obtained from both electrodes. Since the basic electrolysis system has no moving parts, it is reliable and trouble-free; and electrolysis represents the least labor-intensive method of producing hydrogen. In addition, electrolysis is an efficient method for generating hydrogen under pressure. Increasing the pressure of operation of an electrolysis cell results in a higher theoretical voltage requirement for operation, but kinetically electrolysis cells run more efficiently at higher pressures; and the gain in efficiency typically offsets the extra electrical energy required.

The device 1000 shown in FIG. 10 may be designed in a similar manner as the devices shown in FIGS. 3 and 4. Device 1000 may be in a cylindrical unit like FIG. 3, or a plate unit as shown in FIG. 4. The anode, cathode, and electrolyte may be any of the above described.

A characteristic of electrolysis is not only that hydrogen and oxygen are produced from water, but that they are separated at the same time. However, this advantage is at the expense of having to utilize electrical energy; considered to be an expensive form of energy. For this reason electrolysis has been considered to be one of the more expensive methods for production of hydrogen. In comparison, it is the electrical energy generation step that is expensive and inefficient; most commercial electrolyzers operate with electricity to hydrogen efficiencies of greater than 75%. Their capital cost potential is also far less than that of the power stations required to supply electrical energy.

For a water electrolysis cell, it can be calculated that the voltage corresponding to the enthalpy change, or the heat of combustion of hydrogen is 1.47 volts at 25° C., whereas the cell voltage corresponding to the free energy change is only 1.23 volts.

In an ideal situation, 1.47 volts applied to a water electrolysis cell at 25° C. would generate hydrogen and oxygen isothermally, that is at 100% thermal efficiency with no waste heat produced. However, it is important to illustrate that a voltage as low as 1.23 volts would still generate hydrogen and oxygen, but the cell would absorb heat from its surroundings.

In practical cells, there is usually an efficiency loss that is greater than the difference between the free energy voltage and the enthalpy voltage. Therefore, operating cells usually operate at voltages greater than 1.47 volts and liberate heat due to various losses within the cell. The heat required to supply the entropy of reaction is therefore provided by some of this waste heat, and practical cells do not absorb heat from their surroundings. If an extremely well performing cell could be operated at below 14.7 volts, it would function as a refrigerator, drawing heat from its surroundings.

The free energy change voltage or "reversible voltage" varies with temperature as shown in Tables 4.1 to 4.4 for $H_2O$, $H_2S$, and $NH_3$. Raising the temperature favors electrolysis since the electrode processes proceed faster with less losses due to polarization. For water, raising the temperature lowers the voltage at which water can be decomposed. With $H_2S$ an increase in temperature actually raises the required voltage for decomposition, however at temperatures above 200° C. sulphur becomes polymeric with increased viscosity, and therefore more difficult to handle. On the other hand ammonia has negative free energy and is therefore spontaneous above 200° C., and would not require electrical input.

Electrolyzer Operational Model

Electrolyzers are able to operate in either current mode or voltage mode. When operated in voltage mode, voltage is applied to the electrolyser and depending on the operating conditions the electrolyser draws current from the source. After a couple of cycles the electrolyser reaches a steady state value. This mode is suitable for when a photovoltaic source is utilized. However, most commercially available electrolyzers run in current mode where the operating voltage of the electrolyser is given by:

$$V_{electrolyzer} = E + V_{activation} + V_{Ohm} \tag{12.0}$$

where V_electrolyzer is the operating voltage of the electrolyser, E is the open circuit voltage of the cell, $V_{activation}$ is the activation polarization and $V_{Ohm}$ is the Ohmic polarization. When a proton ($H^+$) conducting membrane is utilized, for a water electrolyser the following electrode reactions are applicable:

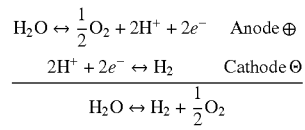

Similarly, when a proton ($H^+$) conducting membrane is utilized for the electrolysis of $H_2S$, the following electrode reactions are applicable:

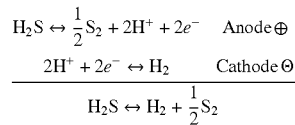

Again for the electrolysis of $NH_3$ when a proton ($H^+$) conducting membrane is utilized, the following electrode reactions are applicable:

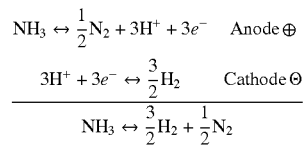

In electrolysis, only the free energy of the reaction, $\Delta G$, can be interchanged with the electrical energy at constant temperature and pressure. The quantity of electric charge corresponding to the molar quantities in a balanced equation is equivalent to nF, where n is the number of electrons transferred per molecule and F is the Faraday value. If this quantity of electrical charge is transported through a potential difference of E volts, the amount of work required is given by nFE. In an isothermal electrolysis unit at constant pressure and volume the Gibbs free energy is given by:

$$\Delta G = -nFE$$

Where E is the potential difference, or voltage. If $\Delta G$ is negative for a spontaneous cell reaction then E is taken as positive for a spontaneously discharging cell.

According to the Nernst equation, the open circuit voltage for an electrolyser is given by:

$$E = E^o - \frac{2.303RT}{nF} \log\left(\frac{p_{H_2} p_{O_2}^{1/2}}{a_{H_2O}}\right) \quad (13.0)$$

where $E^o$ is the standard cell potential, R the gas constant, T the cell temperature, n is the number of electrons involved in the cell reaction (for water electrolysis n=2), F the faraday constant, $p_{H_2}$ the partial pressure of hydrogen, $p_{O_2}$ the partial pressure of oxygen, and $a_{H_2O}$ is the water activity between the anode and electrolyte—if a fuel cell is operated at below 100° C. where liquid water is present then $a_{H_2O}$=1. Therefore, it follows that equation 14.0 becomes:

$$E = E^o - \frac{2.303RT}{2F} \log p_{H_2} - \frac{2.303RT}{4F} \log p_{O_2} \quad (14.0)$$

In Tables 2.1 to 2.3 the effect of partial pressures of reactants and products on the cell voltage of electrolysis cells for the dissociation of $H_2O$, $H_2S$ and $NH_3$ are given. It is apparent for $H_2O$ electrolysis that as the pressure is increased the voltage source will need to provide a higher voltage for the cell reaction to occur. An increase in pressure from 1 atm to 10 atm results in a decomposition voltage 44 mV higher. The energy required to provide this additional is equal to the potential energy contained in the high-pressure hydrogen. In practice water electrolyzers operate somewhat closer to ideal at higher pressures than they do at atmospheric pressure, that is the efficiency losses are less at higher pressures. This is do to various reasons, including that the gas bubbles emitted are smaller in size and provide less hindrance to the passage of ionic current across the cell. The energy requirements of a practical electrolyser are always greater than the minimum theoretical energy requirements. Efficiency losses occur due to the following:

the resistance of the electrolyte itself (i.e. ohmic losses);

concentration polarization (change in the electrode voltage) due to changes in the concentration of hydrogen ions, oxygen ions, or water in the vicinity of the electrodes;

activation polarization—voltage gradients set up at the electrode-electrolyte interface due to the slowness of the electrode reactions; and in addition, there are small losses in the electronic conduction of current through the metallic conductors within the cell.

The voltage efficiency of an electrolyser or electrochemical system is a function of the applied current, decreasing as the current is increased. When the operating voltage is plotted against the current per unit area of electrode (current density) a characteristic curve, otherwise known as a polarization curve is obtained. Polarization curves show the relationship between the voltage (voltage efficiency in an electrolyser) and current density for an electrochemical system. By doubling the current density, and therefore doubling the rate of hydrogen production, the effective capital cost of the cell is halved, although the efficiency is reduced. The polarization curve can be used to determine the optimum operating conditions according to capital cost and efficiency in relation to operating profit. The critical economic and technical factors which determine the operating conditions of an electrochemical system consist of: cost of electricity (either consumed or produced); cost of feed stock materials ($H_2O$, $NH_3$, $H_2S$, $CO_2$, $H_2$, etc.); value in products ($H_2$, Alcohols, Ethers, Alkanes, Alkynes, etc.); cost of equipment; and lifetime of components.

TABLE 2.1

Effect of pressure on Cell Voltage for $H_2O$ Electrolysis

| Cell Emf | $P_{O2}$ | $P_{H2}$ |
|---|---|---|
| −1.202 | 0.25 | 0.25 |
| −1.216 | 0.5 | 0.5 |
| −1.229 | 1 | 1 |
| −1.242 | 2 | 2 |
| −1.260 | 5 | 5 |
| −1.273 | 10 | 10 |
| −1.287 | 20 | 20 |

TABLE 2.2

Effect of pressure on Cell Voltage for $H_2S$ Electrolysis

| Cell Emf | $P_{H2}$ | $P_{S2}$ | $P_{H2S}$ |
|---|---|---|---|
| −0.3704 | 0.25 | 0.25 | 0.25 |
| −0.3748 | 0.5 | 0.5 | 0.5 |
| −0.3793 | 1 | 1 | 1 |
| −0.3837 | 2 | 2 | 2 |
| −0.3896 | 5 | 5 | 5 |
| −0.3941 | 10 | 10 | 10 |
| −0.3985 | 20 | 20 | 20 |

TABLE 2.3

Effect of pressure on Cell Voltage for $NH_3$ Electrolysis

| E(Pressurized) | $PN_2$ | $PH_2$ | $PNH_3$ |
|---|---|---|---|
| −0.0448 | 0.25 | 0.25 | 0.25 |
| −0.0508 | 0.5 | 0.5 | 0.5 |
| −0.0567 | 1 | 1 | 1 |
| −0.0626 | 2 | 2 | 2 |
| −0.0705 | 5 | 5 | 5 |
| −0.0764 | 10 | 10 | 10 |
| −0.0824 | 20 | 20 | 20 |

$NH_3$ Electrolysis

To overcome the difficult storage of hydrogen, several carriers consisting of alcohols, hydrocarbons, ammonia, etc. may be used instead of water as the source 1010 entering the device shown in FIG. 10. In many ways ammonia is an excellent hydrogen carrier; liquid ammonia represents a convenient means of storing hydrogen, boasting a specific energy density of 11.2 MJ/dm$^3$ versus 8.58 MJ/dm$^3$ for liquid hydrogen. Ammonia is easily condensed at ambient temperature (at 8 bar of pressure) which makes it suitable for transportation and storage. Despite ammonia being flammable within the defined limits of 16-25% by volume in air and toxic (above 25 ppm) its presence can be detected by its characteristic odor above 5 ppm. Ammonia is produced in large quantities (greater than 100 million ton/year) which indicates economy of scale in the cost of production. For these reasons $NH_3$ may be a commercial source of hydrogen. The decomposition of ammonia by electrochemical methods in alkaline media at low overpotentials is $NO_x$ and $CO_x$ free with nitrogen and hydrogen as products of the reaction.

According to the following series of reactions ammonia is converted into nitrogen and hydrogen gas within an alkaline based electrolyser, i.e. $OH^-$ being the ionic carrier, according to:

$$2NH_3(aq) + 6OH^- \leftrightarrow N_2(g) + 6H_2O + 6e^- \quad (14.0)$$
$$\underline{6H_2O + 6e^- \leftrightarrow 3H_2(g) + 6OH^-} \quad (14.1)$$
$$2NH_3(aq) \leftrightarrow N_2(g) + 3H_2(g) \quad (214.2)$$

The theoretical energy consumption during ammonia electrolysis is equal to 1.55 Whr/gm $H_2$ compared to the electrolysis of water at 33 Whr/gm $H_2O$. This is a 95% lower energy cost than water electrolysis. This technology possesses scalability as well as the ability to easily operate in an on-demand mode facilitates the technology's ability to interface with renewable energy including intermittent sources derived from wind and solar energy.

Ammonia can be electrochemically decomposed to yield hydrogen, in accordance with known techniques. Several experimental variables exist in the electrolytic decomposition of ammonia. These variables consist of the pH and the chloride ion in solution, the type of anodes utilized—either $IrO_2$, $RuO_2$ or Pt. In addition, changes in current density and the initial ammonia concentration affect the efficiency of the decomposition. The best electrode was determined to be $RuO_2$ in both acidic and alkali conditions due to the generation of large quantities of OH radicals (note: during plasma dissociation of $H_2O$ at 3473K, 0.1509 atm of OH is produced—this may be advantageous for the decomposition of $NH_3$).

Electrochemical Hydrocarbon Synthesis

Carbon dioxide is one of the cheapest and most abundant carbon based raw materials in the world. Unfortunately, $CO_2$ is rather inert and most of its reactions are energetically unfavorable. Development of a good catalyst provides a means of reacting $CO_2$. However, the second limitation is in relation to thermodynamics and is not solvable by advanced catalysis. In Tables 3.1 to 3.4 a listing of reactions with CO and $CO_2$ for both exothermic and endothermic processes is provided. In traditional processes the exothermic processes are extremely sensitive due to deactivation of the catalyst from localized overheating. The synthesis processes described herein can control this phenomena and to prevent it from occurring.

The processes in Table 3.1 which are spontaneous (i.e. $-\Delta G°$) and exothermic ($-\Delta H°$) occur without an input in energy; however the required $H_2$ does require energy in its formation. The free energy of a reaction is given by: $\Delta G° = \Delta H° - T\Delta S°$ where $\Delta H°$ is the enthalpy of the reaction (or heat produced or consumed) and $\Delta S°$ is the entropy or change in order or disorder occurring in a reaction.

In general, the reaction of $H_2$ to $H_2O$ contributes to the negative or slightly positive free energies of these reactions. Reactions which are highly exothermic pose the most trouble in deactivation of catalyst/electro-catalyst. All energy figures are in kJ/mol unless noted otherwise.

TABLE 3.1

Enthalpy and Free Energy for Exothermic Reactions Involving Carbon Dioxide

| Substance | Reaction | $\Delta H°$ | $\Delta G°$ |
|---|---|---|---|
| Formic Acid | $CO_2(g) + H_2(g) \leftrightarrow HCOOH(l)$ | −31.0 | +34.3 |
| Formaldehyde | $CO_2(g) + 2H_2(g) \leftrightarrow HCHO(g) + H_2O(l)$ | −11.7 | +46.6 |
| Methanol | $CO_2(g) + 3H_2(g) \leftrightarrow CH_3OH(l) + H_2O(l)$ | −137.8 | −10.7 |
| Methane | $CO_2(g) + 4H_2(g) \leftrightarrow CH_4(g) + 2H_2O(l)$ | −259.9 | −132.4 |
| Oxalic Acid | $2CO_2(g) + H_2(g) \leftrightarrow (COOH)_2(l)$ | −39.3 | +85.3 |
| Ethylene | $2CO_{2(g)} + 2CH_{4(g)} \leftrightarrow C_2H_{4(g)} + 2H_2O_{(l)}$ | −189.7 | −208.3 |
| Dimethyl Ether | $2CO_{2(g)} + 6H_{2(g)} \leftrightarrow CH_3OCH_{3(g)} + 3H_2O_{(l)}$ | −264.9 | −38.0 |
| Methyl Formate | $CO_2(g) + H_2(g) + CH_3OH(l) \leftrightarrow HCOOCH_3(l) + H_2O(l)$ | −31.8 | +25.8 |
| Acetic Acid | $CO_2(g) + H_2(g) + CH_3OH(l) \leftrightarrow CH_3COOH(l) + H_2O(l)$ | −135.4 | −63.6 |
| Ethanol | $CO_2(g) + 3H_2(g) + CH_3OH(l) \leftrightarrow C_2H_5OH(l) + 2H_2O(l)$ | −221.6 | −88.9 |
| Methanamide | $CO_2(g) + H_2(g) + NH_3(g) \leftrightarrow HCONH_2(l) + H_2O(l)$ | −103.0 | +7.2 |
| Acetic Acid | $CO_2(g) + CH_4(g) \leftrightarrow CH_3COOH(l)$ | −13.3 | +58.1 |
| Acetaldehyde | $CO_2(g) + CH_4(g) + H_2(g) \leftrightarrow CH_3CHO(l) + H_2O(l)$ | −14.6 | +74.4 |
| Acetone | $CO_2(g) + CH_4(g) + H_2(g) \leftrightarrow CH_3CHO(l) + H_2O(l)$ | −70.5 | +51.2 |
| Acrylic Acid | $CO_2(g) + C_2H_2(g) + H_2(g) \leftrightarrow CH_2=CHCOOH(l)$ | −223.6 | −115.0 |
| Acrylic Acid | $CO_2(g) + C_2H_4(g) \leftrightarrow CH_2=CHCOOH(l)$ | −49.1 | +26.2 |
| Propanoic Acid | $CO_2(g) + C_2H_4(g) + H_2(g) \leftrightarrow C_2H_5COOH(l)$ | −166.1 | −56.6 |
| Propionaldehyde | $CO_2(g) + C_2H_4(g) + 2H_2(g) \leftrightarrow C_2H_5CHO(l) + H_2O(l)$ | −171.1 | −44.4 |
| Benzoic Acid | $CO_2(g) + C_6H_6(l) \leftrightarrow C_6H_5COOH(l)$ | −21.6 | +30.5 |
|  | $CO_2(g) + C_6H_5OH(l) \leftrightarrow m-C_6H_4(OH)COOH(l)$ | −6.6 | +46.9 |

In Table 3.2 the reactions listed are non-spontaneous and endothermic, since there is an absence of hydrogen and its subsequent conversion to water. However, this is not a concern with our modular based hydrocarbon synthesis unit. The energy required for all the reactions listed in these Tables 3.1 to 3.4 can be added via electrochemical or electro-catalytic processes, plasma activated gas phases, or plasma enhanced electrochemical systems at lower operating temperatures and over a wider range of pressure than traditional processes.

TABLE 3.2

Enthalpy and Free Energy for Endothermic Reactions Involving Carbon Dioxide

| Substance | Reaction | $\Delta H°$ | $\Delta G°$ |
|---|---|---|---|
| Ethylene Oxide | $CO_2(g) + CH_2=CH_2(g) \leftrightarrow CH_2CH_2O(l) + CO(g)$ | +152.9 | +177.3 |

TABLE 3.2-continued

Enthalpy and Free Energy for Endothermic Reactions Involving Carbon Dioxide

| Substance | Reaction | ΔH° | ΔG° |
|---|---|---|---|
| Carbon Monoxide | $CO_2(g) + C(s) \leftrightarrow 2CO(g)$ | +172.6 | +119.9 |
| Methane Reform. | $CO_2(g) + CH_4(g) \leftrightarrow 4CO(g) + 2H_2O(l)$ | +235.1 | +209.2 |
| Methane Reform. | $CO_2(g) + CH_4(g) \leftrightarrow 2CO(g) + 2H_2(l)$ | +247.5 | +170.8 |
| Ethane | $2CO_2(g) + 2CH_4(g) \leftrightarrow C_2H_6(g) + CO(g) + H_2O(l)$ | +58.8 | +88.0 |
| Ethylene Oxide | $CO_2(g) + C_2H_4(g) \leftrightarrow C_2H_4O(g) + CO(g)$ | +178.0 | +176.0 |

In Table 3.3 a series of exothermic reactions for CO combined with hydrogen are listed. Again $H_2$ and its conversion to $H_2O$ contribute both enthalpy (ΔH) and free energy (ΔG) to the overall thermodynamics of these reactions. The most efficient reaction is in the formation of methanol—none of the hydrogen is converted into water. In addition, methanol is an excellent building block for hydrocarbons including dimethyl ether (DME).

TABLE 3.3

Enthalpy and Free Energy for Exothermic Reactions Involving Carbon Monoxide and Hydrogen

| Substance | Reaction | ΔH° | ΔG° |
|---|---|---|---|
| Formaldehyde | $CO(g) + H_2(g) \leftrightarrow H_2CO(g)$ | −5.4 | 27.2 |
| Methanol | $CO(g) + 2H_2 = CH_3OH(l)$ | −131.6 | −29.9 |
| Methyl Ketene | $2CO(g) + 2H_2(g) \leftrightarrow CH_2CO(g) + H_2O(l)$ | −125.9 | −24.9 |
| Acetylene | $2CO(g) + 3H_2(g) \leftrightarrow C_2H_2(g) + 2H_2O(l)$ | −123.8 | 9.0 |
| Methane | $CO(g) + 3H_2(g) \leftrightarrow CH_4(g) + H_2O(l)$ | −250.2 | −150.9 |
| Acetaldehyde | $2CO(g) + 3H_2(g) \leftrightarrow C_2H_4O(g) + H_2O(l)$ | −231.0 | −91.9 |
| Ethanol | $2CO(g) + 4H_2(g) \leftrightarrow CH_3CH_2OH(l) + H_2O(l)$ | −342.4 | −137.7 |
| Ethylene | $2CO(g) + 4H_2(g) \leftrightarrow C_2H_4(g) + 2H_2O(l)$ | −298.1 | −131.8 |
| Ethyl group | $2CO(g) + 9/2\ H_2(g) \leftrightarrow C_2H_5(g) + 2H_2O(l)$ | −246.0 | −68.7 |
| Ethane | $2CO(g) + 5H_2(g) \leftrightarrow C_2H_6(g) + H_2O(l)$ | −435.3 | −233.0 |

In Table 3.4 a series of exothermic reactions for CO is listed for the formation of hydrocarbons. These reactions combine CO with molecules other than $H_2$ to form hydrocarbons.

TABLE 3.4

Enthalpy and Free Energy for Exothermic Reactions Involving Carbon Monoxide

| Substance | Reaction | ΔH° | ΔG° |
|---|---|---|---|
| Formic Acid | $CO(g) + H_2O(s) \leftrightarrow HCOOH(l)$ | −24.8 | +15.1 |
| Oxalic Acid | $2CO(g) + 2H_2O(l) \leftrightarrow (COOH)_2(l)$ | −26.9 | +46.9 |
| Methyl Formate | $CO(g) + CH_3OH(l) \leftrightarrow HCOOCH_3(l)$ | −25.6 | +6.6 |
| Acetic Acid | $CO(g) + CH_3OH(l) \leftrightarrow CH_3COOH(l)$ | −129.2 | −82.8 |
| Methanamide | $CO(g) + NH_3(g) \leftrightarrow HCONH_2(l)$ | −96.8 | −12.0 |
| Acrylic Acid | $CO(g) + C_2H_2(g) + H_2O(l) \leftrightarrow CH_2=CHCOOH(l)$ | −217.4 | −134.2 |
| Propionaldehyde | $CO(g) + C_2H_4(g) + H_2(g) \leftrightarrow C_2H_5CHO(l)$ | −164.9 | −63.6 |

Thermodynamics for $H_2O$, $NH_3$ and $H_2S$ Hydrogen Sources

Numerous sources of hydrogen are available for production of hydrocarbons, alcohols, etc. They consist of $H_2O$, $NH_3$, $H_2S$, $CH_4$, etc. The thermodynamic data provides a guideline for determining the required cost in energy for dissociation of these materials. In Table 4.1 the data for the dissociation of water is presented. It is apparent that an increase in temperature will decrease the energy requirement of electricity in an electrolysis system.

TABLE 4.1

Dissociation of $H_2O$ (liquid at 25° C.): $H_2O \leftrightarrow H_2 + O$

| Temperature (° C.) | ΔG (J/mol) | ΔH (J/mol) | ΔS (J/mol) |
|---|---|---|---|
| 25 | 237.215 | 285.835 | 163.155 |
| 200 | 220.415 | 243.573 | 48.959 |
| 400 | 210.273 | 245.410 | 52.209 |
| 600 | 199.609 | 246.999 | 54.284 |

In Table 4.2 thermodynamic data for the dissociation of hydrogen sulphide into hydrogen and elemental sulphur is provided. This is a hydrogen source that is easier to acquire according to thermodynamics and is therefore less expensive than electrolysing water.

Sulphur is an abundant, multivalent non-metal with a melting point of 115.2° C., and a boiling point of 444.6° C. It has a density of 1.819 g/cm³ at its melting point but has the unusual phenomena of increased viscosity above 200° C. due to the formation of polymeric chains.

TABLE 4.2

Dissociation of $H_2S$ into S (Orthorhombic): $H_2S \leftrightarrow H_2 + S$

| Temperature (° C.) | ΔG (J/mol) | ΔH (J/mol) | ΔS (J/mol) |
|---|---|---|---|
| 25 | 33.322 | 20.499 | −43.030 |
| 200 | 39.483 | 26.863 | −26.680 |
| 400 | 43.766 | 32.154 | −17.254 |
| 600 | 46.655 | 36.106 | −12.084 |

In Table 4.3 thermodynamic data for the dissociation of hydrogen sulfide into hydrogen and diatomic sulphur is provided. Yet again this is a hydrogen source that is easier to acquire according to thermodynamics and is therefore less expensive than electrolysing water.

TABLE 4.3

Dissociation of $H_2S$ into $S_2$ (Orthorhombic): $H_2S \leftrightarrow H_2 + \frac{1}{2}S_2$

| Temperature (° C.) | ΔG (J/mol) | ΔH (J/mol) | ΔS (J/mol) |
|---|---|---|---|
| 25 | 73.195 | 84.800 | 38.945 |
| 200 | 65.908 | 86.663 | 43.880 |
| 400 | 56.791 | 88.388 | 46.949 |
| 600 | 47.229 | 89.553 | 48.481 |

Ammonia is an additional possibility and is in fact spontaneous at higher temperatures. Thermodynamic data for this decomposition is provided in Table 4.4. Underlying these apparently favourable thermodynamics is the cost in producing ammonia. However, ammonia could prove useful as a carrier of hydrogen, since the production of ammonia worldwide is a large scale industrial process making ammonia readily available.

TABLE 4.4

Dissociation of $NH_3$ (gaseous): $NH_3 \leftrightarrow \frac{3}{2}H_2 + \frac{1}{2}N_2$

| Temperature (° C.) | ΔG (J/mol) | ΔH (J/mol) | ΔS (J/mol) |
|---|---|---|---|
| 25 | 16.414 | 45.895 | 98.930 |
| 200 | −1.811 | 49.396 | 108.259 |
| 400 | −24.045 | 52.310 | 113.455 |
| 600 | −47.017 | 54.218 | 115.963 |

Another source of hydrogen is in the reforming of methane with water. This is presently the main source of hydrogen industrially due to its spontaneous nature above temperatures of 800° C. It does require considerable heat due to its endothermic nature, as shown in Table 4.5. This reformation would be easier and less demanding if it could be operated at lower temperatures via a plasma enhanced and/or electrochemical system, as described in the present invention.

TABLE 4.5

Reformation of $CH_4$ (gaseous): $CH_4 + H_2O \leftrightarrow CO + 3H_2$

| Temperature (° C.) | ΔG (J/mol) | ΔH (J/mol) | ΔS (J/mol) |
|---|---|---|---|
| 25 | 150.893 | 250.175 | 333.161 |
| 200 | 102.848 | 213.634 | 234.222 |
| 400 | 54.740 | 219.950 | 245.483 |
| 600 | 5.038 | 224.053 | 250.877 |
| 800 | −45.419 | 226.416 | 253.341 |
| 1,000 | −96.198 | 227.487 | 254.269 |

Figure 11:
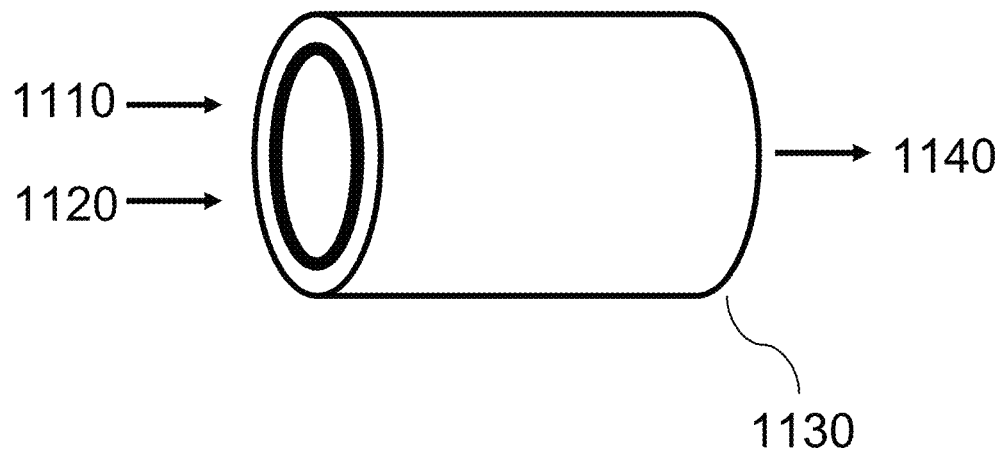
FIG. 11 illustrates an exemplary process and device for the electro-hydrocarbon synthesis using hydrogen as a reactant.

FIG. 11 illustrates the reaction of gaseous carbon dioxide 1110 and hydrogen 1120 in an electro-hydrocarbon synthesis device 1130. An energy source may be supplied to the device 1130 and a catalyst may be used. Output from the device 1130 is any number of hydrocarbons 1140, including alcohols, esthers, alkanes, alkynes, and others. This device 1130 may be physically designed in a similar manner to the devices described above, such as FIGS. 3 and 4. The input stream 1110 may be in fluid communication with the output stream of FIG. 9, 930. Any other suitable source of carbon dioxide may be used. The input stream 1120 may be in fluid communication with the output of device 1000, 1030. Any other suitable source of hydrogen may be used in device 1130.

II. Production of Hydrocarbons Using Plasma Energy

In another embodiment of the invention one or both of the carbon source and hydrogen source may be treated with plasma energy prior to reacting the influents together. The carbon source for the reaction may be any suitable source of carbon, as described above, but is preferably carbon dioxide.

The source of hydrogen is preferably hydrogen gas. It may enter the reactor after a pretreatment step of plasma treatment to create hydrogen ions. The source of carbon is preferably carbon dioxide gas sequestered from the atmosphere. It may enter the reactor after a suitable pretreatment step of plasma energy to produce carbon dioxide ions. Inside the reactor, a catalyst may be used. The anode, cathode, and electrolyte as described in Section I may be used. The energy from the pretreatment plasma steps may be enough to carry the reaction through without the need for high temperature and pressures and/or without the need for the anode, cathode, and electrolyte. The temperature and pressure within the reactor is preferably about less than 150° C. and less than about 3 atmospheres. The electricity supplied to the reactor is preferably generated from a renewable energy source and may be converted into ultrasonic or plasma energy prior to being applied to the reactor. The reactor may be a small sized reactor such that it fits within a combustion engine. The reactor may also be scaled to industrial size. The resulting hydrocarbon is preferably methanol or ethanol.

Plasma Dissociation of $H_2O$, $NH_3$ and $H_2S$

Plasma States

Plasma states can be divided into two main categories: Hot Plasmas (near-equilibrium plasmas) and Cold Plasmas (non-equilibrium plasmas) Hot plasmas are characterized by very high temperatures of electrons and heavy particles, both charged and neutral, and they are close to maximum ionization (i.e. 100%). Cold plasmas are composed of low temperature particles (charged and neutral molecular and atomic species) and relatively high temperature electrons with low levels of ionization ($10^{-4}$ to 10%). Hot plasmas include electrical arcs, plasma jets of rocket engines, thermonuclear reaction generated plasmas, etc. Cold plasmas include low-pressure direct current (DC) and radio frequency (RF) discharges (silent discharges), discharges from fluorescent (neon) illuminating tubes. In addition corona discharges are also classified as cold plasmas.

The plasma state can be produced in the laboratory by raising the energy content of matter regardless of the nature of the energy source. Plasmas can be generated by mechanical (close to adiabatic compression), thermally (electrically heated furnaces), chemically (exothermic reactions, e.g. flames), radiant sources (high energy electro-magnetic and particle radiations, e.g. electron beams), nuclear (controlled nuclear reactions), electrically (arcs, coronas, DC and RF discharges) and by a combination of mechanical and thermal energy (e.g. explosions).

High-temperature physical chemical processing via plasmas is applicable to: highly endothermic reactions; reactions limited at ordinary temperatures because of slow reaction rates; reactions dependent on excited states; reactions requiring high specific energy input without dilution by large volumes of combustion gases; and reactions or phase changes to alter the physical properties of a material.

Some of the advantages of plasma processing include: rapid reaction rates; smaller apparatus; continuous rather than batch processing; automated control; and thermal processing.

Thermal processing is made up of at least two large categories of phenomena; those of a purely physical nature and those involving one or more chemical reactions. Physical processing involves heat transfer between the plasma gas and the phase being treated, resulting in a substantial increase in temperature with an associated physical transformation. Chemical processing involves one or more chemical reactions induced in the condensed phase of the plasma itself.

Energy Consumption

One problem of applied plasma chemistry is the minimization of energy consumption. Plasma chemical processes may consume electricity, a relatively expensive form of energy. Requirements for energy efficiency may still be met when plasma technology is applied to such large-scale applications as chemical synthesis, fuel conversion, or emission control of industrial and automotive exhaust gases.

Energy cost and energy efficiency of a plasma chemical process are closely related to the chosen mechanism. The same plasma chemical processes in different discharge systems or under different conditions (corresponding to different mechanisms) result in entirely different expenses of energy. For example, the plasma chemical purification of air with small amounts of $SO_2$ using pulse corona discharge requires 50 to 70 eV/mol. The same process stimulated under special plasma conditions by relativistic electron beams requires about 1 eV/mol; therefore it requires two orders of magnitude less electrical energy.

In Table 5.1 a listing of plasma sources and their associated operating conditions is given. Of particular interest in our plasma processes is the atmospheric plasma processes including glow discharge, streamer, dielectric discharge barrier (DBD) and microwave (MW). These processes are amenable to operation at atmospheric pressure which eliminates expensive vacuum pumping systems and provides higher gas densities and therefore higher throughput.

Low-Pressure, Non-Equilibrium Cold Plasmas

Low-pressure, non-equilibrium cold plasmas are initiated and sustained by DC, RF or microwave (MW) power transferred to a low-pressure gas environment with or without an additional electric or electromagnetic field. Ultimately, all these discharges are initiated and sustained through electron collision processes due to the action of the specific electric or electromagnetic fields. Accelerated electrons (energetic electrons) induce ionization, excitation and molecular fragmentation processes leading to a complex mixture of active species, which will undergo, depending on the specific plasma mode (e.g. direct or remote plasma environment), recombination processes in the presence or absence of plasma. The recombination reaction mechanisms are different from those for conventional chemical processes.

electron temperatures exceeding by orders of magnitude the temperatures of heavy plasma components.

In a LTE type thermal plasmas all molecules are dissociated and the molecular fragments are able to form new compounds. Plasmas offer a number of intrinsic advantages such as enhanced reaction kinetics, oxidizing or reducing atmospheres, high quenching rates and better control of chemical reactions.

Atmospheric pressure, non-LTE plasmas possess unique features that have enabled several important applications. Electrons with sufficient energy colliding with a background gas can result in low levels of dissociation, excitation and ionization without an appreciable increase in gas enthalpy. Non-LTE plasmas have electron temperatures which exceed the temperature of heavy particles (atoms, molecules, ions) by orders of magnitude. Since the ions and neutrals remain relatively cold, these plasmas do not cause thermal damage to the surfaces that they contact with. This characteristic makes this type of plasma suitable for low-temperature plasma chemistry and treatment of heat sensitive materials including polymers and biological tissues. Examples of non-LTE plasmas are corona discharges, dielectric-barrier discharges (DBDs) and glow discharges.

Arc or corona discharges are initiated by partial breakdown of a gas gap in a strongly inhomogeneous electric field. The active ionization region is restricted to a small volume around

TABLE 5.1

Summary of Plasma Parameters

| Parameter | Arc | Glow | Streamer | DBD | FIW | RF | MW |
|---|---|---|---|---|---|---|---|
| Pressure | Up to 10-20 atm | 0.01 Torr-1 atm | 0.1-1 atm | 1 Torr-1 atm | 0.01-200 Torr | $10^{-3}$-100 Torr | 0.1 Torr-1 atm |
| Current (A) | $0.25$-$10^5$ | $10^{-4}$-$10^{-1}$ | $10^{-4}$-$10^{-3}$ | $10^{-4}$-$10^{-3}$ | 50-200 | $10^{-4}$-$10^{-1}$ | 0.1-1 |
| Voltage (V) | 10-700 | 100-1,000 | 10-100 kV | 1-10 kV | 5-200 kV | 500-5,000 V | 0.1-10 kV |
| E/N or E | 1-100 V/cm | 10-50 V (cm Torr)$^{-1}$ | 30-100 V (cm Torr)$^{-1}$ | 30-100 V (cm Torr)$^{-1}$ | 30-100 V (cm Torr)$^{-1}$ | 10-100 V (cm Torr)$^{-1}$ | 1-1,000 V/cm |
| $T_g$, (K) | 3000-10000 | 300-600 | 300-400 | 300-600 | 300-400 | 300-1,000 | 300-6,000 |
| $T_e$ | 5000-10000 K | 1-3 eV | 1-3 eV | 1-5 eV | 1-10 eV | 1-5 eV | 1-5 eV |
| $N_e$, (cm$^{-3}$) | $10^{15}$-$10^{16}$ | $10^{11}$-$10^{12}$ | $10^{11}$-$10^{12}$ | $10^{11}$-$10^{12}$ | $10^{11}$-$10^{13}$ | $10^{11}$ | $10^9$-$10^{17}$ |
| Uniformity in Space | non-uniform | uniform | non-uniform | non-uniform or uniform (atm) | uniform | Uniform (low pressure) or filamentary (high pressure) | Uniform (halo) & filamentary |
| Main energy input | heating | vibratory | Electricity | electricity | electricity | Vibratory or electricity | Heating, vibratory or electricity |

Due to the electrode, antenna and reactor geometries, their chemical nature, their relative positions in the reaction chambers and also to the individuality specificity of the processes (e.g. DC discharges require electrodes with electrically conductive surfaces) plasma non-uniformities can be variable.

Similar to the electrolytic reaction described in Section I, the plasma energy may be derived from an electrical energy source that is generated from a renewable energy source, such as wind and/or solar.

Atmospheric-Pressure Plasma Technology

One industrial process operating close to atmospheric pressure include thermal plasmas which include electric arc furnaces and plasma torches for generation of powders, for spraying refractory materials, for cutting and welding and for destruction of hazardous waste. These applications include the utilization of thermal plasmas close to local thermal equilibrium (LTE) and non-equilibrium (non-LTE) plasmas with the active corona electrode of a small radius of curvature, which is small in comparison with the inter-electrode distance. Typical configurations are pin-to-plane, wire-to-plane or a coaxial wire in a cylinder. There is a passive zone of low conductivity which connects the active zone to the opposite electrode and stabilizes the low current discharge. The charge carriers in this drift region can be used to charge solid particles and droplets or to induce chemical reactions. Examples of applications consist of electrostatic precipitators (ESPs) which are utilized for dust collection in many industrial off gases. Recently DC arc discharges operating at low current (250 mA) and high voltage (700V) have been observed at atmospheric pressure, in air. Active stabilization was required with a closed loop applied to current regulation of the power supply.

DBD also referred to as barrier discharge or silent discharge consists of an electrode configuration with at least one dielectric barrier (insulator) in the current path in addition to the gas gap used for discharge initiation. At atmospheric pressure this type of discharge is maintained by a large number of short-lived localized current filaments called microdischarges. An example is in the generation ozone ($O_3$) utilizing optimized DBDs as utilized in water treatment and pulp bleaching. DBDs can operate at high power levels and can treat large atmospheric-pressure gas flows with a negligible pressure drop—as used in the treatment of air pollution for the decomposition of $H_2S$ and $NH_3$.

The plasma of a glow discharge is luminous in contrast to a relatively low-power dark discharge. A glow discharge is a self-sustained continuous DC discharge having a cold cathode which emits electrons as a result of secondary emission induced by positive ions. The classical discharge tube in a fluorescent lamp has been used for decades in the production of light. One Atmosphere Uniform Glow Discharge Plasma (OAUGDP), glow discharges operating at 1 atm will permit industrial processes that are otherwise uneconomical at 10 Torr pressure. The OAUGDP is capable of a wide range of plasma processing tasks, as long as the mean free paths are not required in the application. This plasma generates active species which are useful for sterilization, decontamination, and surface energy enhancement of films, fabrics, air filters, metals and 3-D work pieces. Recently work has been performed in the $CO_2$ reforming of $CH_4$ in the formation of synthesis gas with an atmospheric pressure glow discharge plasma. The experiments showed that conversion of $CH_4$ and $CO_2$ was up to 91.9% and the selectivity of CO and $H_2$ was also up to 90%.

$CO_2$ Dissociation Products in Thermal Plasmas

Thermodynamically, the equilibrium composition of the $CO_2$ dissociation products in a thermal plasma depend only on temperature and pressure. This temperature dependence, is much stronger than pressure dependence. The main products of the plasma chemical process under consideration are given by:

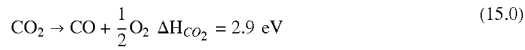

$$CO_2 \rightarrow CO + \frac{1}{2} O_2 \quad \Delta H_{CO_2} = 2.9 \text{ eV} \tag{15.0}$$

Which are the saturated molecules CO and $O_2$. In addition, at very high temperatures there is a significant concentration of atomic oxygen and carbon.

Quenching is a post-reaction step, such that slow cooling could be quasi equilibrium, and reverse reactions would return the composition to the initial reactant, i.e. $CO_2$. Fast cooling times in order of >$10^8$ K/sec will result in production of CO as a product. In this situation atomic oxygen recombines into molecular oxygen faster than reacting with carbon monoxide, thus maintaining the degree of $CO_2$ conversion. A maximum energy efficiency of approx. 64% can be reached at 3000K with a high cooling rate of $10^8$ K/sec required.

The main dissociation products for $H_2O$ consist of:

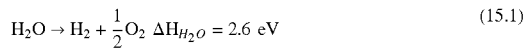

$$H_2O \rightarrow H_2 + \frac{1}{2} O_2 \quad \Delta H_{H_2O} = 2.6 \text{ eV} \tag{15.1}$$

Which are the saturated molecules of $H_2$ and $O_2$. In contrast to $CO_2$, thermal dissociation of water vapour results in a variety of atoms and radicals. The concentration of O, H and OH are significant in this process. Even when $H_2$ and $O_2$ are initially formed in the high-temperature zone are saved from reverse reactions, the active species O, H and OH can be converted into products ($H_2$ and $O_2$) or back into $H_2O$. This qualitatively different behavior of radicals determines the key difference between the absolute and ideal mechanisms of quenching.

Plasma Dissociation of $H_2S$ $H_2S$ may be used as a source of hydrogen due its favorable dissociation thermodynamics. Water may also be dissociated. Chemical processes can be operated in a plasma at temperatures up to 20,000 K and pressures from 10 to $10^9$ Pascal. The high temperature generated by plasmas allows very high conversion of thermodynamically limited endothermic reactions. The very high quenching rates of $10^6$ K/sec or higher are possible with plasma systems—assuring that a high conversion rate is possible.

The energy cost for plasma decomposition of $H_2S$ was determined to be between 0.6 to 1.2 kWh/m3 and the $H_2S$ could be pure or mixed with $CO_2$. It has been shown that using a corona discharge plasma reactor that $H_2S$ can be dissociated into $H_2$ and sulphur. However, due to high dielectric strength of pure $H_2S$ (approx. 2.9 times that of air) it was diluted with gases of lower dielectric strength to reduce the breakdown voltage. Regardless, it is entirely economically feasible to dissociate $H_2S$ with a plasma system.

Plasma Assisted Catalysis

Plasma processes induce gas phase reactions—such as the generation of acetylene from natural gas, or for the non-thermal activation via dielectric barrier discharges (DBDs) of low temperature processes like ozone generation. Catalytic processes can be very selective. Catalytic processes often require a specific gas composition and high temperature. One method of the invention combines plasma activation of reactions with the selectivity of catalytic reactions.

Examples of such hybrid processes are plasma enhanced selective catalytic reduction (SCR) as performed in the reforming of methane to hydrogen and higher hydrocarbons. Hydrogen gas can be efficiently produced in plasma reformers from a variety of hydrocarbon fuels (gasoline, diesel, oil, biomass, natural gas, jet fuel, etc.) with conversion efficiencies close to 100%. Utilizing a gas discharge plasma, combined with a $V_2O_5$—$WO_3/TiO_2$ catalyst the pre-treatment of Diesel engine exhaust for the selective catalytic reduction (SCR) of Nitric Oxides has been performed. It is possible to produce synthesis gas through the conversion of methane using $CO_2$ in a dielectric barrier discharge (DBD) with a catalyst consisting of Ni/γ-$Al_2O_3$. The products produced consisted of CO, $H_2$, $C_2H_6$, $C_3H_8$, and $C_4H_{10}$. In a similar manner methane was converted directly to higher hydrocarbons ($C_2H_2$, $C_2H_4$, $C_2H_6$, $C_3H_8$, etc.) utilizing a Pt/γ-$Al_2O_3$ catalyst and dielectric-barrier discharge. Methane activation via plasma is very effective because methyl radicals are easily formed—and which will induce various chemical reactions. With plasma chemical reactions, free radicals control and manipulation are important.

Catalysts/Electrocatalysts

This section discusses the catalytic reactions involving the oxidation of $C_1$-$C_7$ hydrocarbons and $C_1$—$O_2$ alcohols by carbon dioxide.

The largest consumers of $CO_2$ are the producers of carbamide (urea), calcined soda and salicylic acid. In all these industries CO2 is obtained not from the atmosphere but from secondary industrial gases and from solid carbonates (primarily from limestone). In 1995 the world output of carbamide was 110 million tonnes annually. Carbamide is formed when $CO_2$ reacts with ammonia under a pressure of 200 atm at 200° C. according to:

$$2NH_3 + CO_2 \leftrightarrow NH_4COONH_3 + H_2O \tag{16.0}$$

Another major industry involving the use of CO$_2$ is the production of calcined soda, totaling about 30 million tones annually. Together with CO$_2$, the reactants are NaCl and ammonia according to:

$$NaCl+NH_3+CO_2+H_2O \leftrightarrow NaHCO_3+NH_4Cl \qquad (16.1)$$

Calcined soda is obtained by the heat treatment of NaHCO$_3$, whereupon CO$_2$ and H$_2$O are evolved.

In 1990 the manufacture of salicylic acid followed by the production of Aspirin (acetylsalicylic acid) was 25,000 tons per year. The synthesis of salicylic acid is synthesized by carboxylating phenol under pressure (Kolbe-Schmidt reaction). This material is then reacted with acetic anhydride (CH$_3$CO$_2$O) to produce acetylsalicylic acid.

CO$_2$ is being utilized in the synthesis of organic carbonates. They are obtained by the interaction of oxiranes with CO$_2$ in the presence of inorganic and organic halides. Organic carbonates are used as solvents and extractants, while polycarbonates are employed as construction materials.

Dimethyl Ether (DME)

Dimethyl ether (DME) also known as methoxymethane, oxybismethane, methyl ether, and wood ether, is a colorless, gaseous ether with an ethereal odor. DME gas is water soluble at 328 g/ml at 20° C. It has the molecular formula CH$_3$OCH$_3$ or C$_2$H$_6$O with a molecular mass 46.07 g/mol. The density of DME is 1.59 versus air and 668 kg/m$^3$ as a liquid. Its melting point is −138.5° C. (134.6K) with a boiling point of −23° C. (254K)

DME is used as an aerosol spray propellant and combined with propane for cryogenic freezing. It is also used as a clean burning alternative to liquefied petroleum gas, liquefied natural gas, diesel and gasoline. Typically it is manufactured from natural gas, coal or biomass.

Dimethyl ether (DME) is used in producing gasoline, ethylene, aromatic and other chemicals. It is an alternative diesel fuel due to its low NOx emissions, near zero smoke and less engine noise. Traditionally, DME is produced by methanol dehydration over catalysts, while methanol is produced from synthesis gas (CO/H$_2$/CO$_2$). However, it is possible to produce DME through a direct route called synthesis-gas-to-dimethyl ether (STD). This process is more thermodynamically and economically favorable than the traditional route. The three major reactions in this process consist of:

$$CO+H_2 \leftrightarrow CH_3OH \qquad (16.2)$$

$$2CH_3OH \leftrightarrow CH_3OCH_3+H_2O \qquad (16.3)$$

$$CO+H_2O \leftrightarrow CO_2+H_2 \qquad (16.4)$$

The methanol produced by reaction (6.3) is consumed by the dehydration reaction (6.4), while the water formed in reaction (6.4) can react with CO through water gas shift reaction (6.5). This results in a dramatic increase in conversion of CO. Typically, a mixed double-function catalyst is used in the STD process, composed of a methanol catalyst (Cu/Zn/Al, Cu/Zn/Cr or Cu/Zn/Zr) and a methanol dehydration catalyst (zeolite or γ-alumina).

For application within an electrochemical device reaction (16.5) and (16.6) are to be utilized as follows:

$$2CH_3OH \leftrightarrow CH_3OCH_3+H_2O \qquad (16.5)$$

$$CO+H_2O \leftrightarrow CO_2+H_2 \qquad (16.6)$$

With the overall reaction consisting of:

$$2CH_3OH+CO \leftrightarrow CH_3OCH_3+CO_2+H_2 \qquad (16.7)$$

As can be observed in reaction (16.7) as the ratio of CO/CO$_2$ increases the formation of dimethyl ether is favored. Through the utilization of an oxygen anion (O$^{2-}$) electrolyte, CO$_2$ will be reduced to CO—this being electrochemical and controlled externally. The CO/CO$_2$ mixture is then reacted with methanol according to reaction (16.7).

In addition, the products of reaction (16.7) consisting of CO$_2$ and H$_2$ can be utilized in the formation of methanol.

Figure 12:
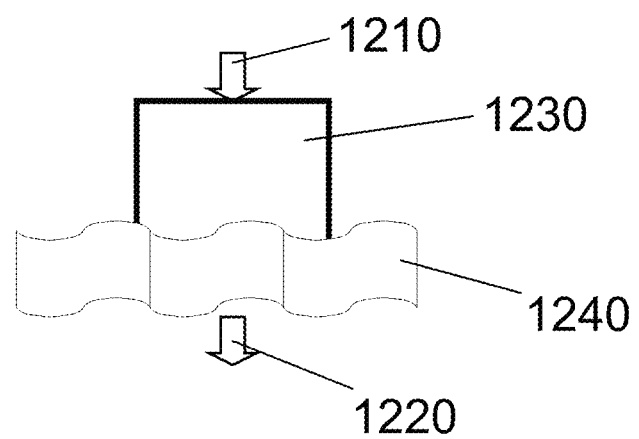
FIG. 12 illustrates an exemplary process and device using plasma energy to ionize carbon dioxide or hydrogen.

FIG. 12 illustrates a plasma device that accepts either carbon dioxide source 1210 or hydrogen source 1210. If carbon dioxide is the source 1210, output stream 1220 is an ionized mixture of carbon dioxide. If a hydrogen source 1210 is used, the output stream 1220 is ionized hydrogen. The hydrogen source 1210 may be water, ammonia, or H$_2$S. Component 1230 illustrates the energy source, such as microwave, while component 1240 illustrates the plasma. The output streams may then be routed in fluid communication into a catalytic hydrocarbon synthesis device wherein the reactions described above would occur in the presence of a suitable catalyst.

Source of CO$_2$ and CO

The production of Hydrocarbons, Alcohols, etc., requires a source of CO$_2$ and CO which is derived from CO$_2$. Therefore, the CO$_2$ needs to be reformed into CO—there are several methods available, either chemically, electrochemically or through the use of plasma systems. In Table 6.1 thermodynamic data for the dissociation of CO$_2$ to CO and O$_2$ is provided. As the temperature is increased the dissociation becomes more favorable and ultimately becomes spontaneous.

TABLE 6.1

Dissociation of CO$_2$ (gaseous): $CO_2 \leftrightarrow CO + \frac{1}{2}O_2$

| Temperature (° C.) | ΔG (J/mol) | ΔH (J/mol) | ΔS (J/mol) |
|---|---|---|---|
| 25 | 257.287 | 282.994 | 86.264 |
| 200 | 241.985 | 283.634 | 88.058 |
| 400 | 224.368 | 283.558 | 87.950 |
| 600 | 206.838 | 283.067 | 87.319 |
| 800 | 189.447 | 282.356 | 86.589 |
| 1,000 | 172.202 | 281.510 | 85.867 |
| 2,000 | 87.896 | 276.463 | 82.959 |
| 3,000 | 5.940 | 271.318 | 81.081 |
| 4,000 | −74.457 | 266.450 | 79.782 |
| 5,000 | −153.726 | 261.761 | 78.795 |
| 6,000 | −232.118 | 257.291 | 78.018 |

In Table 6.2 the dissociation of CO$_2$ and associated species is projected to typical plasma temperatures. It is apparent as the temperature increases more reactive species such as monotonic oxygen (O) and ozone (O$_3$) increase in concentration. There is also a wide range of typical plasma species (not listed in the Tables) consisting of radicals (highly reactive), electrons, etc. Understanding the intermediate reaction sequences for the required overall chemical hydrocarbon formation reactions be it chemically, electrochemically with or without plasma enhancement, it would be possible to tailor the composition of the plasma gases to optimize these reactions. In Tables 6.3 to 6.5 data for plasma gas compositions CO$_2$, H$_2$S, H$_2$O, and NH$_3$ at temperatures from 1,000 to 6,000° C. is provided.

TABLE 6.2

Plasma Dissociation of $CO_2$ (gaseous) $CO_2 \rightarrow$ Various Species

| Temp. (° C.) | $CO_2$ (atm) | CO (atm) | $O_2$ (atm) | O (atm) | $O_3$ (atm) |
|---|---|---|---|---|---|
| 1,000 | 0.99996 | 0.00002454 | 0.00001227 | $3.7447 \times 10^{-10}$ | $1.5343 \times 10^{-17}$ |
| 2,000 | 0.91889 | 0.053845 | 0.02658 | 0.00068621 | $6.440 \times 10^{-10}$ |
| 3,000 | 0.46649 | 0.24435 | 0.17732 | 0.11185 | 0.11821 |
| 4,000 | 0.011493 | 0.51098 | 0.03345 | 0.44408 | $3.3846 \times 10^{-08}$ |
| 5,000 | 0.0007739 | 0.50031 | 0.0026575 | 0.49584 | $1.627 \times 10^{-09}$ |
| 6,000 | 0.0001316 | 0.4673 | 0.00043024 | 0.51026 | $1.7589 \times 10^{-10}$ |

TABLE 6.3

Plasma Dissociation of $H_2S$ (gaseous) $H_2S \rightarrow H_2 + S$

| Temp. (° C.) | $H_2S$ (atm) | $H_2$ (atm) | $S_2$ (atm) | $H_2S_2$ (atm) | HS (atm) | H (atm) |
|---|---|---|---|---|---|---|
| 1,000 | 0.72431 | 0.18159 | 0.086705 | 0.0061184 | 0.00071279 | $3.0208 \times 10^{-07}$ |
| 1,500 | 0.27664 | 0.47478 | 0.23199 | 0.001881 | 0.013581 | 0.00019497 |
| 2,000 | 0.093205 | 0.57238 | 0.27087 | 0.0004408 | 0.0484 | 0.0063229 |
| 3,000 | 0.009808 | 0.37997 | 0.12688 | 0.00017682 | 0.087563 | 0.020898 |
| 4,000 | 0.0001795 | 0.057064 | 0.0089684 | $5.6769 \times 10^{-08}$ | 0.0016606 | 0.59091 |
| 5,000 | 0.000003623 | 0.0059452 | 0.00089709 | $2.5958 \times 10^{-10}$ | 0.0024428 | 0.65852 |
| 6,000 | $2.1944 \times 10^{-7}$ | 0.0011192 | 0.00018405 | $5.3568 \times 10^{-12}$ | 0.00060859 | 0.66509 |

TABLE 6.4

Plasma Dissociation of $H_2O$ (gaseous) $H_2O \rightarrow H_2 + \frac{1}{2}O_2$

| Temp. (° C.) | $H_2O$ (atm) | $H_2$ (atm) | $O_2$ (atm) | OH (atm) | H (atm) | O (atm) |
|---|---|---|---|---|---|---|
| 1,000 | 0.99997 | 0.000018044 | $8.527 \times 10^{-6}$ | $1.984 \times 10^{-6}$ | $3.011 \times 10^{-9}$ | $3.122 \times 10^{-10}$ |
| 2,000 | 0.96224 | 0.019522 | 0.0075883 | 0.009115 | 0.001168 | 0.0003667 |
| 3,000 | 0.41571 | 0.17962 | 0.059074 | 0.1373 | 0.1437 | 0.06456 |
| 3,100 | 0.33136 | 0.1866 | 0.060398 | 0.14692 | 0.18825 | 0.086371 |
| 3,200 | 0.25312 | 0.18655 | 0.059371 | 0.15087 | 0.02385 | 0.11150 |
| 3,300 | 0.3161 | 0.17924 | 0.056037 | 0.14851 | 0.29239 | 0.13899 |
| 3,400 | 0.12872 | 0.16556 | 0.05077 | 0.14016 | 0.34726 | 0.1647 |
| 3,500 | 0.08572 | 0.14728 | 0.044216 | 0.12704 | 0.4003 | 0.1954 |
| 4,000 | 0.007104 | 0.055203 | 0.014439 | 0.050285 | 0.58119 | 0.29176 |
| 5,000 | 0.00005546 | 0.0059296 | 0.0011745 | 0.005512 | 0.65766 | 0.32963 |

TABLE 6.5

Plasma Dissociation of $NH_3$ (gaseous) $NH_3 \rightarrow \frac{1}{2}N_2 + \frac{3}{2}H_2$

| Temp. (° C.) | NH3 (atm) | $H_2$ (atm) | $N_2$ (atm) | H (atm) | N (atm) | NH (atm) |
|---|---|---|---|---|---|---|
| 298 | 0.93808 | 0.046443 | 0.015481 | $4.999 \times 10^{-37}$ | negligble | $2.9882 \times 10^{-67}$ |
| 473 | 0.14857 | 0.63857 | 0.21286 | $2.724 \times 10^{-37}$ | $3.132 \times 10^{-50}$ | $1.081 \times 10^{-41}$ |
| 673 | 0.008723 | 0.74670 | 0.24890 | $4.752 \times 10^{-15}$ | $1.243 \times 10^{-34}$ | $2.88 \times 10^{-29}$ |
| 873 | 0.0009973 | 0.74963 | 0.24988 | $4.026 \times 10^{-11}$ | $3.534 \times 10^{-26}$ | $1.428 \times 10^{-22}$ |
| 1073 | 0.0001222 | 0.74991 | 0.24997 | $1.206 \times 10^{-8}$ | $7.263 \times 10^{-21}$ | $2.254 \times 10^{-18}$ |
| 2,273 | 0.00000451 | 0.74369 | 0.24910 | 0.0072073 | $1.435 \times 10^{-8}$ | $1.059 \times 10^{-8}$ |
| 3,273 | 0.00000111 | 0.53335 | 0.21903 | 0.24758 | $3.25 \times 10^{-5}$ | $3.726 \times 10^{-6}$ |
| 4,273 | $4.4736 \times 10^{-8}$ | 0.092178 | 0.15500 | 0.75102 | $1.7627 \times 10^{-3}$ | $3.358 \times 10^{-5}$ |
| 5,273 | $1.093 \times 10^{-9}$ | 0.009598 | 0.13165 | 0.83672 | 0.021962 | $7.568 \times 10^{-5}$ |
| 6,273 | $5.324 \times 10^{-11}$ | 0.0016612 | 0.083181 | 0.81028 | 0.10477 | $1.003 \times 10^{-4}$ |

Interaction of Carbon Dioxide with Hydrogen

Hydrogen is an excellent reductant for carbon dioxide. The thermodynamics for the most important reactions of $CO_2$ with hydrogen and associated reactions are provided in Tables 6.6 to 6.9:

Sabatier Reaction:

$$CO_2 + 4H_2 \leftrightarrow CH_4 + 2H_2O \quad \Delta G_{298} = -130,820 \text{ J/mol} \quad (17.0)$$

TABLE 6.6

Free Energy for Sabatier versus Temperature

| Temperature (° C.) | $\Delta G$ (J/mol) | $\Delta H$ (J/mol) | $\Delta S$ (J/mol) |
|---|---|---|---|
| 25 | −130.820 | −253.016 | −410.053 |
| 200 | −81.278 | −173.571 | −195.123 |

TABLE 6.6-continued

Free Energy for Sabatier versus Temperature

| Temperature (° C.) | ΔG (J/mol) | ΔH (J/mol) | ΔS (J/mol) |
|---|---|---|---|
| 400 | −40.645 | −181.802 | −209.743 |
| 600 | 2.192 | −187.985 | −217.843 |

Methanol Synthesis Reaction via $CO_2$:

$$CO_2 + 3H_2 \leftrightarrow CH_3OH + H_2O \quad \Delta G_{298} = -9{,}163 \text{ J/mol} \quad (17.1)$$

TABLE 6.7

Free Energy for Methanol Reaction via $CO_2$ versus Temperature

| Temperature (° C.) | ΔG (J/mol) | ΔH (J/mol) | ΔS (J/mol) |
|---|---|---|---|
| 25 | −9.163 | −131.010 | −408.882 |
| 200 | 37.223 | −57.776 | −200.844 |
| 400 | 78.725 | −64.499 | −212.814 |
| 600 | 121.964 | −69.135 | −218.899 |

Bosch Reaction:

$$CO_2 + 2H_2 \leftrightarrow C + 2H_2O \quad \Delta G_{298}^\circ = -80{,}001 \text{ J/mol} \quad (17.2)$$

TABLE 6.8

Free Energy for Bosch Reaction versus Temperature

| Temperature (° C.) | ΔG (J/mol) | ΔH (J/mol) | ΔS (J/mol) |
|---|---|---|---|
| 25 | −80.001 | −178.148 | −329.329 |
| 200 | −45.909 | −93.505 | −100.627 |
| 400 | −25.129 | −96.895 | −106.636 |
| 600 | −3.412 | −99.659 | −110.249 |

Reverse Water Gas Reaction:

$$CO_2 + H_2 \leftrightarrow CO + H_2O \quad \Delta G_{298} = 20{,}073 \text{ J/mol} \quad (17.3)$$

TABLE 6.9

Free Energy Reverse Water Gas Reaction versus Temperature

| Temperature (° C.) | ΔG (kJ/mol) | ΔH (J/mol) | ΔS (J/mol) |
|---|---|---|---|
| 25 | 20.073 | −2.841 | −76.891 |
| 200 | 21.570 | 40.064 | 39.099 |
| 400 | 14.095 | 38.149 | 35.740 |
| 600 | 7.229 | 36.068 | 33.035 |

Thermodynamic data for the formation of methanol with CO and hydrogen is provided in Table 6.9. Since this reaction is spontaneous at 25° C. this reaction could be maintained as spontaneous at higher temperatures (for improved kinetics) with an adjustment in the reactants partial pressures (an increase). The formation of methanol with CO and $H_2$ (reaction 17.4) is very effective since the hydrogen utilized is not wasted in the formation of water—therefore a reaction sequence for direct synthesis of DME and other hydrocarbons.

Methanol Synthesis Reaction via CO:

$$CO + 2H_2 \leftrightarrow CH_3OH \quad \Delta G_{298}^\circ = -29{,}236 \text{ J/mol} \quad (17.4)$$

TABLE 6.9

Free Energy for Methanol Reaction No. 2 versus Temperature

| Temperature (° C.) | ΔG (J/mol) | ΔH (J/mol) | ΔS (J/mol) |
|---|---|---|---|
| 25 | −29.236 | −128.169 | −331.991 |
| 200 | 15.653 | −97.839 | −239.942 |
| 400 | 64.630 | −102.647 | −248.554 |
| 600 | 114.735 | −105.204 | −251.934 |

The direct formation of DME can be performed through the reaction of $CO_2$ with $H_2$ via reaction 17.4. The associated thermodynamics for this reaction are provided in Table 6.10. DME can also be formed with CO and $H_2$ via reaction 17.5 without any waste of hydrogen due to the formation of water (this is therefore the preferred reaction). In Table 6.11 the thermodynamic data for reaction 17.4 is provided.

Dimethyl Ether Reaction via $CO_2$:

$$2CO_2 + 6H_2 \leftrightarrow CH_3OCH_3 + 3H_2O \quad \Delta G_{298}^\circ = -97{,}598 \text{ J/mol} \quad (17.5)$$

TABLE 6.10

Free Energy for Dimethyl Ether Reaction No. 1 versus Temperature

| Temperature (° C.) | ΔG (kJ/mol) | ΔH (J/mol) | ΔS (J/mol) |
|---|---|---|---|
| 25 | −97.598 | −348.068 | −840.501 |
| 200 | 1.745 | −187.290 | −399.651 |
| 400 | 83.737 | −197.714 | −418.205 |
| 600 | 168.431 | −204.919 | −427.663 |

Dimethyl Ether Reaction via CO:

$$2CO + 3H_2 \leftrightarrow CH_3OCH_3 + \frac{1}{2}O_2 \quad \Delta G_{298}^\circ = +99.470 \text{ J/mol} \quad (17.6)$$

TABLE 6.11

Free Energy for Dimethyl Ether Reaction No. 2 versus Temperature

| Temperature (° C.) | ΔG (J/mol) | ΔH (J/mol) | ΔS (J/mol) |
|---|---|---|---|
| 25 | 99.470 | −56.552 | −523.563 |
| 200 | 179.020 | −23.845 | −428.889 |
| 400 | 265.820 | −28.602 | −437.476 |
| 600 | 353.582 | −30.057 | −439.449 |

The dissociation of water as in reaction 17.7 is associated with considerable energy costs due to the unfavourable thermodynamics (see Table 6.12). This is the reason, as previously mentioned, to avoid hydrocarbon formation reactions which form water as a product or otherwise select reactions which minimize water formation.

Water Dissociation $$H_2O \leftrightarrow H_2 + \frac{1}{2}O_2 \quad \Delta G_{298}^\circ = +237.200 \text{ J/mol} \quad (17.7)$$

TABLE 6.12

Free Energy for Water Dissociation versus Temperature

| Temperature (° C.) | ΔG° (J/mol) |
|---|---|
| 25 | 237.200 |
| 200 | 220.400 |
| 400 | 210.300 |
| 600 | 199.600 |

III. Devices and Processes Using Ultrasound to Produce Hydrocarbons

Another embodiment of the invention is a device and method to produce hydrocarbons from hydrogen and carbon sources wherein ultrasonic energy is applied to kinetically drive the reactions. All the foregoing discussed sources of carbon, such as carbon dioxide, and all foregoing sources of hydrogen, such as water, ammonia, and $H_2S$ and all the various ways of obtaining those reactants, such as by plasma, electrolysis, and the like, may be utilized in the ultrasonic reactions.

The present day generation of ultrasound was established with the discovery of the piezoelectric effect by the Curies. Modern ultrasonic devices rely on transducers (energy converters) which are composed of piezoelectric material. These materials respond to the application of an electrical potential across opposite faces with a small change in dimension. When the electrical potential is alternated at high frequencies the crystal converts the electrical energy to mechanical vibration (sound) energy. At sufficiently high alternating potential, high frequency sound (ultrasound) will be generated. When more powerful ultrasound at a lower frequency is applied to a system it is possible to produce chemical changes as a result of acoustically generated cavitation.

Ultrasound can be defined as sound with a frequency above that of normal human hearing (i.e. higher than 16 kHz). The frequency range involving high energy—low frequency waves known as power ultrasound lies between 20 and 100 kHz. This range is applied to cleaning, sonochemistry and plastic/metal welding. Very high frequencies are not required as the formation of bubbles requires a finite time (a 20 kHz rarefaction at half cycle takes 25 µs—whereas a 20 MHz rarefaction only lasts 0.025 µs). Frequencies from 1 MHz to 10 MHz are used for diagnostic and medical applications.

Ultrasound provides a form of energy for the modification of chemical reactivity which is different from heat, light, and/or pressure. Power ultrasound produces its effects via cavitation bubbles. These bubbles are created during the rarefaction cycle of the wave when the liquid structure is torn apart to form tiny voids which collapse in the compression cycle. Collapse of bubbles in liquids results in an enormous concentration of energy due to the conversion of kinetic energy of the liquid motion into the heating of the bubble contents. It is possible to create pressures of hundreds of atmospheres and temperatures thousands of degrees. These conditions induce chemical reactions yielding products that are typical of pyrolysis reactions in the gas phase.

There are three main classes of reaction mixture which can be significantly affected through the application of an ultrasonic field, all which may be used in the present methods and devices.

Heterogeneous, solid-liquid systems such as those found in the synthesis of many organometallic reagents containing magnesium, lithium, zinc, etc. in which a solid metal reacts with organic reagents dissolved in a suitable solvent.

Heterogeneous, liquid—liquid systems comprising two immiscible liquids, for example water and styrene, in which the formation of an emulsion and the increase in interfacial interaction are important.

Homogeneous liquids such as water and alkanes or solutions. For example sonification of carboxylic acid gives CO, $CO_2$ and hydrocarbons.

In aqueous solutions, the thermal decomposition of water leads to the formation of highly reactive H. atoms and OH. radicals within the cavitation bubbles, but not in the bulk of the solution. There are actually three different regions of reactions occurring in cavitation consisting of:

The interior of the collapsing gas bubbles in which extreme conditions of temperature result in reactions typical of pyrolysis.

The second region is the interfacial region between the collapsing gas bubbles and the bulk solvent where the temperatures are lower but still capable of inducing free-radical reactions.

In the third region, that of the bulk solvent, the free radicals escape into the bulk solution and undergo scavenging reactions similar to those observed in aqueous radiation chemistry.

Heating and cooling rates are above $10^{10}$ K/sec a reaction quench rate would ensure that the reaction products are stable. The extremely high temperature local temperatures (measured at up to 20,000K) and pressures. In addition, sonofusion processes have been calculated to result in pressures of 10 trillion kPa and 100 million ° C. which is about 20,000 times that of the sun's surface.

With reactions of solids there are two types of reactions involving metals. Both are applicable in the present methods and devices. One is where the metal is a reagent and is consumed in the process. The second is where the metal functions as a catalyst. It is assumed that any cleansing of the metal surfaces enhances their chemical reactivity. In addition, sonification efficiently removes reactive intermediates, or products, cleaning the metal surface and therefore providing clean metal surfaces for reaction. Sonification also provides the possibility of enhanced single electron transfer (SET) reactions at the metal surface.

Heterogeneous Reactions—Involving Powders or Other Particulate Matter

The processes and devices wherein ultrasonic energy is applied may use an optional catalyst. Catalytic reactions frequently use heterogeneous catalysts consisting of rare and expensive metals. The use of ultrasound provides the opportunity of activating less reactive and also less expensive metals. The application of ultrasound to heterogeneous catalysis consists of the following areas: (1) in the formation of supported catalysts; (2) in the activation of preformed catalysts; and (3) the enhancement of catalytic behavior during a catalytic reaction.

The efficiency of heterogeneous reactions involving solids dispersed in liquids will depend upon the available reactive surface area and mass transfer. Conventional technology utilizes agitating and stirring with rotating devices and baffled pipes when mixing, reacting or dissolving small and submicron sized particles on an industrial scale. With conventional rotational mixing techniques, dispersing solid particles 10 microns in diameter or smaller in a liquid reaches a barrier determined by the rate of mixing and transfer within a liquid. This limit called the mass transfer coefficient, K, reaches a constant value of about 0.015 cm/sec in water, and cannot be increased any further. This holds true for liquids of similar viscosity. Sonification or power ultrasound overcomes this limitation and greatly enhances mixing. For example, mass transport of substrate molecules to an electrode surface from bulk solution is accelerated via a cavitational micro-jet stream with a velocity in excess of 100 m s$^{-1}$.

The shock wave resulting from cavitation collapse results in intensive cleaning of metal surfaces, the removal of passivating coatings existing on metal surfaces (e.g. oxides, carbonates and hydroxides) and the pitting of metal surfaces—which increases the possible reaction area. For example, it is possible to prepare amorphous nanopowders via decomposition of organometallic compounds, such as the synthesis of Fe/SiO$_2$ catalyst. This catalysts material may be used for activity and selectivity for CO hydrogenation to hydrocarbons (Fischer-Tropsch process) in the range between 200 to 300° C. and at 1 atm pressure. Sonochemically produced iron on silica catalyst is an order of magnitude more active than conventional supported iron at similar loadings and dispersions. In addition, this silica supported nanostructured iron catalyst exhibits high activity at low temperatures (<250° C.) whereas conventional silica supported iron catalyst has no activity. The major reaction products for both nanostructured and conventional catalysts are short-chain $C_1$ to $C_4$ hydrocarbons at temperatures above 275° C. (above 275° C. recrystallization of the catalyst can occur). At temperatures below 275° C. the nanostructured catalyst has higher selectivity towards log-chain hydrocarbons ($C_{5+}$).

Homogeneous Reactions

There are a variety of homogeneous reactions that may be employed, for example, the emission of light from water (sonoluminescence), the fragmentation of liquid alkanes, the liberation of iodine from aqueous potassium iodide, or the acceleration of homogeneous solvolysis reactions. These reactions occur at an accelerated rate not due to the mechanical effects of sonification alone. The acceleration of homogeneous reactions is due to the process of cavitational collapse. Inside the microbubble exists vapor from the solvent and any volatile reagents that are subjected to enormous increases in pressure and temperature. Under these conditions the solvent and/or reagent undergoes fragmentation to generate reactive species of the radical or carbine type enough to fluoresce in some situations. In addition, the shock wave produced by bubble collapse could also disrupt the solvent structure and alter the reactivity by altering salvation of the reactive species present.

Several benefits of using ultrasonic energy are: (1) reactions can be accelerated or less severe conditions can be required if sonification is utilized; (2) sonochemical reactions can use cruder reagents than conventional techniques; (3) induction times are usually significantly reduced as are exotherms associated with such reactions; (4) reactions are often initiated by ultrasound without the need for additives; (5) the number of steps that are normally required in a synthetic route can be reduced; and (6) in some cases a reaction can be directed to an alternative pathway.

There are several factors that can be controlled for cavitation. These include:

Frequency—as the ultrasonic frequency is increased the production and intensity of cavitation in liquids decreases. However, higher frequencies are advantageous when radical promotion is required.

Solvent—Cavitation is more difficult to produce in viscous liquids or liquids with high surface tensions Temperature—Increasing the reaction temperature allows cavitation to be achieved at lower acoustic intensity. Unfortunately, the effects resulting from cavitational collapse are also reduced. Therefore, to get maximum sonochemical benefit the reaction should be conducted at as low a temperature as possible or with a solvent of low vapor pressure.

Gas type and content—Employing gases with large values of the heat capacity ratio, $\gamma(\gamma=C_p/C_v)$ provide larger sonochemical effects from gas filled bubbles. Therefore monoatomic gases such as He, Ar and Ne are used in preference to diatomics such as $N_2$, air, $O_2$, etc. It should also be noted that sonochemical effects also depend upon the thermal conductivity of the gas. The greater the thermal conductivity of the gas the more heat will be dissipated to the surrounding liquid, effectively decreasing the maximum temperature, $T_{Max}$. In addition, utilizing gases with increased solubility will reduce the threshold intensity and the intensity of cavitation.

External Applied Pressure—Increasing the external pressure leads to an increase in both the cavitational threshold and the intensity of the bubble collapse. Increasing the pressure will result in more rapid and violent bubble collapse.

Intensity—An increase in intensity in the ultrasound will result in an increase in the sonochemical effects. Cavitation bubbles, which are difficult to create at higher frequencies are now possible. The bubble collapse will also be more violent.

Vapor Pressure—The vapor pressure of the solvent cannot be too high as in the case of organic materials at room temperature (they will not cavitate under these conditions). However if the temperature of the solvent is kept well below its boiling point (so that the vapor pressure is kept low) then all organic liquids will undergo sonochemistry voa homolysis of bonds and with the formation of free radicals.

Sonoelectrochemistry is considered to be the interaction of sound with electrochemistry which is the interconversion of electrical and chemical energies. This would include important industrial processes such as electrodeposition (electroplating), electro-organic synthesis and generation of power in liquid fuel cells. The application of ultrasound to these devices enhances their performance due to the following factors:

The application of ultrasound decreases the thickness of the diffusion layer next to the electrode and in doing so assists the electrode reactions. Conventional stirring or mixing reduces the thickness of this layer; however, ultrasonic stirring is by far the most effective method.

Ultrasound increases the movement of metal ions which reduces the concentration effect. Where there is dissolution of the anode the concentration of metal ions increases at high current densities—the rate of dissolution is greater than the rate of diffusion away from the metal surface into the bulk solution. The electrolytic process thereby slows down—with ultrasound the diffusion rate would increase resulting in an increase in performance.

When a gas molecule to be discharged energy is required to dislodge it from the electrode surface—this is called the activation polarization. An example of ultrasonically assisted gas evolution is with the evolution of chlorine from carbon electrodes which was found to be significantly improved with ultrasound (i.e. decreased activation polarization).

A significant reduction in electrode fouling, a problem encountered in electro-organic synthesis. Ultrasonics continuously clean the surface of an electrode.

Using ultrasound minimizes the difference in concentration around the electrodes increasing the performance of electro-catlytic reactions. Kinetic limitations due to mass transport in a reaction are reduced by orders of magnitude with ultrasonic activation.

There is a reduction in resistance polarization for a liquid electrolyte which contributes to ohmic drop in an electrochemical cell. The electrochemical cell experiences less power loss due to resistance polarization.

The application of ultrasound to an electrolytic solution is beneficial in that it reduces the ohmic, activation and concentration over-potentials thereby enhancing the performance of electrochemical devices.

In summary the use of ultrasound in electrochemistry includes:
Degassing of the electrode surface—reduction in activation polarization
Disruption of the diffusion layer which reduces depletion of electroactive species—reduction in mass transport of concentration losses
Improved mass transport of ions across the diffusion layer
Continuous cleaning and activation of the electrode surfaces—reduction in activation polarization Sono-Electro-Organic Synthesis Ultrasound provides benefits in electro-organic synthesis due its ability to clean surfaces, form fresh surfaces and improve mass transport (which could involve kinetic and thermodynamic requirements). At benefit with ultrasound is that there will be no electrode fouling for organic synthesis and that reactions maintain a consistent current density at a steady and lower voltage. One explanation is that enhanced mass transport under ultrasound and the abrasion effect near the electrode surface sweeps the inhibiting species into solution and in doing so keeps the electrode surface clean. There is also typically a lowering in the applied cell voltage required, representing an energy saving. In summary sono-electro-organic synthesis can produce altered product ratios, greater efficiencies, lessened cell power requirements and a diminution of electrode fouling. Ultrasound can also influence multiphase systems and is therefore useful for reactions involving immiscible materials.

When ultrasonic irradiation is powerful enough to induce cavitation it is possible to introduce a range of additional energy sources which can behave in a synergistic manner. These additional sources can be mechanical agitation, ultraviolet light, other ultrasonic frequencies, electrochemistry, infrared, magnetic fields and microwaves. For example under normal ultrasonic irradiation sonoluminescence (SL) occurs during the compression phase of the bubble, whereas when exposed to microwaves, SL occurs during both contraction and expansion of the bubble. The efficiency of a sonochemical reaction is significantly increased by simultaneous irradiation with microwaves and it would be possible to achieve new chemical effects.

When sonification is added acoustic cavitation and shock waves generate an intense mixing which leads to a vessel that is a perfectly agitated reactor. This implies that the concentration of the solutes is the same at any point within the vessel. Therefore, if the concentration of the excited species becomes independent of distance, the reaction rates should be the same at any point in the solution. No local depletion of intermediates would result with a preferred result on bimolecular reactions.

In order to improve the overall performance of a photoprocess, heterogeneous photocatalysis has been combined with physical or chemical operations, which affect the chemical kinetics and or overall efficiency. This combination can: (1) increase the efficiency and decrease the reaction time with respect to separated operations; or (2) decrease the cost with respect to heterogeneous photocatalysis alone, generally in terms of light energy.

Heterogeneous photocatalysis is coupled with an operation that affects the photocatalytic mechanisms therefore improving the efficiency of the photocatalytic process. The coupling can be with: (1) ultrasonic irradiation; (2) Photo-Fenton reaction; (3) Ozonation; and (4) Electrochemical treatment.

Another embodiment employs the combination of ultrasound and photocatalysis (sonophotocatalysis). The simultaneous use of both techniques is capable of degrading organic pollutants in water which is not normally possible. Ultrasound and photocatalysis has been combined for the degradation of various organics such as salicyclic acid, propyzamide, oxalic acid, 2,4,6-trichlorophenol, and chlorinated aromatic compounds. It is possible to decompose water to $H_2$ and $O_2$ through the use of sonophotocatalysis where $TiO_2$ is utilized as the photocatalyst. The combination of sonolysis and photocatalysis permits the decomposition of water.

To initiate the growth of a cavitation bubble, an acoustic pressure above the so called Blake threshold pressure has to be applied. The Blake threshold is the acoustic pressure amplitude necessary to cause a bubble initially in a state of stable equilibrium, to lose its stability and grow, rapidly increasing its volume. This loss of mechanical stability and rapid growth is essential to cavitation nucleation and transient cavitation processes. The Blake threshold pressure (which is a negative pressure) is associated with the destruction of microbubbles and is approximated according to the following equation:

$$P_B = P_h + \frac{8\sigma}{9}\left(\frac{3\sigma}{2P_h R_e^3}\right)^{1/2} \tag{18.0}$$

where $P_B$ is the Blake threshold pressure, $P_h$ is the hydrostatic pressure, $\sigma$ is the surface tension, $R_e$ is the radius of a bubble at equilibrium (neither contracting or expanding).

The critical Blake radius for rapid expansion of a bubble can also be approximated by:

$$R_c \approx 2R_e \tag{18.1}$$

where $R_c$ is the critical Blake radius and $R_e$ is the equilibrium radius of the microbubble.

As expected according equation 18.0, due to the increase in hydrostatic pressure ($P_h$) during pressurization of a liquid, the Blake threshold increases, which implies that higher negative acoustic pressures are needed to produce cavitations.

In ordinary solvents, cavitation does not occur at elevated pressures therefore sonochemical studies have been limited to atmospheric pressures. Unlike ordinary liquids/solvents, the high vapor pressure of a dense phase fluid such as $CO_2$ (which is a gas at ambient conditions) allows cavitation to occur. The occurrence of cavitation in high pressure $CO_2$ has been shown at 75 bar and 283K where $CO_2$ is in a liquid state, even though it is above its critical pressure. Staying below the critical point of the mixture may be desirable, since above the critical point of the mixture no phase boundaries exist, which would prohibit cavitation. At an acoustic intensity below the Blake threshold pressure (25 W/cm$^2$) the $CO_2$ fluid at 75 bar remains transparent, while at 125 W/cm$^2$ cavitation occurs. The Blake threshold pressure was calculated as:

$$P_B = P_h - P_v + \frac{4}{3}\sigma \sqrt{\left(\frac{2\sigma}{3R_e^3\left(P_h + \frac{2\sigma}{R_e} - P_v\right)}\right)} \tag{18.2}$$

where $P_v$ is the vapor pressure of the fluid (this term is absent in equation 18.0).

No bubble formation occurs in water at elevated pressures—the maximum bubble radius before collapse is on the same order of magnitude for water at ambient pressure and with $CO_2$ at high pressure. The calculated maximum attainable temperatures are 722K for water (at 1 bar) and 585K for liquid $CO_2$ at 58.2 bar.

Gas-to-liquid processes of Fischer-Tropsch synthesis, methanol synthesis, dimethyl ether (DME) synthesis, and synthesis of synthetic gasoline have received attention from industrial and academic sectors. One of the present inventions is to expand the products of gas-to-liquid processes to a wide range of additional chemical products. These products include dimethyl ether (DME), olefins via the methanol-to-olefin (MTO) process, synthetic gasoline via the methanol to gasoline (MTG) process or the olefin-to-gasoline and distillate process (MOGD) process. These compounds are synthesized in the presence of zeolite catalysts, commercially described as ZSM-x type catalysts. In the MOGD reaction, ZSM-5 oligomerizes light olefins from either refinery streams or the MTO process into gasoline, distillate and lubricant. In an analogous fashion to Fischer Tropsch synthesis, the processing of liquid $CO_2$ will result in a wide range of hydrocarbon products.

The main components in the sonochemical synthesis of hydrocarbons consist of $CO_2$—CO, $H_2O$—$H_2$ and an appropriate catalyst depending on what products are required. Sonochemistry consists of all of the chemical effects that are induced by ultrasound, including the formation of radicals and the enhancement of reaction rates at ambient temperatures. The chemical effects of ultrasound are caused by cavitation which involves the collapse of microscopic bubbles in a liquid. During collapse of the bubbles temperatures of up to 5000K and pressures of 200 atmosphere and higher are created. These extreme conditions results in the formation of excited states, bond breakage and the generation of radicals. Cavitation induced radical reactions provide clean and safe operations, because no separation is required afterwards and the formation of radicals can be controlled externally.

Carbon dioxide is non-flammable, a significant safety advantage in using it as a solvent. It is naturally abundant with a threshold limit value (TLV) of 5,000 ppm at 298K and unlimited exposure to workers. Clearly carbon dioxide is a greenhouse gas but it is also a naturally occurring abundant material. The objective of one method of this invention is to withdraw $CO_2$ from the environment, employ it in a process and then return it to the environment with no overall environmental effect. In theory, $CO_2$ can be extracted from the atmosphere or from the stack of a carbon based combustion source. Most of the $CO_2$ is derived from either $NH_3$ plants or from tertiary oil recovery. Through proper management of $CO_2$ instead of being a pollutant it will become a valuable molecule. In combination with the global water cycle the global carbon dioxide cycle would be managed responsibly in a sustainable manner.

In one method of the invention, liquid carbon dioxide may be used as a medium for ultrasound induced chemical reactions—with high molecular weight polymers being prepared in high-pressure fluid. In ordinary solvents, the process of bubble formation and implosion (i.e. cavitation) does not occur at elevated pressure. However, the high vapor pressure of dense fluids such as $CO_2$ counteracts the hydrostatic pressure, permitting cavitation to occur. It is possible in this application to initiate chemical reactions with or without using organic solvents and/or initiators/catalysts via ultrasonics.

Sonochemical reduction of carbon dioxide dissolved in water may result in various products such as CO, $H_2O_2$, $H_2$ and $O_2$. Carbon dioxide dissolved in water may be reduced sonochemically to CO. In addition, $H_2$ and a small amount $O_2$ may be formed. A series of pure gases were passed through the water to displace dissolved air. It was determined that the reduction rate for $CO_2$ according to the pure gas utilized followed the order Ar>He>$H_2$>$N_2$. In addition, it was determined that the efficiency of $CO_2$ reduction decreased with increasing temperature—with 5° C. being optimal. Regardless, several factors determine the rate of sonolysis/reduction consisting of; surface tension, viscosity, sound velocity, etc. The reduction of $CO_2$ was performed by adding $CO_2$ to an Argon atmosphere the gas mixture which subsequently dissolves in water. It was determined that the maximum reduction rate of $CO_2$ was obtained when the gas concentration reached 0.03 mole fraction of $CO_2$ above the water's surface. Carbon monoxide and hydrogen were determined to be the main products from sonolysis of Ar—$CO_2$ mixtures dissolved in water.

Upon formation of compounds the viscosity of the solution can change. A high viscosity fluid hinders cavitation and reduces the production rate of radicals. The fluid to be utilized should act as an anti-solvent for the chemical being produced. For example, high pressure $CO_2$ readily dissolves most monomers whereas it exhibits low solubility with polymers and therefore acts as an anti-solvent and results in precipitation of polymers. Cavitation is possible if the difference between the static and vapor pressure is smaller than the maximum acoustic pressure that can be applied. In the case of liquid carbon dioxide its high vapor pressure is capable of counteracting a high static pressure.

According to calorimetric studies a substantial amount of acoustic energy is not converted into the formation of radicals. Typically, the energy yield for the formation of radicals is in the order of $5\times10^{-6}$ J/J. Only in the immediate vicinity of the ultrasonic tip does cavitation occur, this being the location where free radicals are produced. It follows that the area directly adjacent to the ultrasonic emitter is where the reactions will occur primarily. Therefore, it would be advantageous to locate any required catalysts or electrodes immediately adjacent to the ultrasonic emitter.

The number of radicals formed due to sonification is a function of the number of cavities created and the number of radicals formed per cavitation bubble. The extrinsic parameters, including, pressure, temperature, ultrasound settings and the type of fluid, effect the formation of radicals in a complex way. Temperature has a significant effect on the formation of radicals, especially at low temperatures. Due to the cushioning effect of increased vapor pressure at higher temperatures during the implosion of the cavity, the local temperatures generated inside the cavity are lower at higher overall temperatures. Regardless, the energy efficiency decreases at higher temperatures due to lower radical formation rates.

It is inefficient to use high ultrasonic amplitudes, therefore a larger sonofication area is more efficient. Increasing the coupling of the acoustic energy from the emitter. For example, a large cloud of cavitation bubbles is formed close to the emitter for intense sound fields, which absorbs and scatters the sound wave. Reduction or elimination of this bubble cloud would increase the ultrasonic coupling efficiency.

Supercritical $CO_2$ will exhibit a higher compressibility than liquid $CO_2$ and therefore supercritical fluid may be better able to absorb excess heat evolved from an exothermic reaction that has run away from normal operating conditions. This is especially important with the highly exothermic reactions present in formation of hydrocarbons via Fischer Tropsch processes. There is evidence for the application of ultrasonics to supercritical fluids with improvements noted in extraction processes. Ultrasonic cavitation has been analyzed and determined to be favored by lower temperature and higher pressure with supercritical $CO_2$.

With the dramatic increase in the international oil price, gas-to-liquid processes, including Fischer-Tropsch synthesis, methanol synthesis and dimethyl ether synthesis are becoming increasingly important. The slurry reactor has advantages of simpler construction, good heat transfer and feasible scale-up. Therefore, a slurry reactor may be used in addition to a fixed bed reactor in the gas-to-liquid processes. In a slurry reactor, fine catalyst particles are suspended in an oil solvent which possesses a large heat capacity. The bubbles agitate the oil solvent, and since the oil solvent has a high heat transfer rate, temperatures are maintained uniformly. This is especially important due to the highly exothermic nature of methanol synthesis, DME synthesis and synthesis of a wide range of hydrocarbons. In one aspect of the invention, the application of ultrasonics to slurry type processes provides several advantages: mixing would be complete, mass transport limitations would be eliminated, the surface of catalysts/electrocatalysts would be cleaned continuously, reaction temperatures and pressures inside the cavitation bubbles could be tailored for the desired hydrocarbon species, and the bulk solution could be at ambient temperature and pressures.

In slurry or any other process which contains catalyst/electrocatlyst suspended in solution the separation and recovery of this material is important. There are several ways in which catalysts can be recovered after a reaction has proceeded and then reused. Depending on the form the catalysts are in, recovery may consist of: (1) through lowering of the reaction pressures so as to precipitate the catalyst from the reaction fluids; (2) by cooling of the fluid until the catalysts precipitates; (3) by using a membrane in which the reaction products to pass through but not the catalyst; (4) through auto-separation of a product which is insoluble in the reaction fluid; (5) by dissolution of the catalyst in a liquid that is immiscible with the reaction/product fluids; (6) by attaching the catalyst to a solid polymer or other solid support; (7) by using an inverted biphasic system in which the catalyst partitions into a liquid that is immiscible with the reaction fluid; and (8) separation of catalysts fines using a high gradient magnetic separation device.

Several of the ultrasonic or sonochemical processes described herein may be used in combination with several electrolytic, electrochemical, and plasma processes described above. For example, the carbon reactant for the ultrasonic or sonochemical process may be obtained through any of the processes detailed above, including, but not limited to plasma and the carbon dioxide extraction unit. For example, the hydrogen reactant for the ultrasonic or sonochemical process may be obtained through any of the processes detailed above, including, but not limited to, plasma and electrolysis.

Figure 13:
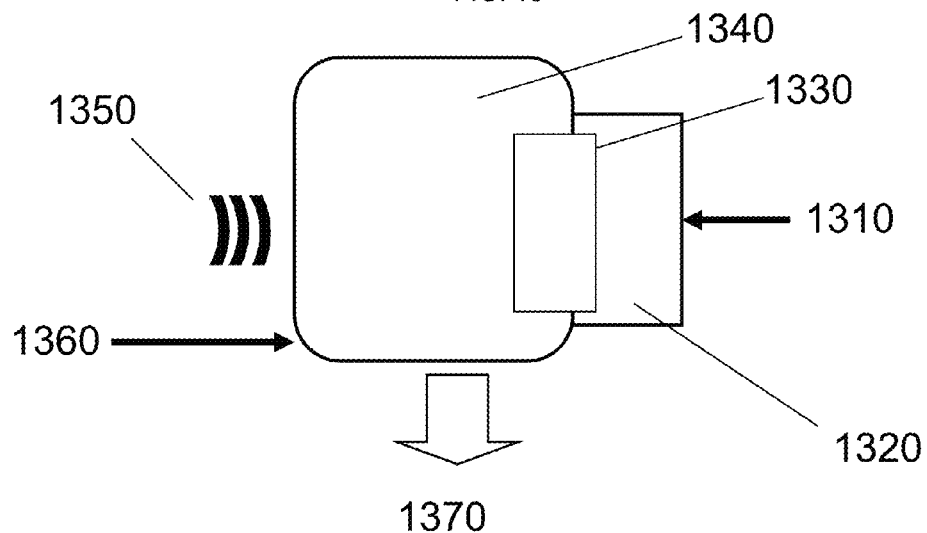
FIG. 13 illustrates an exemplary process and device for producing hydrocarbons using ultrasonic energy.

FIG. 13 illustrates an ultrasonic process and device according to the invention. The hydrogen source 1310 enters the reactor 1340. The hydrogen source 1310 optionally passes through an electrolytic membrane 1320 entering the reactor 1340. The reactor preferably contains catalyst 1330. Inside the reactor, preferably is liquid carbon dioxide dissolved in water and other solvents. Carbon dioxide 1360 may also be supplied in gaseous form. An ultrasonic transducer 1350 supplies energy to drive the reaction. Exiting the reactor 1370 are the produced hydrocarbons.

Figure 14:
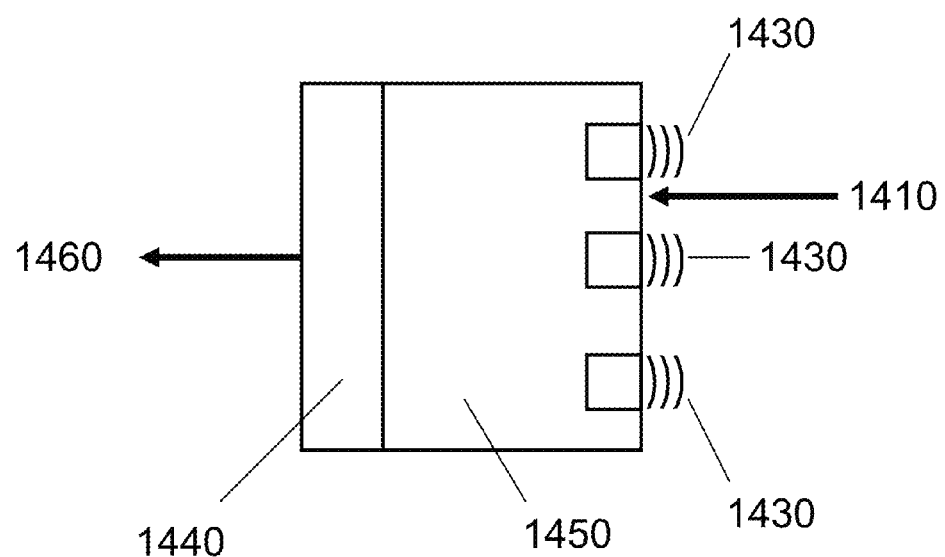
FIG. 14 illustrates an exemplary process and device for creating hydrogen gas using ultrasonic energy.

FIG. 14 illustrates a device 1450 to produce hydrogen gas from a hydrogen source using an ultrasonic electrocatalytic electrode. A hydrogen source 1410 enters the device 1450. One or more ultrasonic transducers 1430 supply energy to drive the reaction. Inside the device are anode and cathode, and an optional catalyst. The ultrasonic transducers 1430 create the potential across the electrodes. Before exiting, the hydrogen gas (1460) passes through an electrolytic membrane.

The source of hydrogen is preferably hydrogen gas. It may enter the reactor after a pretreatment step. The source of carbon is preferably liquid carbon dioxide gas, which may be placed under about 5 atmospheres of pressure at roughly room temperature. Inside the reactor, a catalyst may be used. The temperature and pressure within the reactor is preferably about less than 150° C. and less than about 3 atmosphere. The energy supplied to the reactor is preferably generated from a renewable energy source that is converted into ultrasonic energy prior to being applied to the reactor on the order of about greater than 10 kHz. The reactor may be a small sized reactor such that it fits within a combustion engine. The reactor may also be scaled to industrial size. Preferably, it is a slurry based reaction with catalyst. The resulting hydrocarbon is preferably methanol or ethanol.

Similar to the electrolytic reaction described in Section I, the ultrasonic energy may be derived from an electrical energy source that is generated from a renewable energy source, such as wind and/or solar.

Any of the hydrocarbons produced by the methods and devices described herein may be used for alternative energy fuels or any other suitable purpose, such as feedstock for the production of plastics.

The foregoing detailed description is provided solely to describe the invention in detail, and is not intended to limit the invention. Those skilled in the art will appreciate that various modifications may be made to the invention without departing significantly from the spirit and scope thereof.

The invention claimed is:

1. A device for the gas-phase electrochemical reduction of a carbon-containing gas to produce one or more hydrocarbons, comprising:
    a source of carbon-containing gas;
    a hydrogen source;
    a cathode in fluidic communication with the source of carbon-containing gas;
    a pressure and temperature controller configured to maintain the cathode at a pressure between about 1 atm to about 50 atm and a temperature between about 100° C. to less than about 600° C.;
    an anode in fluidic communication with the hydrogen source;
    a protonic-conducting electrolyte connecting the cathode and anode; and
    a source of electrical potential electrically connected to the cathode and anode.

2. The device of claim 1, further comprising a plasma energy-source.

3. The device of claim 2, wherein the plasma energy-source is in communication with the cathode.

4. The device of claim 2, wherein the plasma energy-source is in communication with the anode.

5. The device of claim 1, further comprising an ultrasonic energy-source.

6. The device of claim 5, wherein the ultrasonic energy-source is in communication with the cathode.

7. The device of claim 5, wherein the ultrasonic energy-source is in communication with the anode.

8. The device of claim 1, wherein the cathode is selected from the group consisting of metal electrocatalysts, metal-supported electrocatalysts, metal-oxide supported electrocatalysts, electrocatalytic superconducting materials, and combinations thereof.

9. The device of claim 1, wherein the anode is selected from the group consisting of platinum-ruthenium electrocatalysts, platinum-iridium electrocatalysts, $IrO_2$ electrocatalysts, ultrafine $IrO_2$ powder combined with platinum electrocatalysts, and combinations thereof.

10. The device of claim 1, wherein the protonic-conducting electrolyte is selected from the group consisting of polymeric protonic conductors, solid acid protonic conductors, ceramic mixed oxide protonic conductors, and combinations thereof.

11. The device of claim 1, wherein the pressure and temperature controller is configured to maintain the cathode at a pressure between about 1 atm to about 15 atm.

12. An electrochemical system for the gas-phase reduction of a carbon-containing gas to produce one or more hydrocarbons, comprising:
a carbon-containing gas;
a first input for receiving the carbon-containing gas;
a hydrogen source;
a second input for receiving the hydrogen source;
a cathode in fluidic communication with the first input;
a pressure and temperature controller configured to maintain the cathode at a pressure between about 1 atm to about 50 atm and a temperature between about 100° C. to less than about 600° C.;
an anode in fluidic communication with the second input;
a protonic-conducting electrolyte connecting the cathode and anode; and
a source of electrical potential electrically connected to the cathode and anode.

13. The electrochemical system of claim 12, further comprising a plasma energy-source.

14. The electrochemical system of claim 13, wherein the plasma energy-source is in communication with the cathode.

15. The electrochemical system of claim 13, wherein the plasma energy-source is in communication with the anode.

16. The electrochemical system of claim 12, further comprising an ultrasonic energy-source.

17. The electrochemical system of claim 16, wherein the ultrasonic energy-source is in communication with the cathode.

18. The electrochemical system of claim 16, wherein the ultrasonic energy-source is in communication with the anode.

19. The electrochemical system of claim 12, wherein the cathode is selected from the group consisting of metal electrocatalysts, metal-supported electrocatalysts, metal-oxide supported electrocatalysts, electrocatalytic superconducting materials, and combinations thereof.

20. The electrochemical system of claim 12, wherein the anode is selected from the group consisting of platinum-ruthenium electrocatalysts, platinum-iridium electrocatalysts, IrO2 electrocatalysts, ultrafine IrO2 powder combined with platinum electrocatalysts, and combinations thereof.

21. The electrochemical system of claim 12, wherein the protonic-conducting electrolyte is selected from the group consisting of polymeric protonic conductors, solid acid protonic conductors, ceramic mixed oxide protonic conductors, and combinations thereof.

22. The electrochemical system of claim 12, wherein the pressure and temperature controller is configured to maintain the cathode at a pressure between about 1 atm to about 15 atm.

23. A device for the gas-phase electrochemical reduction of a carbon-containing gas to produce one or more hydrocarbons, comprising:
a source of carbon-containing gas;
a hydrogen source;
a cathode in fluidic communication with the source of carbon-containing gas with the carbon-containing gas in a gaseous phase;
a pressure and temperature controller configured to maintain the cathode at a pressure between about 1 atm to about 50 atm and a temperature between about 50° C. to less than about 600° C.;
an anode in fluidic communication with the hydrogen source;
a protonic-conducting electrolyte connecting the cathode and anode; and
a source of electrical potential electrically connected to the cathode and anode.

24. The device of claim 23, wherein the pressure and temperature controller is configured to maintain the cathode at a pressure between 1 atm to about 15 atm.

* * * * *